US012379650B2

(12) United States Patent
Wong et al.

(10) Patent No.: US 12,379,650 B2
(45) Date of Patent: Aug. 5, 2025

(54) REINFORCED IMAGE CAPTURE DEVICES INCLUDING INTERCONNECT MECHANISMS WITH A THREADED ACCESSORY INTERFACE

(71) Applicant: GoPro, Inc., San Mateo, CA (US)

(72) Inventors: Herman Wong, Millbrae, CA (US); Nicholas Vitale, Foster City, CA (US)

(73) Assignee: GoPro, Inc., San Mateo, CA (US)

(*) Notice: Subject to any disclaimer, the term of this patent is extended or adjusted under 35 U.S.C. 154(b) by 203 days.

(21) Appl. No.: 18/169,431

(22) Filed: Feb. 15, 2023

(65) Prior Publication Data
US 2024/0272527 A1    Aug. 15, 2024

(51) Int. Cl.
*G03B 17/56* (2021.01)
*F16M 11/04* (2006.01)
*F16M 11/10* (2006.01)

(52) U.S. Cl.
CPC ......... *G03B 17/566* (2013.01); *F16M 11/041* (2013.01); *F16M 11/10* (2013.01); *F16M 2200/022* (2013.01)

(58) Field of Classification Search
CPC .............................. G03B 17/56–566
See application file for complete search history.

(56) References Cited

U.S. PATENT DOCUMENTS

| 1,467,556 | A | 9/1923 | Nagel |
| 1,612,277 | A | 12/1926 | Leo |
| D118,296 | S | 12/1939 | Tuomey |
| 2,651,981 | A | 9/1953 | Calhoun |
| 2,890,067 | A | 6/1959 | Morin |

(Continued)

FOREIGN PATENT DOCUMENTS

| CN | 3468747 | | 8/2005 |
| CN | 1740899 | A | 3/2006 |

(Continued)

OTHER PUBLICATIONS

HSU HGP235 Amazon product listing at https://www.amazon.com/HSU-Replacement-Folding-Compatible-Connector/dp/B08R2XP8DW, accessed Nov. 15, 2024 (Year: 2024).*

(Continued)

*Primary Examiner* — Leon W Rhodes, Jr.
(74) *Attorney, Agent, or Firm* — Young Basile Hanlon & MacFarlane, P.C.

(57) ABSTRACT

An image capture device that includes a body and an interconnect mechanism that is connected to the body. The interconnect mechanism includes: a base plate defining a receptacle that is configured to threadably engage an accessory such that the image capture device is directly connectable to the accessory via the interconnect mechanism; a cover that is removably connected to the base plate and which is configured to thermally insulate the interconnect mechanism; and first and second fingers that are pivotably connected to the base plate about first and second pivot axes such that the interconnect mechanism is reconfigurable between a collapsed configuration, in which the first and second fingers are nested within the body of the image capture device, and an extended configuration, in which the first and second fingers extend outwardly from the body of the image capture device.

20 Claims, 20 Drawing Sheets

(56) References Cited

U.S. PATENT DOCUMENTS

| | | | |
|---|---|---|---|
| 2,962,251 | A | 11/1960 | Nikolaus |
| 3,073,227 | A | 1/1963 | Richard |
| 3,508,482 | A | 4/1970 | Taylor |
| D219,768 | S | 1/1971 | Conwill |
| 3,762,797 | A | 10/1973 | Heller |
| 3,776,649 | A | 12/1973 | Kemezys |
| 3,860,937 | A | 1/1975 | Wolfe |
| D243,655 | S | 3/1977 | Matousek |
| 4,025,930 | A | 5/1977 | Wolff |
| 4,091,402 | A | 5/1978 | Siegel |
| 4,208,028 | A | 6/1980 | Brown |
| 4,417,796 | A * | 11/1983 | Sugiura ............... G03B 17/02 396/357 |
| D272,392 | S | 1/1984 | Bigelow |
| 4,573,239 | A * | 3/1986 | Valenti .................. E05D 5/10 16/DIG. 42 |
| 4,646,141 | A | 2/1987 | Timmermans |
| 4,733,259 | A | 3/1988 | Ng |
| 4,763,151 | A | 8/1988 | Klinger |
| 4,837,817 | A | 6/1989 | Maemori |
| 4,864,335 | A | 9/1989 | Corrales |
| 4,887,161 | A | 12/1989 | Watanabe |
| 4,888,795 | A | 12/1989 | Ando |
| 4,953,030 | A | 8/1990 | Seo |
| 5,021,813 | A | 6/1991 | Corrales |
| 5,092,458 | A | 3/1992 | Yokoyama |
| 5,244,326 | A | 9/1993 | Henriksen |
| 5,294,988 | A | 3/1994 | Wakabayashi |
| 5,327,265 | A | 7/1994 | McDonald |
| 5,336,086 | A | 8/1994 | Simmen |
| 5,400,234 | A | 3/1995 | Yu |
| 5,429,466 | A | 7/1995 | Nagayama |
| D363,562 | S | 10/1995 | Schildt |
| 5,485,357 | A | 1/1996 | Zolninger |
| 5,486,852 | A | 1/1996 | Arai |
| 5,505,424 | A | 4/1996 | Niemann |
| D373,947 | S | 9/1996 | Parduhn |
| 5,563,661 | A | 10/1996 | Takahashi |
| 5,627,587 | A | 5/1997 | Murata |
| 5,657,081 | A | 8/1997 | Kurahashi |
| 5,661,823 | A | 8/1997 | Yamauchi |
| D391,217 | S | 2/1998 | Pingel |
| 5,726,708 | A | 3/1998 | Sakai |
| 5,729,289 | A | 3/1998 | Etoh |
| 5,769,370 | A | 6/1998 | Ashjaee |
| 5,775,558 | A | 7/1998 | Montalbano |
| 5,805,219 | A | 9/1998 | Ejima |
| 5,808,663 | A | 9/1998 | Okaya |
| 5,842,069 | A | 11/1998 | Konno |
| 5,887,375 | A | 3/1999 | Watson |
| 5,926,218 | A | 7/1999 | Smith |
| 5,938,492 | A | 8/1999 | Carlini |
| 5,946,501 | A | 8/1999 | Hayakawa |
| 5,969,750 | A | 10/1999 | Hsieh |
| 5,978,609 | A | 11/1999 | Aoki |
| 5,995,373 | A | 11/1999 | Nagai |
| D418,044 | S | 12/1999 | Schoeneweis |
| 6,034,728 | A | 3/2000 | Arena |
| 6,035,147 | A | 3/2000 | Kurosawa |
| 6,042,080 | A | 3/2000 | Shepherd |
| 6,104,887 | A | 8/2000 | Hamasaki |
| 6,118,929 | A | 9/2000 | Kawamura |
| 6,128,441 | A | 10/2000 | Kamata |
| 6,138,826 | A | 10/2000 | Kanamori |
| D437,772 | S | 2/2001 | Erwin |
| D441,386 | S | 5/2001 | Yamazaki |
| D442,982 | S | 5/2001 | Adachi |
| 6,315,180 | B1 | 11/2001 | Watkins |
| 6,332,146 | B1 | 12/2001 | Jebens |
| 6,360,928 | B1 | 3/2002 | Russo |
| D460,474 | S | 7/2002 | Gotham, Sr. |
| D462,893 | S | 9/2002 | Sung |
| 6,480,671 | B2 | 11/2002 | Takahashi |
| 6,483,542 | B1 | 11/2002 | Morinaga |
| D467,605 | S | 12/2002 | Dordick |
| 6,530,784 | B1 | 3/2003 | Yim |
| 6,583,809 | B1 | 6/2003 | Fujiwara |
| 6,637,904 | B2 | 10/2003 | Hernandez |
| 6,654,235 | B2 | 11/2003 | Imsand |
| D483,789 | S | 12/2003 | Dordick |
| 6,727,954 | B1 | 4/2004 | Hiroyuki |
| 6,741,287 | B1 | 5/2004 | Fuchimukai |
| D491,968 | S | 6/2004 | Isshiki |
| D492,893 | S | 7/2004 | Oddsen, Jr. |
| D494,450 | S | 8/2004 | Schultz |
| 6,809,759 | B1 | 10/2004 | Chiang |
| D504,904 | S | 5/2005 | Nagai |
| 6,955,484 | B2 | 10/2005 | Woodman |
| D511,960 | S | 11/2005 | Ogino |
| D515,121 | S | 2/2006 | Bleau |
| D515,613 | S | 2/2006 | Holmes |
| D515,910 | S | 2/2006 | Gates |
| 7,011,460 | B1 | 3/2006 | Todd |
| 7,060,921 | B2 | 6/2006 | Kubo |
| 7,077,582 | B2 | 7/2006 | Johnson |
| 7,129,981 | B2 | 10/2006 | Berstis |
| 7,182,529 | B2 * | 2/2007 | Kurosawa ............. G03B 19/12 348/374 |
| 7,185,862 | B1 | 3/2007 | Yang |
| 7,196,722 | B2 | 3/2007 | White |
| 7,226,261 | B1 | 6/2007 | Bristol |
| D551,969 | S | 10/2007 | Aurilio |
| 7,285,879 | B2 | 10/2007 | Osaka |
| D555,699 | S | 11/2007 | Oh |
| 7,295,388 | B2 | 11/2007 | Shyu |
| D559,083 | S | 1/2008 | Brassard |
| 7,327,396 | B2 | 2/2008 | Schultz |
| 7,337,403 | B2 | 2/2008 | Pavley |
| 7,362,352 | B2 | 4/2008 | Ueyama |
| 7,379,664 | B2 | 5/2008 | Marcus |
| D571,188 | S | 6/2008 | Brassard |
| D576,486 | S | 9/2008 | Koza |
| D577,729 | S | 9/2008 | Derry |
| D577,731 | S | 9/2008 | Altonji |
| 7,440,693 | B2 | 10/2008 | Kouchi |
| D581,255 | S | 11/2008 | Calvin |
| D582,955 | S | 12/2008 | Sekine |
| 7,463,304 | B2 | 12/2008 | Murray |
| 7,464,215 | B2 | 12/2008 | Kawai |
| 7,494,290 | B2 * | 2/2009 | Kim .................... G03B 17/02 396/419 |
| 7,496,293 | B2 | 2/2009 | Shamir |
| 7,508,420 | B2 | 3/2009 | Kitajima |
| D591,325 | S | 4/2009 | Dordick |
| 7,537,399 | B2 | 5/2009 | Mayumi |
| 7,543,327 | B1 | 6/2009 | Kaplinsky |
| D596,217 | S | 7/2009 | Kim |
| D596,658 | S | 7/2009 | Dordick |
| 7,612,821 | B1 | 11/2009 | Hsia |
| 7,613,386 | B2 | 11/2009 | Shimamura |
| 7,643,056 | B2 | 1/2010 | Silsby |
| 7,656,294 | B2 | 2/2010 | Boss |
| 7,663,666 | B2 | 2/2010 | Kawai |
| 7,671,886 | B2 | 3/2010 | Sawada |
| 7,674,081 | B2 | 3/2010 | Selle |
| D616,286 | S | 5/2010 | Foresman |
| D616,480 | S | 5/2010 | Ookawa |
| D616,742 | S | 6/2010 | Lymn |
| 7,728,905 | B2 | 6/2010 | Tanaka |
| 7,752,732 | B2 | 7/2010 | Brown |
| 7,801,425 | B2 | 9/2010 | Fantone |
| D625,750 | S | 10/2010 | Dittmer |
| 7,823,771 | B2 | 11/2010 | Sawachi |
| D635,445 | S | 4/2011 | Foresman |
| D640,304 | S | 6/2011 | Green |
| 8,013,932 | B2 | 9/2011 | Chan |
| 8,014,656 | B2 | 9/2011 | Woodman |
| 8,026,945 | B2 | 9/2011 | Garoutte |
| D646,313 | S | 10/2011 | Woodman |
| 8,031,222 | B2 | 10/2011 | Crinon |
| D657,808 | S | 4/2012 | Woodman |
| 8,150,248 | B1 | 4/2012 | Woodman |
| 8,194,145 | B2 | 6/2012 | Lee |
| 8,194,174 | B2 | 6/2012 | Roskowski |

(56) References Cited

U.S. PATENT DOCUMENTS

| | | |
|---|---|---|
| 8,199,251 B2 | 6/2012 | Woodman |
| 8,218,025 B2 | 7/2012 | Yonaha |
| 8,235,635 B1 | 8/2012 | Brown |
| 8,267,361 B1 | 9/2012 | Dordick |
| 8,300,107 B2 | 10/2012 | Strandwitz |
| D671,394 S | 11/2012 | Derry |
| 8,325,270 B2 | 12/2012 | Woodman |
| 8,328,055 B1 | 12/2012 | Snyder |
| D675,242 S | 1/2013 | O'Donnell |
| 8,348,214 B2 | 1/2013 | Vogt |
| 8,356,948 B2 | 1/2013 | Onishi |
| 8,368,748 B2 | 2/2013 | Ho |
| 8,371,729 B2 | 2/2013 | Sharrah |
| D679,576 S | 4/2013 | Paul |
| D680,097 S | 4/2013 | Davies |
| D683,207 S | 5/2013 | Papadopoulos |
| 8,467,675 B2 | 6/2013 | Chen |
| 8,485,910 B2 | 7/2013 | Selle |
| D690,280 S | 9/2013 | Schul |
| 8,542,308 B2 | 9/2013 | Ozawa |
| 8,544,643 B2 | 10/2013 | Yim |
| 8,638,392 B2 | 1/2014 | Woodman |
| D699,276 S | 2/2014 | Samuels |
| D699,277 S | 2/2014 | Samuels |
| D700,166 S | 2/2014 | Petersen |
| D701,840 S | 4/2014 | Kazakia |
| D702,276 S | 4/2014 | Woodman |
| 8,727,642 B1 | 5/2014 | Tse |
| 8,743,277 B2 | 6/2014 | Matsuzawa |
| 8,749,966 B1 | 6/2014 | Boudreau |
| 8,792,003 B2 | 7/2014 | Nakamura |
| 8,807,849 B2 | 8/2014 | Apter |
| D713,868 S | 9/2014 | Yang |
| 8,825,124 B1 | 9/2014 | Davies |
| 8,827,219 B2 | 9/2014 | Kessler |
| 8,830,326 B2 | 9/2014 | Kitagawa |
| 8,837,928 B1 | 9/2014 | Clearman |
| 8,870,475 B1 | 10/2014 | Bennett |
| D718,617 S | 12/2014 | Taylor |
| 8,917,496 B2 | 12/2014 | Richardson |
| D722,864 S | 2/2015 | Greenthal |
| D724,637 S | 3/2015 | Samuels |
| D724,638 S | 3/2015 | Samuels |
| 8,970,689 B2 | 3/2015 | Campbell |
| 8,992,102 B1 | 3/2015 | Samuels |
| D727,387 S | 4/2015 | Hasegawa |
| D727,991 S | 4/2015 | Hasegawa |
| 9,004,783 B1 | 4/2015 | Woodman |
| 9,014,766 B2 | 4/2015 | Hu |
| D729,059 S | 5/2015 | Taylor |
| D729,761 S | 5/2015 | Hu |
| D729,762 S | 5/2015 | Hu |
| D730,423 S | 5/2015 | Vandenbussche |
| 9,033,596 B2 | 5/2015 | Samuels |
| D732,593 S | 6/2015 | Woodman |
| D732,933 S | 6/2015 | Jansen |
| 9,097,962 B2 | 8/2015 | Johnson, Sr. |
| 9,122,133 B2 | 9/2015 | Bennett |
| 9,152,019 B2 | 10/2015 | Kintner |
| 9,161,110 B1 | 10/2015 | Patsis |
| 9,204,022 B2 | 12/2015 | Campbell |
| 9,204,710 B1 | 12/2015 | Burns |
| 9,229,299 B1 | 1/2016 | Morlon |
| 9,243,737 B2 | 1/2016 | Hida |
| 9,243,739 B2 | 1/2016 | Peters |
| 9,244,337 B2 | 1/2016 | Weihe |
| D749,164 S | 2/2016 | Raccah |
| 9,268,200 B2 | 2/2016 | Clearman |
| 9,268,201 B1 | 2/2016 | Montgomery |
| D750,687 S | 3/2016 | Samuels |
| 9,282,226 B2 | 3/2016 | Samuels |
| 9,297,616 B2 | 3/2016 | Daniel |
| 9,297,640 B2 | 3/2016 | Tassakos |
| 9,300,345 B2 | 3/2016 | Johnson |
| D754,238 S | 4/2016 | Woodman |
| 9,357,115 B2 | 5/2016 | Campbell |
| 9,360,742 B1 | 6/2016 | Harrison |
| 9,372,383 B2 | 6/2016 | Johnson |
| 9,377,672 B1 | 6/2016 | Clearman |
| 9,395,031 B1 | 7/2016 | Clearman |
| 9,395,603 B2 | 7/2016 | Achenbach |
| D762,536 S | 8/2016 | Wurzer |
| D764,566 S | 8/2016 | Bennett |
| D764,567 S | 8/2016 | Bennett |
| 9,423,673 B2 | 8/2016 | Clearman |
| 9,426,341 B1 | 8/2016 | Baldrige |
| 9,507,245 B1 | 11/2016 | Druker |
| 9,513,535 B2 | 12/2016 | Bennett |
| 9,521,302 B2 | 12/2016 | Samuels |
| D776,746 S | 1/2017 | Bennett |
| D777,240 S | 1/2017 | Costa |
| 9,551,915 B2 | 1/2017 | Clearman |
| D780,249 S | 2/2017 | Ramsthaler |
| 9,588,407 B1 | 3/2017 | Harrison |
| 9,596,388 B2 | 3/2017 | Woodman |
| 9,622,556 B2 | 4/2017 | Fathollahi |
| 9,625,791 B2 | 4/2017 | Harrison |
| 9,628,681 B2 | 4/2017 | Clearman |
| 9,635,226 B2 | 4/2017 | Samuels |
| 9,661,197 B2 | 5/2017 | Clearman |
| 9,681,029 B2 | 6/2017 | Harrison |
| 9,699,360 B2 | 7/2017 | Woodman |
| D795,061 S | 8/2017 | Bacallao |
| 9,736,376 B1 | 8/2017 | Holway |
| 9,763,548 B2 | 9/2017 | Theising |
| 9,772,542 B2 | 9/2017 | Clearman |
| D799,953 S | 10/2017 | Papafagos |
| D800,205 S | 10/2017 | Harrison |
| D800,822 S | 10/2017 | Costa |
| 9,823,549 B1 | 11/2017 | Miyashita |
| 9,829,772 B2 | 11/2017 | Harrison |
| 9,851,622 B2 | 12/2017 | Song |
| 9,864,257 B1 | 1/2018 | Wroblewski |
| 9,880,451 B2 | 1/2018 | Clearman |
| D811,335 S | 2/2018 | Weng |
| 9,904,148 B1 | 2/2018 | Druker |
| 9,915,855 B1 | 3/2018 | Miyashita |
| 9,926,029 B2 | 3/2018 | Rucker |
| 9,930,231 B2 | 3/2018 | Clearman |
| D818,517 S | 5/2018 | Szarawarski |
| 10,025,166 B2 | 7/2018 | Clearman |
| 10,094,513 B2 | 10/2018 | Bennett |
| D837,623 S | 1/2019 | Powers |
| D839,946 S | 2/2019 | De Vries |
| D840,795 S | 2/2019 | Tribbett |
| D841,721 S | 2/2019 | Muhlenkamp, IV |
| D847,609 S | 5/2019 | Ng |
| 10,306,115 B2 | 5/2019 | Samuels |
| 10,356,291 B2 | 7/2019 | Woodman |
| 10,416,538 B2 | 9/2019 | Clearman |
| 10,511,750 B2 | 12/2019 | Clearman |
| D873,833 S | 1/2020 | Leimer |
| 10,539,858 B2 | 1/2020 | Clearman |
| 10,547,769 B2 | 1/2020 | Harrison |
| D874,248 S | 2/2020 | Stekr |
| D879,762 S | 3/2020 | Luo |
| 10,694,083 B1 | 6/2020 | Thomas |
| D894,256 S | 8/2020 | Vitale |
| D905,786 S | 12/2020 | Vitale |
| 10,928,711 B2 | 2/2021 | Vitale |
| D947,357 S | 3/2022 | Chen |
| 11,641,528 B2 | 5/2023 | Douady |
| D989,164 S | 6/2023 | Bergman |
| D989,165 S | 6/2023 | Vitale |
| D990,546 S | 6/2023 | Harrison |
| 11,721,712 B2 | 8/2023 | Vitale |
| D1,003,979 S | 11/2023 | Alberstein |
| 11,849,248 B2 | 12/2023 | Chinnaiyan |
| 11,882,351 B2 | 1/2024 | Santos |
| 12,189,277 B2 | 1/2025 | Griggs |
| 2001/0017339 A1 | 8/2001 | Brotz |
| 2001/0043281 A1 | 11/2001 | Onuki |
| 2002/0005907 A1 | 1/2002 | Alten |
| 2002/0046218 A1 | 4/2002 | Gilbert |

(56) References Cited

U.S. PATENT DOCUMENTS

| | | |
|---|---|---|
| 2002/0101534 A1 | 8/2002 | Liu |
| 2002/0178116 A1 | 11/2002 | Yamasaki |
| 2003/0035052 A1 | 2/2003 | Baron |
| 2003/0085244 A1 | 5/2003 | Parsons |
| 2003/0104806 A1 | 6/2003 | Ruef |
| 2003/0115662 A1 | 6/2003 | Dobbie |
| 2003/0156212 A1 | 8/2003 | Kingetsu |
| 2003/0179306 A1 | 9/2003 | Lee |
| 2004/0066457 A1 | 4/2004 | Silverstein |
| 2004/0076415 A1 | 4/2004 | Da Silva |
| 2004/0095506 A1 | 5/2004 | Scott |
| 2004/0201745 A1 | 10/2004 | Wess |
| 2004/0212687 A1 | 10/2004 | Patwari |
| 2004/0223752 A1 | 11/2004 | Ghanouni |
| 2005/0025472 A1 | 2/2005 | Sugita |
| 2005/0041966 A1 | 2/2005 | Johnson |
| 2005/0122424 A1 | 6/2005 | Overstreet |
| 2005/0190263 A1 | 9/2005 | Monroe |
| 2005/0265711 A1 | 12/2005 | Heibel |
| 2006/0007551 A1 | 1/2006 | Sakurai |
| 2006/0015664 A1 | 1/2006 | Zhang |
| 2006/0022108 A1 | 2/2006 | Kuga |
| 2006/0061663 A1 | 3/2006 | Park |
| 2006/0066753 A1 | 3/2006 | Gennetten |
| 2006/0072020 A1 | 4/2006 | McCutchen |
| 2006/0098966 A1 | 5/2006 | Takahashi |
| 2006/0139459 A1 | 6/2006 | Zhong |
| 2006/0177215 A1 | 8/2006 | Johnson |
| 2006/0257137 A1 | 11/2006 | Fromm |
| 2006/0262365 A1 | 11/2006 | Imao |
| 2006/0274157 A1 | 12/2006 | Levien |
| 2006/0274493 A1 | 12/2006 | Richardson |
| 2007/0024734 A1 | 2/2007 | Headley |
| 2007/0025711 A1 | 2/2007 | Marcus |
| 2007/0053680 A1 | 3/2007 | Fromm |
| 2007/0071423 A1 | 3/2007 | Fantone |
| 2007/0077062 A1 | 4/2007 | Senba |
| 2007/0109417 A1 | 5/2007 | Hyttfors |
| 2007/0126883 A1 | 6/2007 | Ishige |
| 2007/0140686 A1 | 6/2007 | Misawa |
| 2007/0154254 A1 | 7/2007 | Bevirt |
| 2007/0242134 A1 | 10/2007 | Zernov |
| 2007/0244634 A1 | 10/2007 | Koch |
| 2007/0268382 A1 | 11/2007 | Shiomi |
| 2007/0268588 A1 | 11/2007 | Elias |
| 2008/0011344 A1 | 1/2008 | Barker |
| 2008/0023607 A1 | 1/2008 | Barker |
| 2008/0063392 A1 | 3/2008 | Ahn |
| 2008/0072163 A1 | 3/2008 | Teng |
| 2008/0074487 A1 | 3/2008 | Ryckman |
| 2008/0100712 A1 | 5/2008 | Hayes |
| 2008/0107414 A1 | 5/2008 | Showalter |
| 2008/0117328 A1 | 5/2008 | Daoud |
| 2008/0122958 A1 | 5/2008 | Huseth |
| 2008/0180537 A1 | 7/2008 | Weinberg |
| 2008/0237414 A1 | 10/2008 | Lien |
| 2008/0248703 A1 | 10/2008 | Russell |
| 2008/0266389 A1 | 10/2008 | Dewind |
| 2008/0267613 A1 | 10/2008 | Darrow |
| 2008/0316327 A1 | 12/2008 | Steinberg |
| 2008/0316734 A1 | 12/2008 | Spartano |
| 2009/0003821 A1 | 1/2009 | Son |
| 2009/0032420 A1 | 2/2009 | Zenzai |
| 2009/0059064 A1 | 3/2009 | Terakado |
| 2009/0109286 A1 | 4/2009 | Ennis |
| 2009/0110380 A1 | 4/2009 | Fantone |
| 2009/0111543 A1 | 4/2009 | Tai |
| 2009/0173863 A1 | 7/2009 | Crown |
| 2009/0206077 A1 | 8/2009 | Melmon |
| 2009/0283184 A1 | 11/2009 | Han |
| 2009/0321483 A1 | 12/2009 | Froloff |
| 2010/0060747 A1 | 3/2010 | Woodman |
| 2010/0061711 A1 | 3/2010 | Woodman |
| 2010/0079607 A1 | 4/2010 | Won |
| 2010/0118158 A1 | 5/2010 | Boland |
| 2010/0141762 A1 | 6/2010 | Siann |
| 2010/0205537 A1 | 8/2010 | Knighton |
| 2010/0220188 A1 | 9/2010 | Renkis |
| 2010/0229450 A1 | 9/2010 | Becker |
| 2010/0246669 A1 | 9/2010 | Harel |
| 2010/0252188 A1 | 10/2010 | Inanami |
| 2010/0253832 A1 | 10/2010 | Duparre |
| 2010/0266273 A1 | 10/2010 | Wood |
| 2010/0283843 A1 | 11/2010 | Cai |
| 2010/0289904 A1 | 11/2010 | Zhang |
| 2010/0299814 A1 | 12/2010 | Celona |
| 2010/0333155 A1 | 12/2010 | Royall |
| 2011/0001834 A1 | 1/2011 | Herrell |
| 2011/0042530 A1 | 2/2011 | Phillips |
| 2011/0064401 A1 | 3/2011 | Desorbo |
| 2011/0067322 A1* | 3/2011 | Taschek ............... E04H 12/003 52/79.7 |
| 2011/0129210 A1 | 6/2011 | McGucken |
| 2011/0138673 A1 | 6/2011 | Deros |
| 2011/0147245 A1 | 6/2011 | Yim |
| 2011/0211820 A1 | 9/2011 | Yim |
| 2011/0216195 A1 | 9/2011 | Tanaka |
| 2011/0224798 A1 | 9/2011 | Caillouette |
| 2011/0252188 A1 | 10/2011 | Weingarten |
| 2011/0260022 A1 | 10/2011 | Lin |
| 2011/0297578 A1 | 12/2011 | Stiehl |
| 2011/0298970 A1 | 12/2011 | Shinohara |
| 2011/0317065 A1 | 12/2011 | Lin |
| 2012/0017922 A1 | 1/2012 | Hirshberg |
| 2012/0043236 A1 | 2/2012 | Szucs |
| 2012/0070223 A1 | 3/2012 | Wimberley |
| 2012/0099849 A1 | 4/2012 | Onishi |
| 2012/0120236 A1 | 5/2012 | Xiao |
| 2012/0133758 A1 | 5/2012 | Foss |
| 2012/0195585 A1 | 8/2012 | Wagner |
| 2012/0224078 A1 | 9/2012 | Woodman |
| 2012/0228346 A1 | 9/2012 | Huang |
| 2012/0240444 A1 | 9/2012 | Russell |
| 2012/0242785 A1 | 9/2012 | Sasagawa |
| 2012/0242786 A1 | 9/2012 | Sasagawa |
| 2012/0262618 A1 | 10/2012 | Weakly |
| 2012/0288269 A1 | 11/2012 | Jensen |
| 2012/0312309 A1 | 12/2012 | Zimmerman |
| 2012/0315813 A1 | 12/2012 | Rossini |
| 2012/0324682 A1 | 12/2012 | Ballentine |
| 2013/0029515 A1 | 1/2013 | Lin |
| 2013/0057758 A1 | 3/2013 | Woodman |
| 2013/0082963 A1 | 4/2013 | Chu |
| 2013/0107111 A1 | 5/2013 | Campbell |
| 2013/0127309 A1 | 5/2013 | Wyner |
| 2013/0148951 A1 | 6/2013 | Zhang |
| 2013/0170823 A1 | 7/2013 | McDonald |
| 2013/0184033 A1 | 7/2013 | Willenborg |
| 2013/0186310 A1 | 7/2013 | Lymberis |
| 2013/0250134 A1 | 9/2013 | McCauley |
| 2013/0263865 A1 | 10/2013 | Khast |
| 2013/0306689 A1 | 11/2013 | Johnson |
| 2013/0315577 A1 | 11/2013 | Clark |
| 2013/0324189 A1 | 12/2013 | Katis |
| 2013/0331976 A1 | 12/2013 | Freeman |
| 2014/0016922 A1 | 1/2014 | Greenthal |
| 2014/0027591 A1 | 1/2014 | Fountain |
| 2014/0028484 A1 | 1/2014 | Ho |
| 2014/0036420 A1 | 2/2014 | Chen |
| 2014/0050468 A1 | 2/2014 | Henry |
| 2014/0060582 A1 | 3/2014 | Hartranft |
| 2014/0066144 A1 | 3/2014 | Hong |
| 2014/0069824 A1 | 3/2014 | Kalashnikov |
| 2014/0090205 A1 | 4/2014 | Sarnowski |
| 2014/0098241 A1 | 4/2014 | Stout |
| 2014/0099093 A1 | 4/2014 | Johnson |
| 2014/0104447 A1 | 4/2014 | Woodman |
| 2014/0105589 A1 | 4/2014 | Samuels |
| 2014/0190841 A1 | 7/2014 | Nash |
| 2014/0226268 A1 | 8/2014 | Oneill |
| 2014/0231475 A1 | 8/2014 | Donnelly |
| 2014/0252188 A1 | 9/2014 | Webster |
| 2014/0267894 A1 | 9/2014 | Campbell |
| 2014/0310915 A1 | 10/2014 | Tung |

(56) References Cited

U.S. PATENT DOCUMENTS

| | | |
|---|---|---|
| 2014/0321843 A1 | 10/2014 | Hulse |
| 2014/0353178 A1 | 12/2014 | Kim |
| 2015/0030320 A1 | 1/2015 | Clearman |
| 2015/0040917 A1 | 2/2015 | Gottsch |
| 2015/0078737 A1 | 3/2015 | Albonico |
| 2015/0122849 A1 | 5/2015 | Jones |
| 2015/0130998 A1 | 5/2015 | Campbell |
| 2015/0136620 A1 | 5/2015 | Williams |
| 2015/0143618 A1 | 5/2015 | Pereira |
| 2015/0171404 A1 | 6/2015 | Kwon |
| 2015/0177597 A1 | 6/2015 | Harrison |
| 2015/0180527 A1 | 6/2015 | Fathollahi |
| 2015/0192841 A1 | 7/2015 | Bennett |
| 2015/0195436 A1 | 7/2015 | Samuels |
| 2015/0201113 A1 | 7/2015 | Wood |
| 2015/0234258 A1 | 8/2015 | Hida |
| 2015/0253651 A1 | 9/2015 | Russell |
| 2015/0264226 A1 | 9/2015 | Gafni |
| 2015/0286115 A1 | 10/2015 | Koch |
| 2015/0286117 A1 | 10/2015 | Sung |
| 2015/0288892 A1 | 10/2015 | Frank |
| 2015/0305518 A1 | 10/2015 | Galant |
| 2015/0312446 A1 | 10/2015 | Blackman |
| 2015/0316205 A1 | 11/2015 | Bennett |
| 2015/0323856 A1 | 11/2015 | Nordhaug |
| 2015/0332129 A1 | 11/2015 | Murphy |
| 2015/0346588 A1 | 12/2015 | Hudson |
| 2015/0366093 A1 | 12/2015 | Battista |
| 2015/0372705 A1 | 12/2015 | Fiorentino |
| 2016/0077409 A1 | 3/2016 | Samuels |
| 2016/0100083 A1 | 4/2016 | Harrison |
| 2016/0119516 A1 | 4/2016 | Clearman |
| 2016/0131963 A1 | 5/2016 | Clearman |
| 2016/0131964 A1 | 5/2016 | Basulto |
| 2016/0134788 A1 | 5/2016 | Clearman |
| 2016/0139494 A1 | 5/2016 | Tien |
| 2016/0186919 A1 | 6/2016 | Zhao |
| 2016/0209733 A1 | 7/2016 | Akai |
| 2016/0216597 A1 | 7/2016 | Lim |
| 2016/0219202 A1 | 7/2016 | Barros |
| 2016/0269629 A1 | 9/2016 | Martin |
| 2016/0309064 A1 | 10/2016 | Woodman |
| 2016/0330352 A1 | 11/2016 | Samuels |
| 2016/0355121 A1 | 12/2016 | Gertsma |
| 2016/0373623 A1 | 12/2016 | Woodman |
| 2017/0050794 A1 | 2/2017 | Clark |
| 2017/0059967 A1 | 3/2017 | Harrison |
| 2017/0060184 A1 | 3/2017 | Ranetkins |
| 2017/0090273 A1 | 3/2017 | Clearman |
| 2017/0108759 A1 | 4/2017 | Clearman |
| 2017/0142300 A1 | 5/2017 | Rice |
| 2017/0176843 A1 | 6/2017 | Yamakose |
| 2017/0223238 A1 | 8/2017 | Clearman |
| 2017/0235213 A1 | 8/2017 | Clearman |
| 2017/0255082 A1 | 9/2017 | Song |
| 2017/0272626 A1 | 9/2017 | Harrison |
| 2017/0289413 A1 | 10/2017 | Samuels |
| 2017/0306672 A1 | 10/2017 | Romero Contreras |
| 2017/0324890 A1 | 11/2017 | Moskovchenko |
| 2017/0339319 A1 | 11/2017 | Woodman |
| 2018/0059514 A1 | 3/2018 | Druker |
| 2018/0095343 A1 | 4/2018 | Wroblewski |
| 2018/0136546 A1 | 5/2018 | Clearman |
| 2018/0157153 A1 | 6/2018 | Clearman |
| 2018/0220050 A1 | 8/2018 | Clearman |
| 2019/0025675 A1 | 1/2019 | Druker |
| 2019/0238729 A1 | 8/2019 | Samuels |
| 2019/0258142 A1 | 8/2019 | Liu |
| 2019/0281197 A1 | 9/2019 | Woodman |
| 2019/0342473 A1 | 11/2019 | Clearman |
| 2019/0342474 A1 | 11/2019 | Woodman |
| 2019/0369466 A1 | 12/2019 | Clearman |
| 2020/0159091 A1 | 5/2020 | Vitale |
| 2021/0112182 A1 | 4/2021 | Crow |
| 2021/0173288 A1 | 6/2021 | Vitale |
| 2021/0306536 A1 | 9/2021 | Vitale |
| 2022/0291573 A1 | 9/2022 | Hilliard |
| 2023/0057637 A1 | 2/2023 | Krishnamurthy |
| 2023/0236481 A1 | 7/2023 | Vitale |
| 2023/0324772 A1 | 10/2023 | Russell |
| 2023/0324774 A1 | 10/2023 | Muhlenkamp, IV |
| 2023/0328432 A1 | 10/2023 | Tisch |

FOREIGN PATENT DOCUMENTS

| | | |
|---|---|---|
| CN | 100432830 | 11/2008 |
| CN | 201796220 U | 4/2011 |
| CN | 301786205 S | 1/2012 |
| CN | 202353622 U | 7/2012 |
| CN | 302436013 S | 5/2013 |
| CN | 302579018 S | 9/2013 |
| CN | 302748860 S | 2/2014 |
| CN | 302790142 S | 4/2014 |
| CN | 303181818 S | 4/2015 |
| CN | 303248953 S | 6/2015 |
| CN | 104871082 A | 8/2015 |
| CN | 105474089 | 4/2016 |
| CN | 303775763 S | 8/2016 |
| CN | 106164768 | 11/2016 |
| CN | 303907057 S | 11/2016 |
| CN | 303988503 S | 12/2016 |
| CN | 106516141 A | 3/2017 |
| CN | 304130943 S | 5/2017 |
| CN | 304232547 S | 8/2017 |
| CN | 206579852 U | 10/2017 |
| CN | 304363793 S | 11/2017 |
| CN | 304461932 S | 1/2018 |
| CN | 304723510 S | 7/2018 |
| CN | 109375454 | 2/2019 |
| CN | 110426910 | 11/2019 |
| CN | 305434602 | 11/2019 |
| CN | 305689289 | 4/2020 |
| CN | 111120817 A | 5/2020 |
| CN | 305905490 | 7/2020 |
| CN | 211375284 U | 8/2020 |
| CN | 306285361 | 1/2021 |
| CN | 213576439 U | 6/2021 |
| CN | 218226303 U | 1/2023 |
| CN | 218830398 U | 4/2023 |
| DE | 202005004068 U1 | 6/2005 |
| DE | 202013005239 | 7/2013 |
| DE | 202014011346 | 8/2019 |
| EP | 0845399 A2 | 6/1998 |
| EP | 1160499 | 12/2001 |
| EP | 1653423 A1 | 5/2006 |
| EP | 2464096 A1 | 6/2012 |
| EP | 2906993 | 8/2015 |
| EP | 3025193 | 6/2016 |
| EP | 3092527 | 11/2016 |
| GB | 2018929 A | 10/1979 |
| GB | 2363028 A | 12/2001 |
| GB | 6006189 | 1/2017 |
| GB | 2546075 A | 7/2017 |
| JP | H05304625 A | 11/1993 |
| JP | 2002006381 A * | 1/2002 |
| JP | 2003029330 A | 1/2003 |
| JP | 2003330090 A | 11/2003 |
| JP | 2004080256 A | 3/2004 |
| JP | 2004221775 A | 8/2004 |
| JP | 2005142671 A | 6/2005 |
| JP | D1265949 | 3/2006 |
| JP | 2007003648 A * | 1/2007 |
| JP | 2008109364 A | 5/2008 |
| JP | 2008158143 A * | 7/2008 |
| JP | D1400935 | 11/2010 |
| JP | 2011193209 A | 9/2011 |
| JP | 2014191189 A * | 10/2014 |
| WO | 2004023795 A1 | 3/2004 |
| WO | 2004081713 A2 | 9/2004 |
| WO | 2005096760 A2 | 10/2005 |
| WO | 2005098304 A1 | 10/2005 |
| WO | 2007128317 A1 | 11/2007 |
| WO | 2007130146 A1 | 11/2007 |
| WO | 2010005975 A1 | 1/2010 |

(56) References Cited

FOREIGN PATENT DOCUMENTS

| | | |
|---|---|---|
| WO | 2010005976 A1 | 1/2010 |
| WO | 2013067340 | 5/2013 |
| WO | 2014062360 A1 | 4/2014 |
| WO | 2015013054 A1 | 1/2015 |
| WO | 2015102888 A1 | 7/2015 |
| WO | 2016053472 | 4/2016 |
| WO | 2016064468 | 4/2016 |
| WO | 2016073188 | 5/2016 |

OTHER PUBLICATIONS

Spypoint Xcel Action Camera Adhesive Mount XHD-AM. Online, published date unknown. Retrieved on May 14, 2020 from URL: https://www.opticsplanet.com/spy-point-xcel-action-camera-adhesive-mount.html, 1 page.

Sun, X. et al. "Region of Interest Extraction and Virtual Camera Control Based on Panoramic Video Capturing," IEEE Transactions on Multimedia, 2005, pp. 981-990, vol. 7, issue 5.

Supplementary European Search Report for European Patent Application No. EP 14829354, Aug. 16, 2016, 6 Pages.

The Telesin Tripod Mount Adapter, Telesin Tripod Mount Adapter for GoPro Hero 11/10/9/8/Max—telesinstore.

U.S. Appl. No. 16/697,947, filed Nov. 27, 2019, Vitale et al., 77 pages.

United States Advisory Action, U.S. Appl. No. 14/521,458, Aug. 12, 2016, 2 pages.

United States Advisory Action, U.S. Appl. No. 14/521,458, Jun. 20, 2016, 4 pages.

United States Advisory Action, U.S. Appl. No. 14/947,766, Aug. 29, 2016, 3 pages.

United States Office Action for U.S. Appl. No. 14/148,536, Jul. 9, 2014, 9 pages.

United States Office Action for U.S. Appl. No. 14/536,683, Dec. 18, 2014, 14 Pages.

United States Office Action for U.S. Appl. No. 14/536,683, Jun. 9, 2015, 16 pages.

United States Office Action for U.S. Appl. No. 14/536,683, Sep. 21, 2015. 15 Pages.

United States Office Action for U.S. Appl. No. 13/666,807, Oct. 6, 2014, 11 pages.

United States Office Action for U.S. Appl. No. 14/149,502, Jul. 9, 2014, 8 pages.

United States Office Action for U.S. Appl. No. 14/495,673, Jan. 28, 2015, 16 pages.

United States Office Action for U.S. Appl. No. 14/495,673, Mar. 24, 2015, 15 pages.

United States Office Action for U.S. Appl. No. 14/495,673, Nov. 7, 2014, 16 pages.

United States Office Action for U.S. Appl. No. 14/604,118, Apr. 14, 2015, 11 pages.

United States Office Action, U.S. Appl. No. 14/459,650, Jun. 10, 2015, 7 pages.

United States Office Action, U.S. Appl. No. 14/132,554, Apr. 24, 2015, 13 pages.

United States Office Action, U.S. Appl. No. 14/132,554, Dec. 3, 2015, 28 pages.

United States Office Action, U.S. Appl. No. 14/132,554, Feb. 26, 2016, 31 pages.

United States Office Action, U.S. Appl. No. 14/854,040, Feb. 4, 2016, 7 pages.

United States Office Action, U.S. Appl. No. 14/521,458, Feb. 25, 2016, 13 pages.

United States Office Action, U.S. Appl. No. 14/521,458, Jul. 28, 2015, 12 pages.

United States Office Action, U.S. Appl. No. 14/521,458, Sep. 20, 2016, 16 pages.

United States Office Action, U.S. Appl. No. 14/606,018, Dec. 2, 2016, 19 pages.

United States Office Action, U.S. Appl. No. 14/606,018, Jan. 13, 2016, 16 pages.

United States Office Action, U.S. Appl. No. 14/606,018, Jul. 15, 2016, 21 pages.

United States Office Action, U.S. Appl. No. 14/606,018, Jun. 2, 2016, 19 pages.

United States Office Action, U.S. Appl. No. 14/947,766, Apr. 21, 2016, 13 pages.

United States Office Action, U.S. Appl. No. 14/947,766, Aug. 16, 2016, 6 pages.

United States Office Action, U.S. Appl. No. 14/947,766, Nov. 9, 2016, 11 pages.

United States Office Action, U.S. Appl. No. 15/180,535, Jan. 17, 2017, 12 pages.

United States Office Action, U.S. Appl. No. 15/187,708, Oct. 7, 2016, 13 pages.

Vilta-G-Freevision Intelligent Technology, URL:http://www.fvshare.com/en/viltag, retrieved on Feb. 22, 2020, 8 pages.

Vixen Polarie Star Tracker Review. [online] Published date Mar. 22, 2013. Retrieved on Oct. 25, 2016 from <URL: https://www.ephotozine.com/article/vixen-polarie-star-tracker-review-21516> 6 pages.

Volk, W., 'Go Pro's Digital Hero Camera,' Divester, Posted Dec. 5, 2008, [Online] [Retrieved on Sep. 16, 2009] Retrieved from the Internet<URL:http://www.divester.com/2006/12/05/go-pro-digital-hero-camera/>. 3 pages.

YourDealer, 'Aputure Gigtube Digital Screen Remote Viewfinder gives you more remote control with most DSLRs,' 2009 Deals-World.com, Apr. 11, 2010, 3 pages, [Online] [Retrieved on Feb. 11, 2015] Retrieved from the Internet <URL:http://www.deals-world.com/deals/2010/04/11/aputure-gigtube-digital-screen-remote-viewfinder-gives-you-more-remote-control-with-most-dslrs/, Apr. 11, 2010.

youtube.com, Video for 'The Air Pro Wi-Fi Podz,' Aug. 18, 2014, 1 page, [Online] [Retrieved Oct. 11, 2016] Can be retrieved from the internet <URL:https://www.youtube.com/watch?v=YpWZ44aCdGA>.

youtube.com, Video for 'The WiFi PODZ Tutorial,' Jun. 15, 2012, 2 pages. [Online] [Retrieved Oct. 11, 2016] Can be retrieved from the internet <URL:https://www.youtube.com/watch?v=kGGwGobzQBg>.

Extended European Search Report issued in App. No. EP24164959, dated May 27, 2024, 7 pages.

Insta360 GO 3 Pivot Stand, Insta360 Store, https://store.insta360.com/product/go-3-pivot-stand, 5 pages printed Apr. 19, 2024.

Insta360 GO 3 Quick Release Mount, insta360.com, https://store.insta360.com/product/go-3-quick-release-mount, 6 pages, printed Apr. 19, 2024.

Ulanzi Mount 1 (Ulanzi Mount 1), Ulanzi Falcam GoPro Mount to DJI Action Mount Magnetic Base 3234, https://www.ulanzi.com/products/falcam-gopro-mount-to-dji-action-mount-magnetic-base-3234?currency=USD&variant=43790033617117&utm_medium=cpc&utm_source=google&utm_campaign=Google%20Shopping&stkn=100b30dffdd7&gad_source=1&gclid=Cj0KCQiAz8GuBhCxARIsAOpzk8yq_enSf9_1u-apX_iT9dlSxJeB0YwposKpfiMltKxjmpkwSGC32ksaAugHEALw_wcB, Retrieved from Internet Mar. 26, 2024.

Ulanzi Mount 2 (Ulanzi Mount 2), Ulanzi Falcam F22 GoPro Mount to DJI Action Mount Magnetic Base 3235, https://www.ulanzi.com/products/falcam-f22-gopro-mount-to-dji-action-mount-magnetic-base-3235, Retrieved from Internet Mar. 26, 2024.

Ulanzi Mount 3 (Ulanzi Mount 3), Ulanzi Go-Quick II Magnetic Quick Release ¼" Screw Adapter Mount Set C045GBB1, https://www.ulanzi.com/products/ulanzi-go-quick-ii-magnetic-quick-release-1-4-screw-adapter-mount-set-c045gbb1, Retrieved from Internet Mar. 26, 2024.

Ulanzi Mount 4 (Ulanzi Mount 4) Ulanzi Go Quick II Quick Release Basic Set, https://www.ulanzi.com/products/ulanzi-go-quick-ii-quick-release-basic-set, Retrieved from Internet Mar. 26, 2024.

Day of the (most recent) update in DPMAregister (German Patent and Trademark Office) Jul. 5, 2014 (Jul. 5, 2014), 19 Pages, [Online] retrieved from DPMAregister <URL:https://register.dpma.de/DPMAregister/pat/register/PAT2020130052392_2015-10-137AKZ=2020130052392&VIEW=pdf >, (used to establish publication date of 'File Inspection' publication by Maas).

(56) References Cited

OTHER PUBLICATIONS

GoPro Hero 3 Sports Wrist Camera Review, PaddleDogNation, 2006, 6 pages, [Online] [Retrieved on Aug. 8, 2007] Retrieved from the Internet <URL:http://paddledognation.com/Reviews/PaddlingGearReviews/He-ro3Ca . . . >.
Tekkno Trading Project—Brandnews,' NSP, Jan. 2008, p. 59.
"WoCase 360 Degree Panoramic Swiveling Glove Mount Hand Mount (Compatible with left handed) for GoPro HERO4 HERO3+3 2 1 Cameras (Rotary Mount, Retail Package, Gifting Ready)," Amazon.com, Jul. 11, 2013, 8 pages, [online] [retrieved on Feb. 22, 2020] Retrieved from the internet <URL:http://www.amazon.com/WoCase-Panoramic-Swiveling-Compatible-Cameras/dp/B00HMLYMHW/ref=pd_sim_sbs_421_1?ie=UTF8&dpID=51%2BoLD9jb2L&dpSrc=sims&preST=_AC_UL160_SR160%2C160_&refRID=097XMG8E8BDXQAJRSS0D>.
Canon, 'Wireless file Transmitter WFT-EF E,' 2009, 132 pages, [Online] [Retrieved on Feb. 11, 2015] Retrieved from the Internet<URL:http://shuttersnitch.com/downloads/manuals/canon/wft-e5-en.pdf.
CheesyCam.com, 'Remote LCD Live View + Remote Shutter for DSLR Video—Exciting!', Jul. 16, 2010, 12 pages, [Online] [Retrieved on Feb. 11, 2015] Retrieved from the Internet<URL:http://cheesycam.com/remote-lcd-live-view-for-dslr-video-exciting/>.
Chinese Office Action dated May 30, 2018 for CN Application No. 201480072371.9, (6 pages).
Design U.S. Appl. No. 29/661,818, filed Aug. 31, 2018, Huy Phuong Nguyen et al., 79 pages.
Design U.S. Appl. No. 29/661,819, filed Aug. 31, 2018, Vitale et al., 80 pages.
Design U.S. Appl. No. 29/681,087, filed Feb. 22, 2019, Vitale et al., 41 pages.
Design U.S. Appl. No. 29/694,559, filed Jun. 11, 2019, Coster et al., 28 pages.
Design U.S. Appl. No. 29/706,013, filed Sep. 17, 2019, Muhlenkamp et al., 97 pages.
Double male GoPro bar by eliotg Thingiverse. [online] Published on Jan. 16, 2016. Retrieved from URL:https://www.thingiverse.com/thing: 1273246 (2 pages).
European Search Report for European Patent Application No. EP 14876907.8, Jan. 10, 2017, 8 Pages.
Fantaseal Action Camera Bike Mount Aluminum Alloy 2-Rail Saddle Bike Seat Mount for GoPro Pro Seat Rail Mount GoPro Bike Mount GoPro Bicycle Seat Rack Mount for GoPro Garmin Virb XE SJCAM DBPOWER-BK. Online, published date unknown. Retrieved on May 23, 2018 from URL: https://www.amazon.com/fantaseal-Action-Camera-Bi (1 page).
File Inspection—DE 20 2013 005 239.2, (MAAS) Retrieved on Oct. 13, 2015 (Oct. 13, 2015) entire document, 4 Pages, [Online] retrieved from DPMAregister <URL:https://registerdpma.de/DPMAregister/pat/PatAkteneinsicht?akz=2020130052392>.
Guarnera, M. et al., 'Manet: Possible Applications with PDA in Wireless Imagining Environment', IEEE International Symposium, Sep. 2002, vol. 7, pp. 2394-2398, vol. 5, pp. 15-18.
http://web.archive.org/web/20190503083635/http://www.fvshare.com:80/en/viltag Note—wayback machine link may take extra time to load pictures May 3, 2019, 8 pages.
https://www.amazon.com/Adjust-Straight-Joints-HSU-Direction/dp/B01IQPD9DU/ref=sr_1_1?keywords=long+and+short+straight+joint+tripod+mount+adapter+for+GoPro+hero+5+4+3&qid=1582047554&sr=8-1, retrieved Feb. 22, 2020, 9 pages.
https://www.amazon.com/Fotasy-Aluminum-Folding-Release-Cameras/dp/B0058FJHR4/ref=sr_1_8?keywords=z+tripod+mount&qid=1582047698&sr=8-8, retrieved Feb. 22, 2020, 10 pages.
https://www.amazon.com/Tripod-Pistol-Cameras-Weighing-2-5lbs/dp/B0739YGN9M/ref=sr_1_1?keywords=Handheld+Grip+Mini+Tripod+Stand+for+DC+Digital+Camera+Camcorder&qid=1582047442&sr=8-1, Retrieved Feb. 22, 2020, 9 pages.
https://www.youtube.com/watch?v=sOfMcPM5Xg4 (@7:08 mark), retrieved Feb. 22, 2020. No pdf attached. please see video at link.

Huang, J., "Part 19—Oct. 21: Interbike Bits and Baubles," Interbike Show, Las Vegas, Nevada, USA, Sep. 22-26, 2008, Cyclingnews.com, [Online] [Retrieved on Oct. 21, 2008] Retrieved from the Internet<URL:http://www.cyclingnews.com/tech/2008/shows/interbike08/?i- d=result . . . >. 3 pages.
IPhone X Outfitting it for Adventure. [online] Published on Nov. 29, 2017. Retrieved from URL: https://explore.globalcreations.com/reviews/tools/outfitting-iphone-x-adventure/ (13 pages).
Instagram Account for "mygomount", First post uploaded on Mar. 19, 2017, 3 Pages, [online] Retrieved on Jul. 25, 2017] Retrieved from the internet <URL:https://www.instagmm.com/mygomount/?h1=en>.
International Preliminary Report on Patentability for App. No. PCT/US2019/045281, dated Feb. 18, 2021, 7 pages.
International Search Report and Written Opinion for Application No. PCT/US2019/045281, date of mailing Oct. 24, 2019, 10 pages.
International Search Report and Written Opinion for International Application No. PCT/US2014/046552, Aug. 18, 2014, 7 pages.
ION USA, 'Wi-Fi PODZ,' Date Unknown, 2 pages. [Online] [Retrieved Oct. 11, 2016] Retrieved from the internet <https://usa.ioncamera.com/shop/wi-fi-podz/>.
JP-05304625 A, 1993, 5 pages, (Machine Translation available from JPO website), [Online]. [Retrieved Dec. 14, 2014], Retrieved from the Internet < http://dossier1.ipdl.inpit.go.jp/cgi-bin/tran_web_cgi_e-jje?u=http%3A%2F%2Fdossier1% . . . >.
JP5-304625 English Machine Translation available from JPO website. 2016. 7 pages.
Non-Final Rejection for U.S. Appl. No. 13/665,594 mailed Mar. 29, 2013, 25 Pages.
Non-Final Rejection for U.S. Appl. No. 12/498,890 mailed Aug. 30, 2011, 31 Pages.
Norouznezhad, E. et al. "A High Resolution Smart Camera with GigE Vision Extension for Surveillance Applications," Second ACM/IEEE International Conference on Distributed Smart Cameras, 2008, 8 pages.
Office Action for U.S. Appl. No. 14/521,458, Feb. 25, 2016, 13 Pages.
Office Action for U.S. Appl. No. 14/521,458, Jul. 28, 2015, 12 Pages.
PCT International Search Report and Written Opinion for PCT/US15/43958, Nov. 9, 2015, 14 Pages.
PCT International Search Report and Written Opinion for PCT/US15/45403, Nov. 19, 2015, 12 Pages.
PCT International Search Report and Written Opinion for PCT/US15/56478, Jan. 15, 2016, 9 Pages.
PCT International Search Report and Written Opinion for PCT/US2014/058465, Dec. 23, 2014, 17 pages.
PCT International Search Report and Written Opinion for PCT/US2014/070655, Apr. 29, 2015, 13 Pages.
PCT International Search Report and Written Opinion for PCT/US2015/028377, Jul. 24, 2015, 16 Pages.
PCT International Search Report and Written Opinion, PCT Application No. PCT/US2009/049821, Sep. 3, 2009, 8 pages.
PCT International Search Report and Written Opinion, PCT/US2012/063304, Jan. 22, 2013, 7 Pages.
PCT International Search Report for Written Opinion for PCT/US2013/062061, Mar. 3, 2014, 15 Pages.
Pro Camera Bracket Integrated Mount. Online, published date unknown. Retrieved on May 23, 2018 from URL: https://www.annaincycling.conn/pro-camera-bracket-integrated-mount-black-17-pro-saddle-connpatible-prac0129/p612468 (1 page).
Pro Standard, "The Grill Mount Multi-Function Mouth Mount," Date unknown, 8 Pages, [online] Retrieved on Jul. 25, 2017] Retrieved from the internet <URL:https://www.prostandard com/collections/pro-standard/products/the-grill-mount?variant=7683423299>.
Re-Fuel, '24hr Action Pack Battery for GoPro Hero4, Hero3+ & Hero3,' Date Unknown, 5 pages. [Online] [Retrieved Oct. 11, 2016] Retrieved from the internet <https://re-fuel.com/action-packs/24hr-action-battery-pack.html>.
You Tube video clip entitled "Customizable GoPro Cage—Go Tough Sharkcage Unboxing Video," uploaded on Dec. 17, 2014 by

(56) References Cited

OTHER PUBLICATIONS user "Fotodiox Inc". Retrieved from Internet: < https://www.youtube.com/watch?v=x4lij96EtYA: (Year: 2014) 1 page.
Sewing Machine Table Folding Flip Hinge, Uxcell store, Amazon, https://www.amazon.com/uxcell-Sewing-Machine-Folding-Plating/dp/B07GQVB98L, Aug. 22, 2018 (Year: 2018).

* cited by examiner

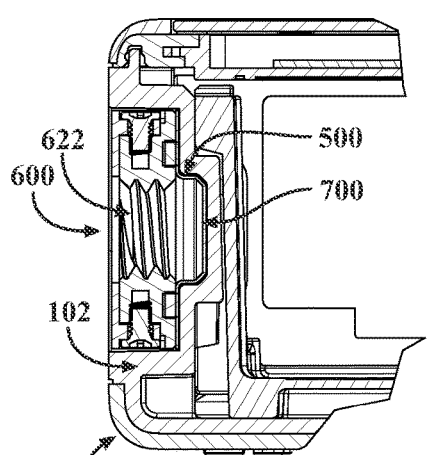
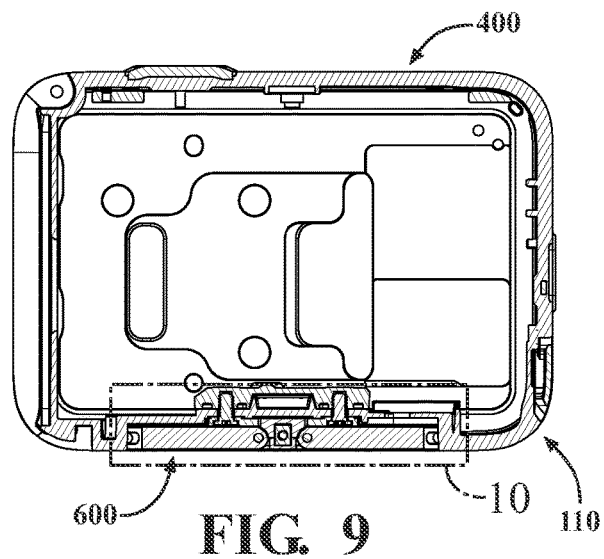
FIG. 8    FIG. 9
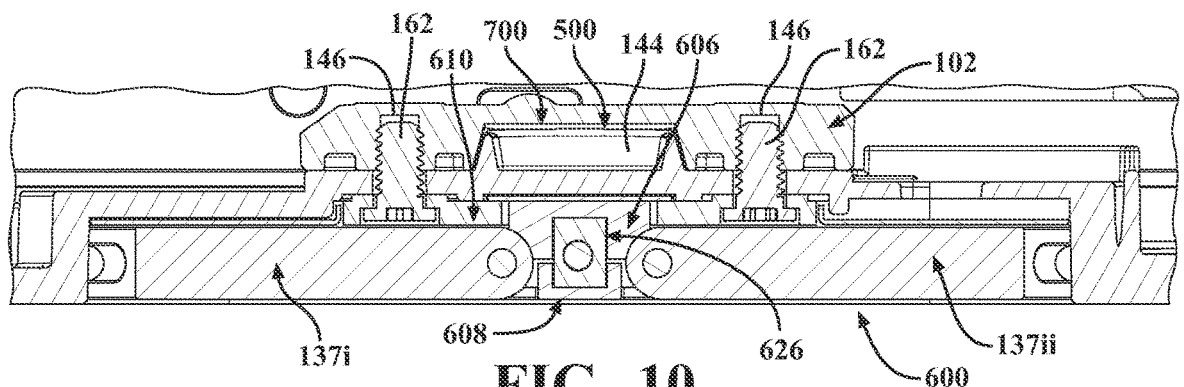
FIG. 10
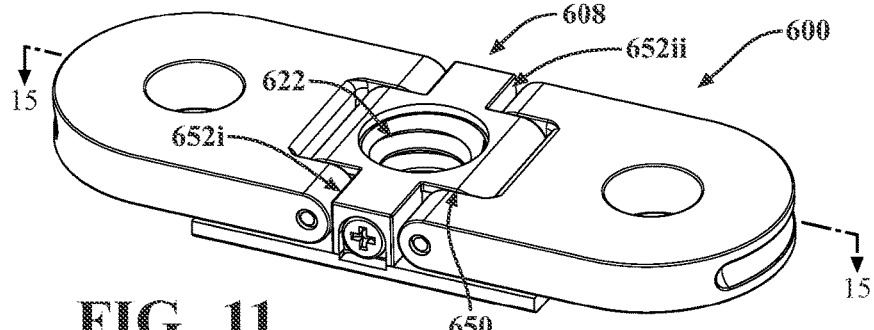
FIG. 11
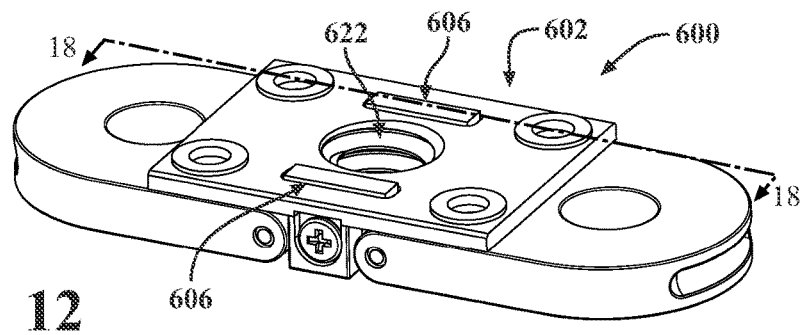
FIG. 12

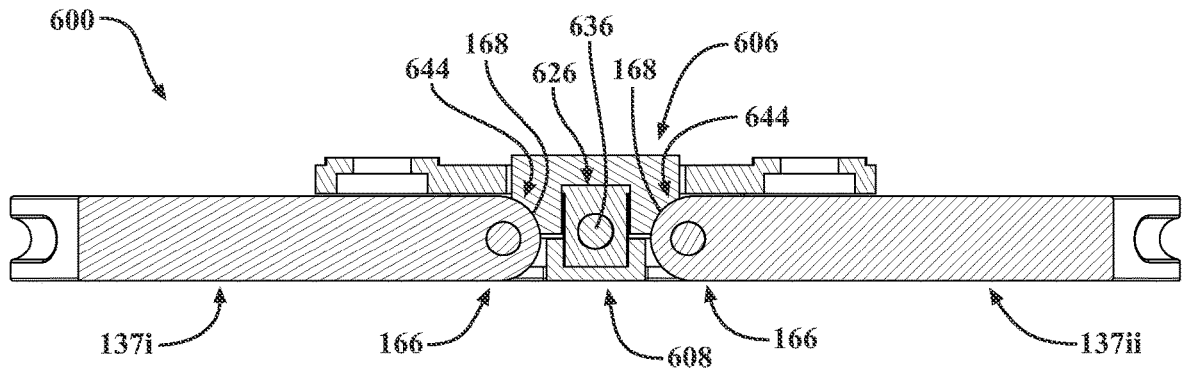
FIG. 18
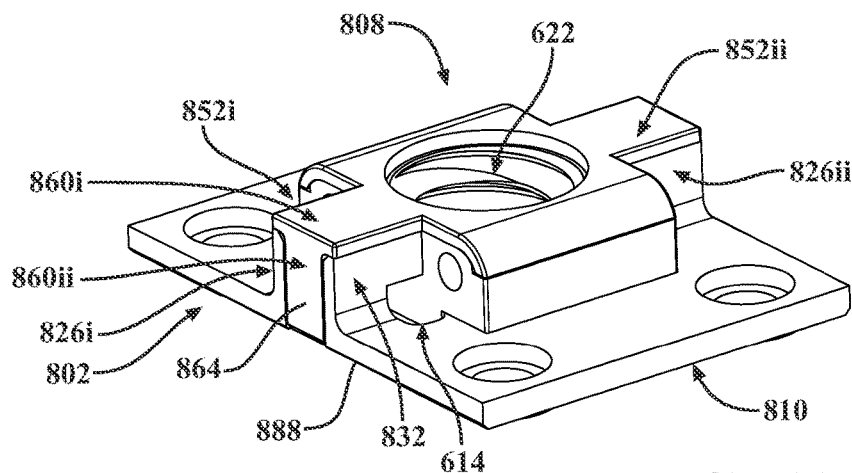
FIG. 19
FIG. 20
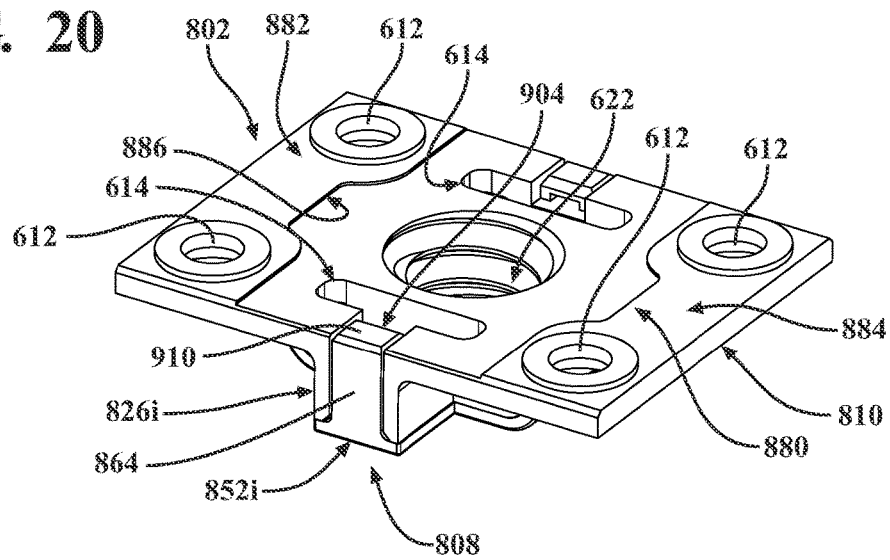

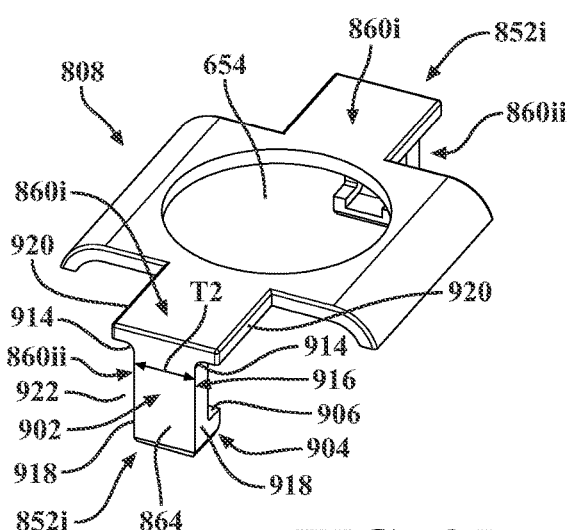
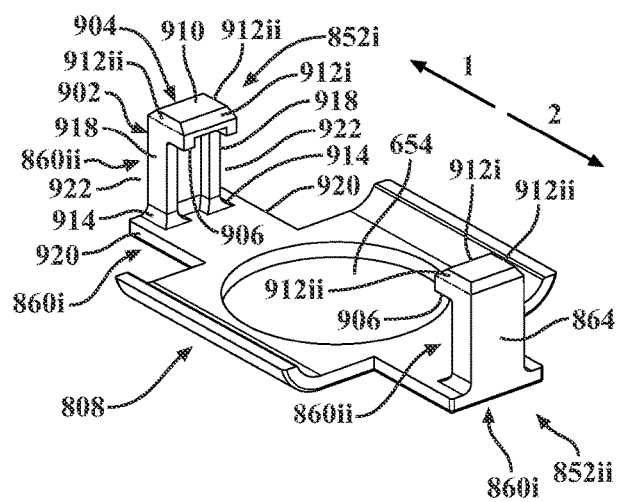
FIG. 25      FIG. 26
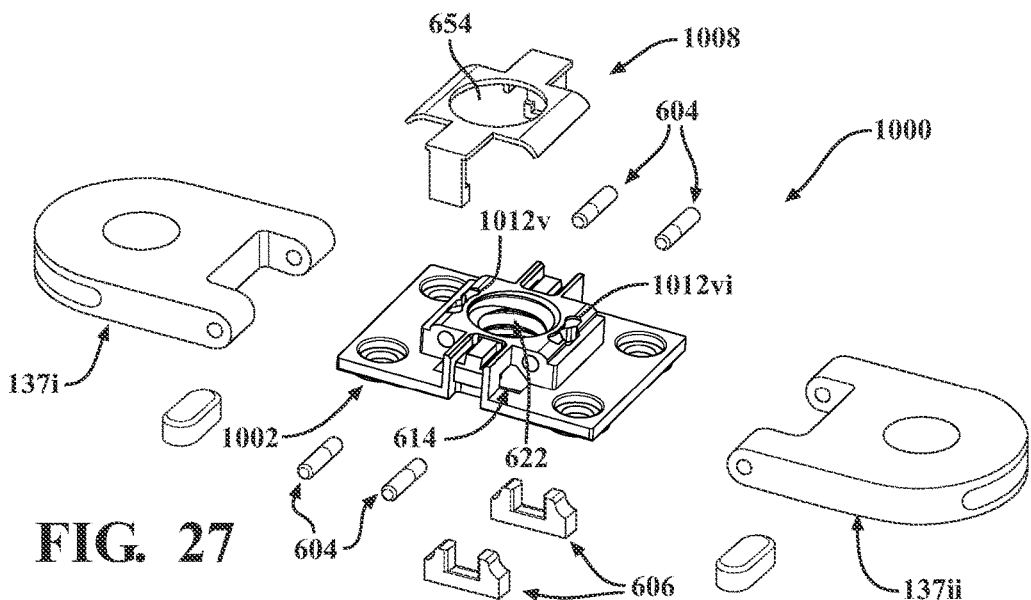
FIG. 27
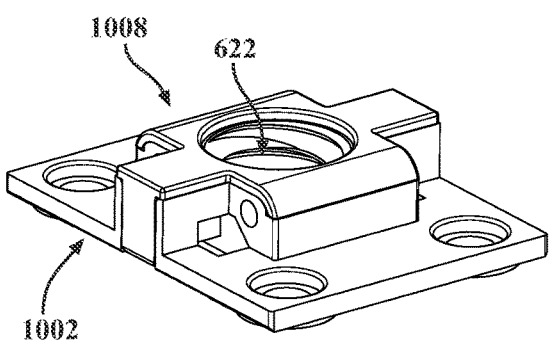
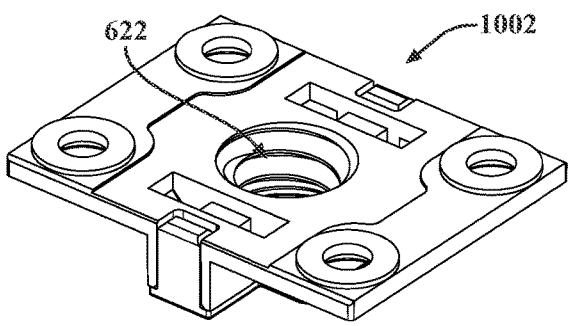
FIG. 28      FIG. 29

REINFORCED IMAGE CAPTURE DEVICES INCLUDING INTERCONNECT MECHANISMS WITH A THREADED ACCESSORY INTERFACE

TECHNICAL FIELD

The present disclosure relates to image capture devices and, more specifically, to image capture devices including an interconnect mechanism that incorporates a threaded accessory interface and a reinforcement member that is located adjacent thereto in order to inhibit (if not entirely prevent) damage during connection of the accessory.

BACKGROUND

Image capture devices are used in a variety of applications, including, for example, handheld cameras and video recorders, cell phones, drones, etc. Often times, image capture devices include interconnect mechanisms (mounts) in order to facilitate connection to accessories (e.g., tripods, wrist straps, vests, hats, helmets, surfboards, motorcycle handlebars, etc.). Known image capture devices, however, offer limited compatibility in that they are generally configured for connection to accessories with corresponding interconnect mechanisms.

In order to increase utility, various adapters have been developed that allow for the connection of image capture devices and accessories with different interconnect mechanisms. The present disclosure reduces the need for such adapters, however, by providing image capture devices with interconnect mechanisms that incorporate a threaded interface in order to facilitate direct connection of the image capture devices to a greater variety of accessories.

SUMMARY

In one aspect of the present disclosure, an image capture device is disclosed that includes: a body and an interconnect mechanism that is connected to the body. The interconnect mechanism includes: a base plate defining a receptacle that is configured to threadably engage an accessory such that the image capture device is directly connectable to the accessory via the interconnect mechanism; a cover that is removably connected to the base plate and which is configured to thermally insulate the interconnect mechanism; and first and second fingers that are pivotably connected to the base plate about first and second pivot axes such that the interconnect mechanism is reconfigurable between a collapsed configuration, in which the first and second fingers are nested within the body of the image capture device, and an extended configuration, in which the first and second fingers extend outwardly from the body of the image capture device.

In certain embodiments, the image capture device may further include hinge pins that extend into the first and second fingers and into the base plate.

In certain embodiments, each hinge pin may include a first segment that defines a first transverse cross-sectional dimension, and a second segment that defines a second transverse cross-sectional dimension larger than the first transverse cross-sectional dimension.

In certain embodiments, the image capture device may include: a first hinge pin that extends into the first finger and into the base plate in a first direction; a second hinge pin that extends into the first finger and into the base plate in a second direction; a third hinge pin that extends into the second finger and into the base plate in the first direction; and a fourth hinge pin that extends into the second finger and into the base plate in the second direction.

In certain embodiments, the second segment of the first hinge pin may engage the first finger in an interference fit, the first segment of the first hinge pin may be received by the base plate, the second segment of the second hinge pin may engage the first finger in an interference fit, and the first segment of the second hinge pin may be received by the base plate so as to allow for pivoting of the first finger in relation thereto.

In certain embodiments, the second segment of the third hinge pin may engage the second finger in an interference fit, the first segment of the third hinge pin may be received by the base plate, the second segment of the fourth hinge pin may engage the second finger in an interference fit, and the first segment of the fourth hinge pin may be received by the base plate so as to allow for pivoting of the second finger in relation thereto.

In certain embodiments, the base plate may include a mounting platform that is configured to receive the hinge pins such that the hinge pins extend into the first and second fingers and into mounting platform to thereby pivotably connect the first and second fingers to the mounting platform.

In certain embodiments, the receptacle may extend into the mounting platform.

In certain embodiments, the base plate may further include first and second bosses that extend outwardly from the mounting platform in generally parallel relation to the first and second pivot axes.

In certain embodiments, the cover may be configured for removable engagement with the first and second bosses.

In certain embodiments, the cover may include apertures that are configured to receive mechanical fasteners such that the mechanical fasteners extend through the cover and into the first and second bosses.

In certain embodiments, the cover and the base plate may be configured for engagement in a press fit.

In certain embodiments, the interconnect mechanism may further include an adhesive located between the cover and the base plate.

In certain embodiments, the base plate may define adhesive channels that are configured to receive the adhesive.

In another aspect of the present disclosure, an image capture device is disclosed that includes: a body; an interconnect mechanism that is connected to the body; and a reinforcement member that is supported by the body such that the interconnect mechanism overlies the reinforcement member.

The interconnect mechanism includes: a base plate; a first finger and a second finger each pivotably connected to the base plate such that the interconnect mechanism is reconfigurable between a collapsed configuration and an extended configuration; a first hinge pin that extends into the first finger and into the base plate; a second hinge pin that extends into the first finger and into the base plate; a third hinge pin that extends into the second finger and into the base plate; a fourth hinge pin that extends into the second finger and into the base plate; and a first restrictor and a second restrictor that each extend into the base plate and each include a generally u-shaped cross-sectional configuration.

The first restrictor and the second restrictor each define first and second arms that are configured for frictional engagement with the first finger and the second finger to inhibit unintended movement thereof.

The base plate includes: a receptacle that is configured to threadably engage an accessory such that the image capture device is directly connectable to the accessory via the interconnect mechanism; a first boss that extends in a first direction and which is oriented in transverse relation to the receptacle; and a second boss that extends in a second direction opposite to the first direction and which is oriented in transverse relation to the receptacle.

The reinforcement member defines a port that is configured to receive the accessory and thereby inhibit unintended penetration of the body of the image capture device by the accessory.

In certain embodiments, the interconnect mechanism may further include a cover that is mechanically and/or adhesively connected to the base plate.

In certain embodiments, the cover may be non-metallic in construction.

In certain embodiments, the cover and the base plate may be configured for engagement in a press fit.

In certain embodiments, the first and second arms of the first and second restrictors may include arcuate cutouts that each define an inner contour corresponding to an outer contour defined by the first and second fingers such that the cutouts receive the first and second fingers.

In another aspect of the present disclosure, a method of assembling an image capture device is disclosed. The method includes: pivotably connecting first and second fingers to a base plate of an interconnect mechanism such that the interconnect mechanism is reconfigurable between a collapsed configuration and an extended configuration, wherein the base plate includes a receptacle that is configured to threadably engage an accessory such that the image capture device is directly connectable to the accessory via the interconnect mechanism; connecting a reinforcement member to a body of the image capture device, wherein the reinforcement member defines a port that is configured to receive the accessory and thereby inhibit unintended penetration of the body of the image capture device by the accessory; and connecting the interconnect mechanism to the body of the image capture device such that the interconnect mechanism overlies the reinforcement member.

In certain embodiments, the method may further include connecting a cover to the base plate to thereby insulate the interconnect mechanism.

In certain embodiments, connecting the cover to the base plate may include mechanically connecting the cover to the base plate.

In certain embodiments, mechanically connecting the cover to the base plate may include connecting the cover to the base plate in a press fit.

In certain embodiments, connecting the cover to the base plate may include adhesively connecting the cover to the base plate.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings.

FIG. 8 is a cross-sectional view of the image capture device taken along line 8-8 in FIG. 4.

FIG. 9 is a cross-sectional view of the image capture device taken along line 9-9 in FIG. 4.

FIG. 10 is an enlargement of the area of detail identified in FIG. 9.

FIG. 11 is a bottom, perspective view of the interconnect mechanism.

FIG. 12 is a top, perspective view of the interconnect mechanism.

FIG. 18 is a cross-sectional view of the interconnect mechanism taken along line 18-18 in FIG. 12.

FIG. 19 is a bottom, perspective view of alternate embodiments of the base plate and the cover shown connected together.

FIG. 20 is a top, perspective view of the base plate and the cover seen in FIG. 19 shown connected together.

FIG. 25 is a bottom, perspective view of the cover seen in FIG. 19.

FIG. 26 is a top, perspective view of the cover seen in FIG. 19.

FIG. 27 is a bottom, perspective view of an alternate embodiment of the interconnect mechanism shown with parts separated, which includes: the pair of protrusions; the hinge pins; the pair of restrictors; and alternate embodiments of the base plate and the cover.

FIG. 28 is a bottom, perspective view of the base plate and the cover seen in FIG. 27 shown connected together.

FIG. 29 is a top, perspective view of the base plate and the cover seen in FIG. 27 shown connected together.

DETAILED DESCRIPTION

The present disclosure describes an image capture device that includes: a body; an interconnect mechanism that is connected to the body; and a reinforcement member that is supported by the body and located adjacent to the interconnect mechanism such that the interconnect mechanism overlies the reinforcement member.

The interconnect mechanism provides a threaded accessory interface that facilitates connection of an accessory (e.g., a tripod) to the image capture device. The interconnect mechanism includes: a base plate that is configured for threaded engagement with the accessory; fingers that are pivotably connected to the base plate such that the interconnect mechanism is reconfigurable between collapsed and extended configurations; and a cover that is removably connected to the base plate and which is configured to thermally insulate the interconnect mechanism, increase acceptable touch-temperature limits for the image capture device, and improve the overall aesthetic appearance thereof.

The reinforcement member is configured to receive the accessory during connection to the image capture device in the event that the accessory is over-advanced (e.g., via excessive tightening of the accessory and the image capture device). The reinforcement member thus inhibits (if not entirely prevents) damage to the image capture device that might otherwise occur via penetration by the accessory.

In certain embodiments of the disclosure, the cover and the base plate are configured for connection via mechanical fasteners, whereas in other embodiments of the disclosure, the cover and the base plate are configured for connection in a press fit (e.g., a snap fit), which may be supplemented via the application of an adhesive therebetween.

Figure 1A:
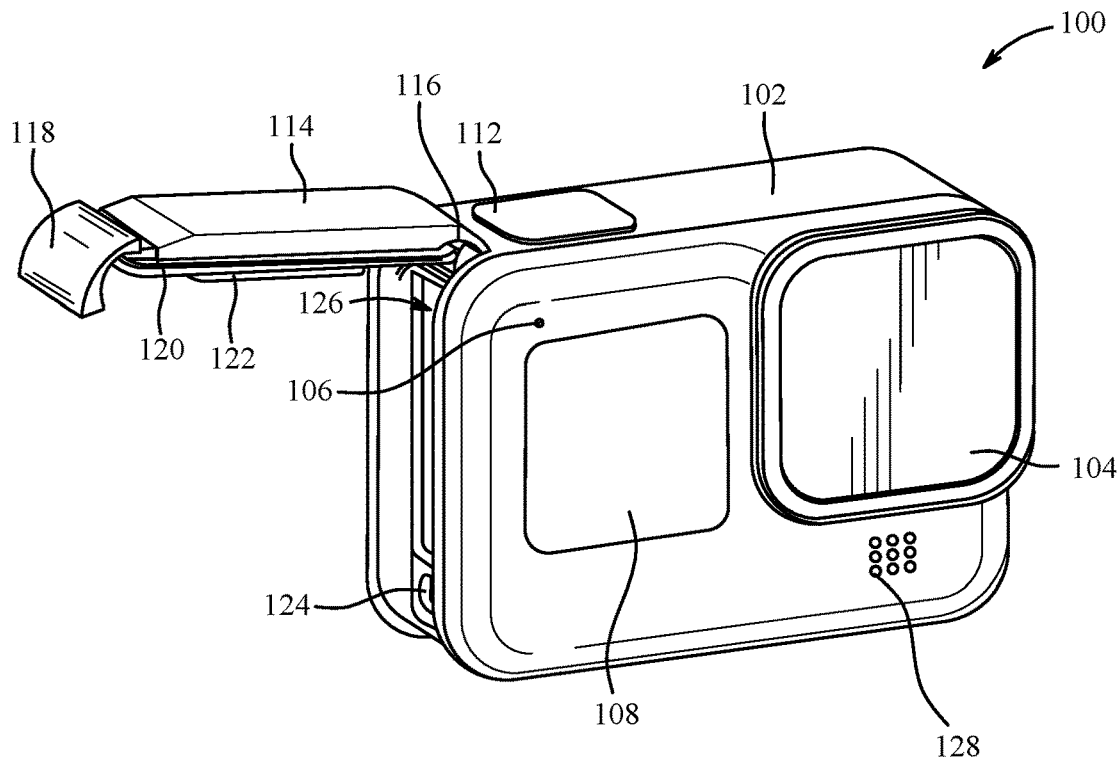
FIGS. 1A-B are isometric views of an example of an image capture device.
Figure 1B:
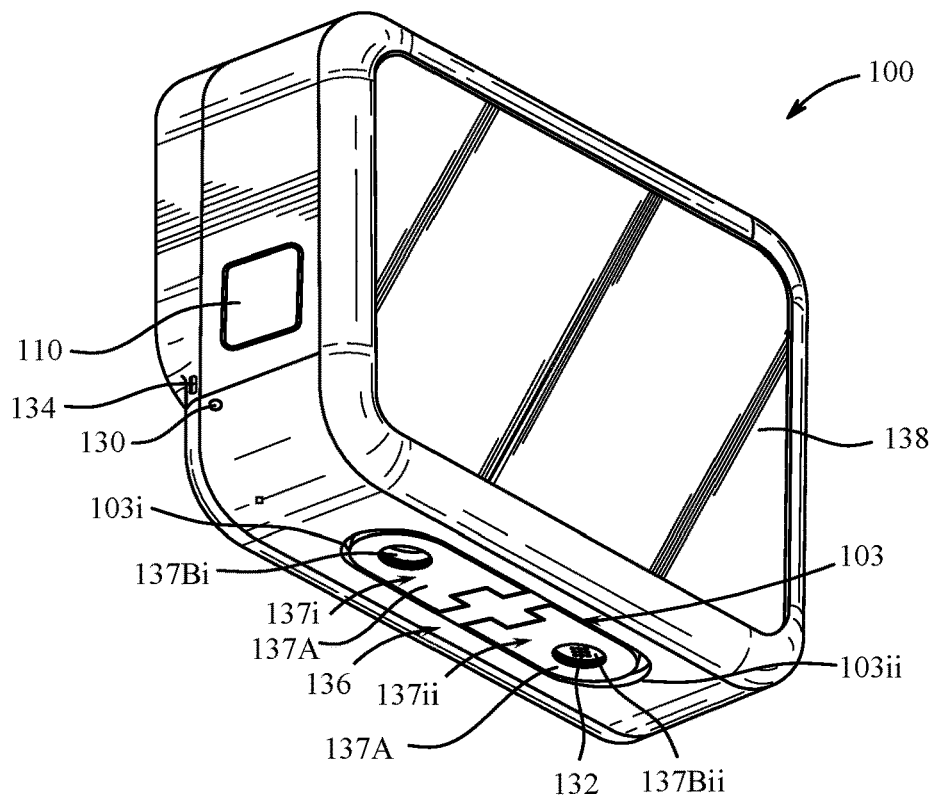

FIGS. 1A-B are isometric views of an example of an image capture device 100. The image capture device 100 may include a body 102, one or more lenses 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens(es) 104 and/or performing other functions. The lens(es) 104 receive light incident upon the lens(es) 104 and to direct received light onto an image sensor internal to the body 102, as described in further detail below. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include a cavity 103 that extends (vertically upward) into the body 102 (e.g., towards the shutter button 112) and which is configured to receive (accommodate) a (first) interconnect mechanism (mount) 136 that is (mechanically) connected to the body 102 in either a fixed or a removable fashion.

Figure 2A:
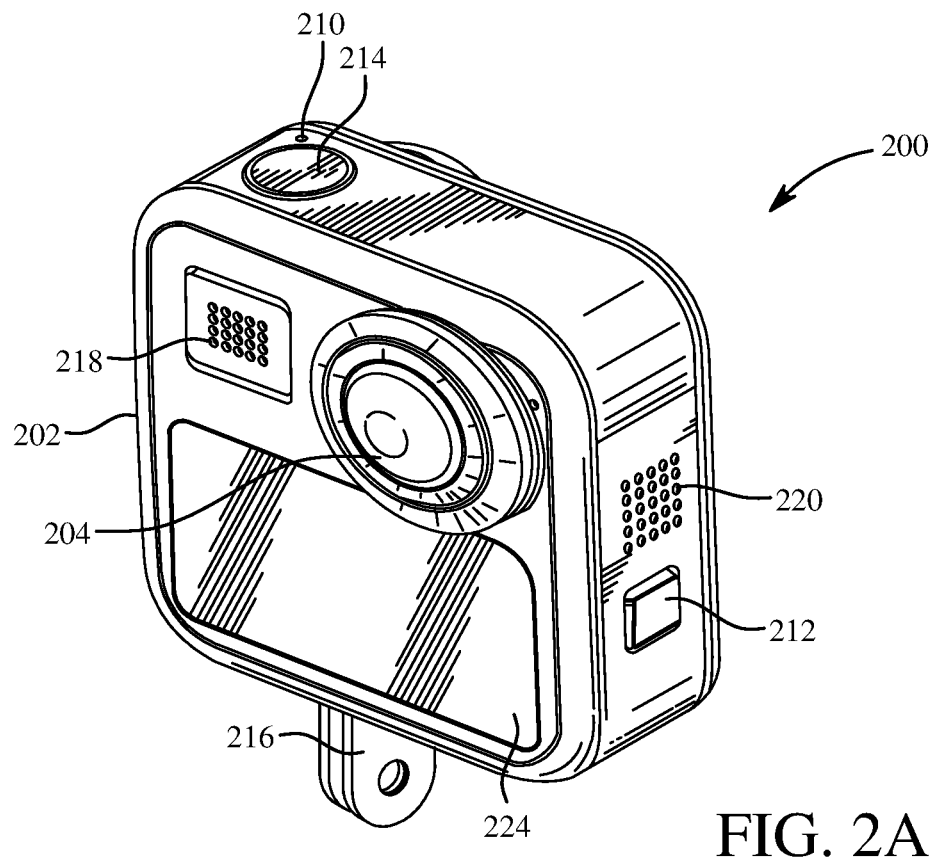
FIGS. 2A-B are isometric views of another example of an image capture device.
Figure 2B:
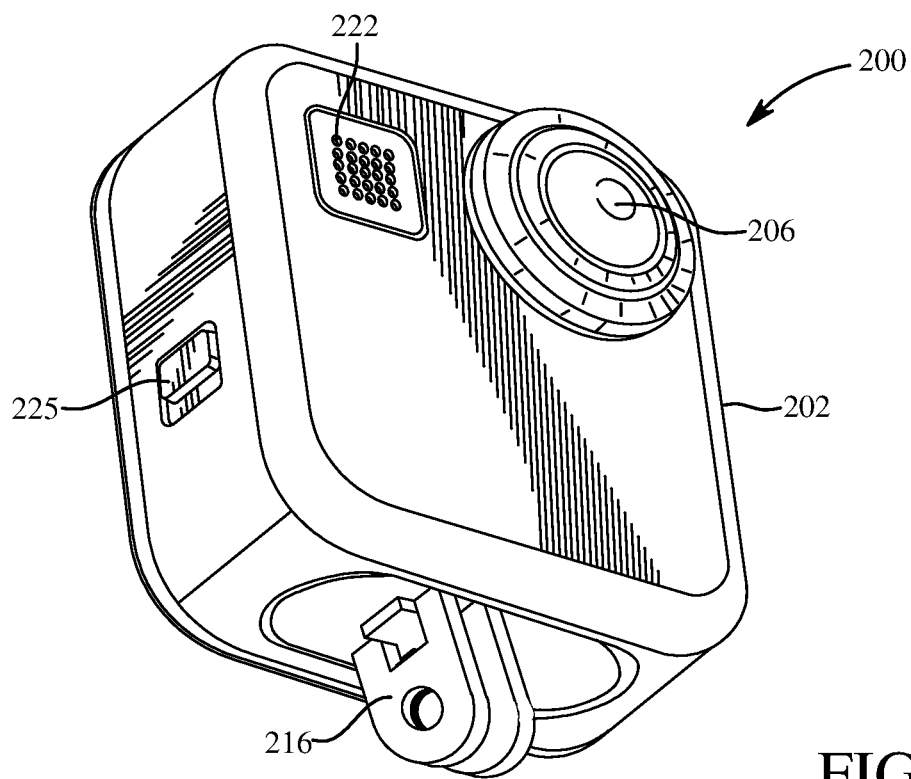

The interconnect mechanism 136 is configured for (removable) engagement with (connection to) an accessory such that the image capture device 100 is (repeatably) connectable to and disconnectable from the accessory via the interconnect mechanism 136. In the example shown in FIG. 1B, the interconnect mechanism 136 includes a pair of folding protrusions 137 (e.g., fingers 137A) that are pivotably movable such that the interconnect mechanism 136 is reconfigurable between a nested (collapsed, closed, stowed) configuration (FIG. 1B) and an extended (expanded, open, deployed) configuration (FIGS. 2A, 2B). More specifically, the interconnect mechanism 136 includes a (first) protrusion 137i defining a (first) opening 137Bi and a (second) protrusion 137ii defining a (second) opening 137Bii, which are moveable independently of each other. As seen in FIG. 1B, when the interconnect mechanism 136 is in the nested configuration, the protrusions 137 are nested within the body 102 and are received (accommodated) by the cavity 103. When the interconnect mechanism 136 is in the extended configuration, however, the protrusions 137 are removed from the cavity 103 such that the protrusions 137 extend outwardly (vertically downward) from the body 102 (e.g., away from the shutter button 112), which allows for connection of the protrusions 137 to corresponding protrusions on the accessory and, thus, coupling of image capture device 100 to the accessory. To facilitate reception of the interconnect mechanism 136, the cavity 103 defines (first and second) cavity portions 103i, 103ii, which include identical (or generally identical) configurations corresponding to those respectively defined by the protrusions 137i, 137ii. As such, in the illustrated embodiment, the cavity portions 103i, 103ii each include a D-shaped (or generally D-shaped) transverse cross-sectional configuration, which imparts a (generally) ovate (e.g., obround, stadium) configuration to the cavity 103. It should be appreciated, however, that the particular configurations of the protrusions 137 and the cavity 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested (collapsed, closed, stowed) configuration (not shown) and an extended (expanded, open, deployed) configuration as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
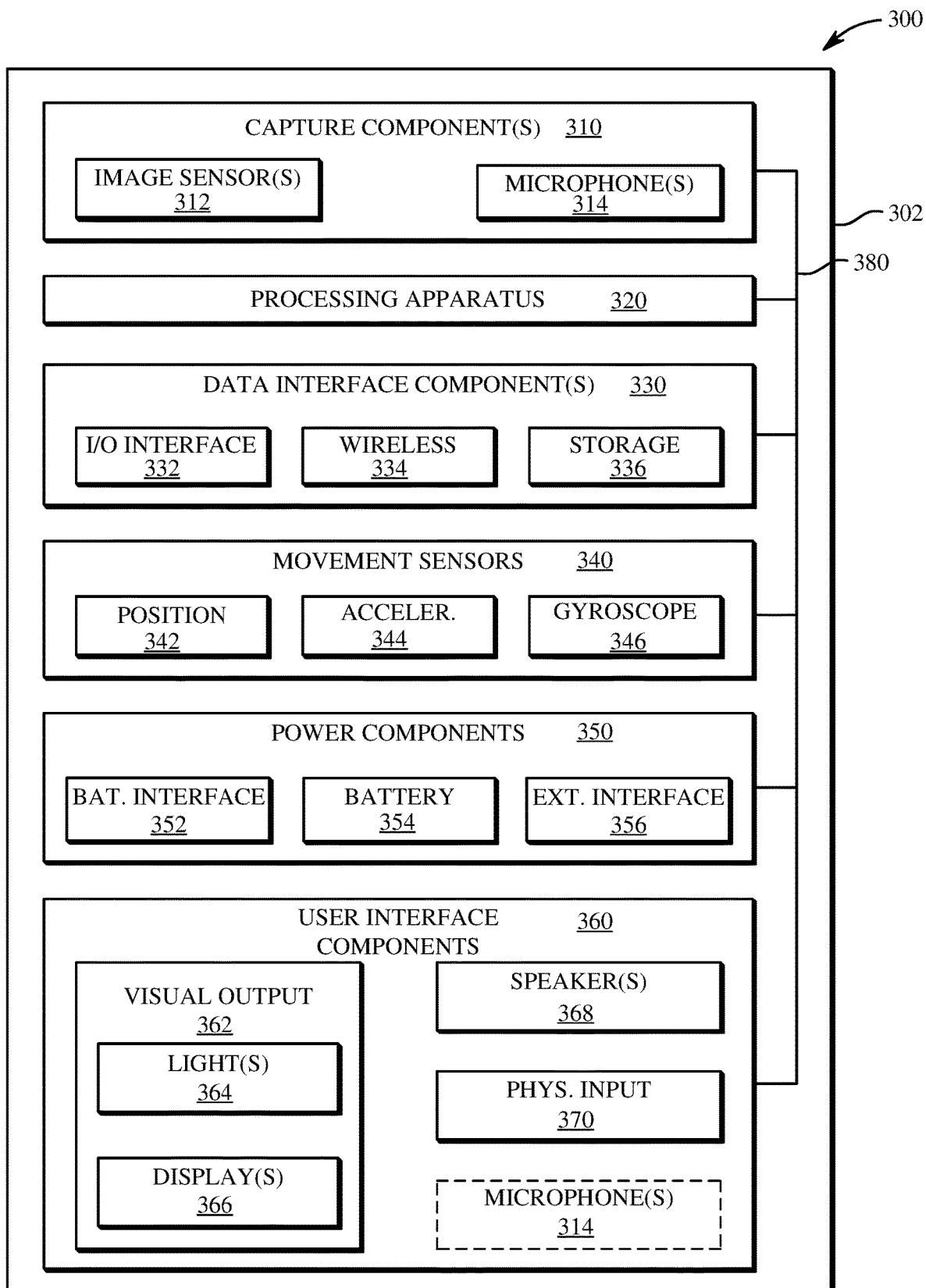
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
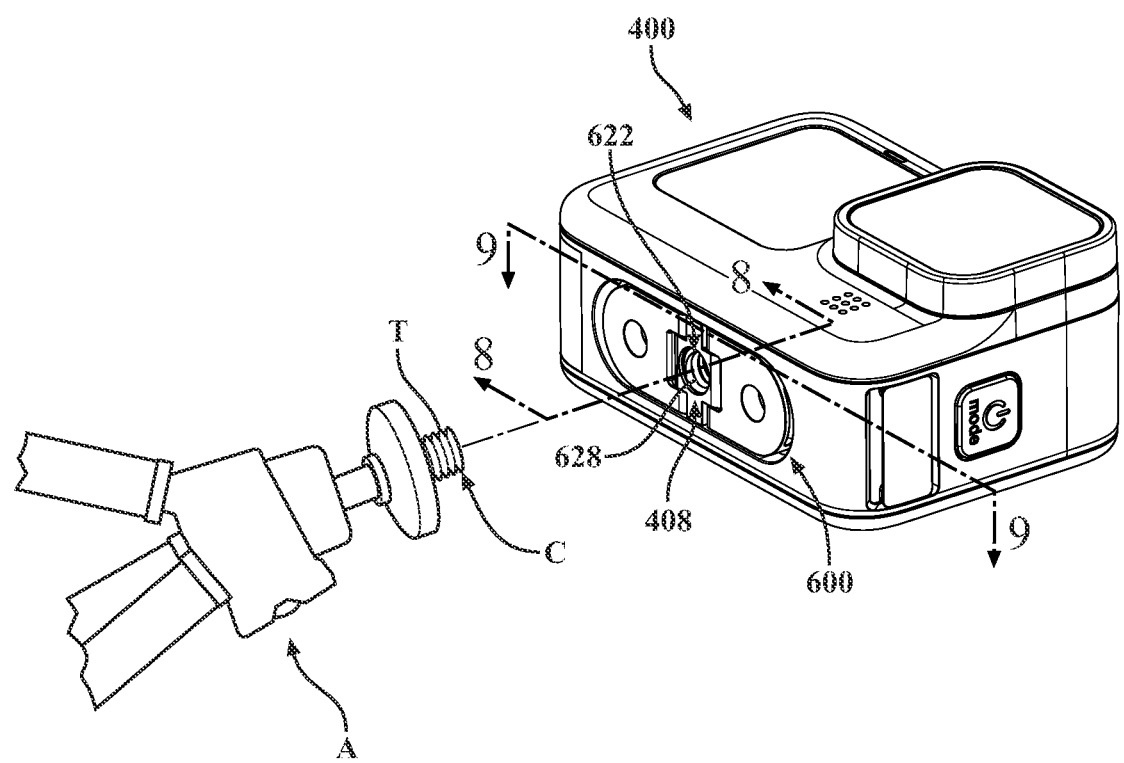
FIG. 4 is a bottom, perspective view of another example of an image capture device that includes a reinforcement member and an interconnect mechanism that is configured to facilitate direct (threaded) connection of the image capture device to an accessory A, which is shown in a nested (collapsed, closed, stowed) configuration.
Figure 5:
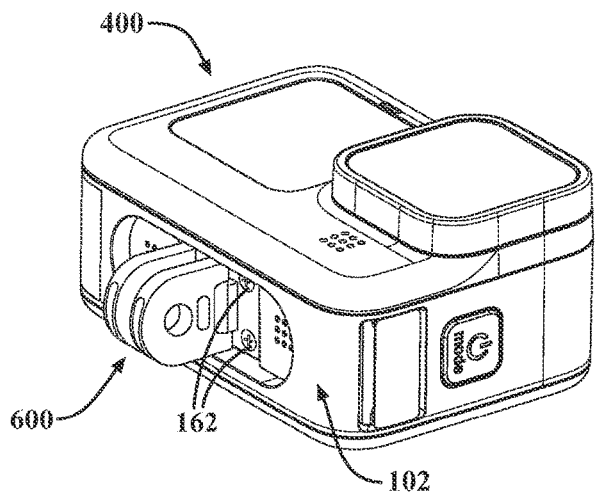
FIG. 5 is a bottom, perspective view of the image capture device with the interconnect mechanism shown in an extended (expanded, open, deployed) configuration.
Figure 6:
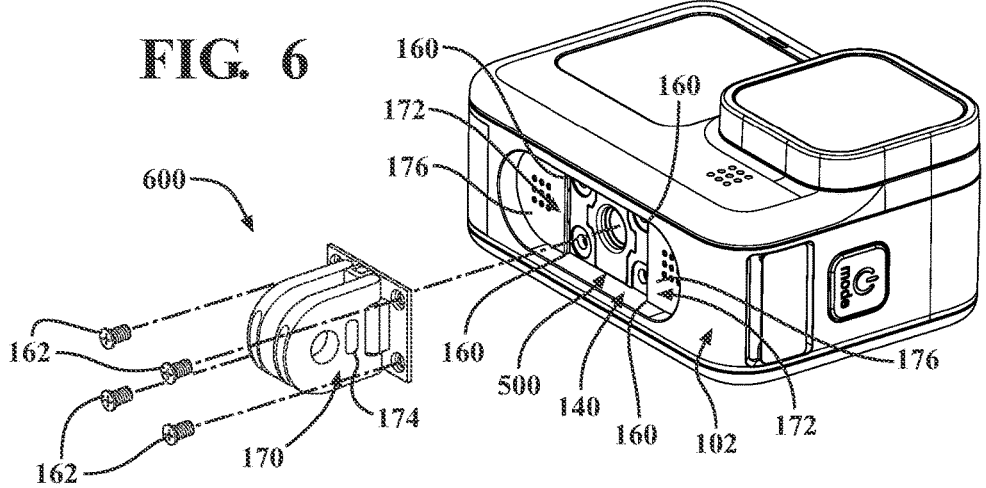
FIG. 6 is a bottom, perspective view of the image capture device with the interconnect mechanism shown separated therefrom and the reinforcement member exposed.
Figure 7:
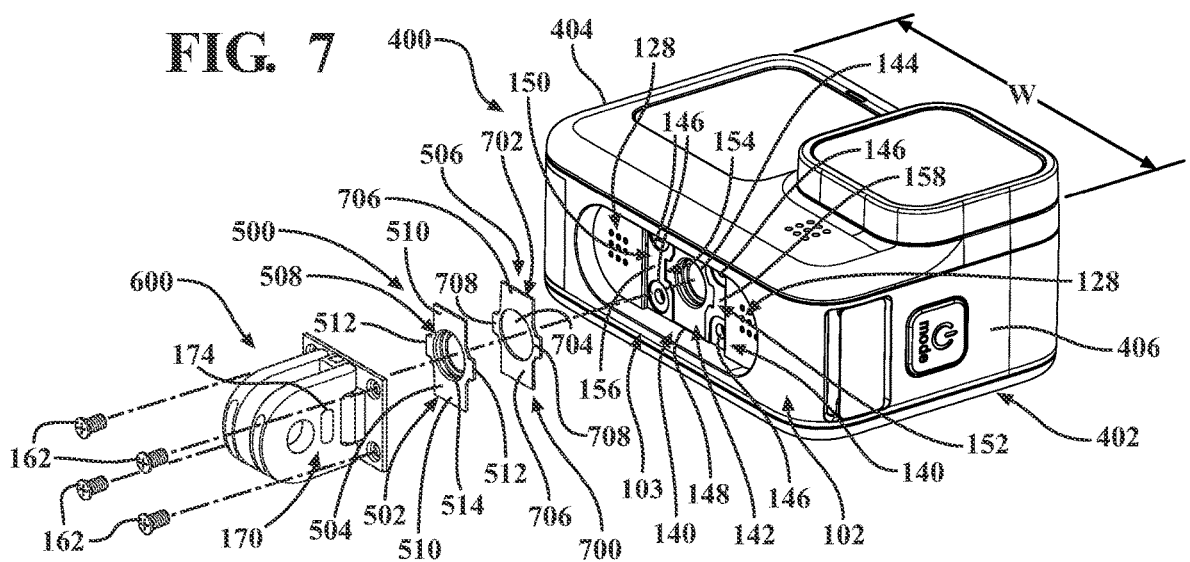
FIG. 7 is a bottom, perspective view of the image capture device with the reinforcement member and the interconnect mechanism shown separated therefrom.

Referring now to FIGS. 4-12, an image capture device 400 is illustrated that includes a reinforcement member 500 and an interconnect mechanism (mount) 600, which is configured to facilitate direct connection of the image capture device to an accessory A, which includes a (threaded) male connector C. More specifically, FIG. 4 is a bottom, perspective view of the image capture device 400 with the interconnect mechanism 600 shown in the nested (collapsed, closed, stowed) configuration and separated from the accessory A; FIG. 5 is a bottom, perspective view of the image capture device 400 with the interconnect mechanism 600 shown in the extended (expanded, open, deployed) configuration; FIG. 6 is a bottom, perspective view of the image capture device 400 with the interconnect mechanism 600 shown separated from the body 102 and illustrating the reinforcement member 500; FIG. 7 is a bottom, perspective view of the image capture device 400 with the reinforcement member 500 and the interconnect mechanism 600 shown separated from the body 102; FIG. 8 is a cross-sectional view of the image capture device 400 taken along line 8-8 in FIG. 4; FIG. 9 is a cross-sectional view of the image capture device 400 taken along line 9-9 in FIG. 4; FIG. 10 is an enlargement of the area of detail identified in FIG. 9; FIG. 11 is a bottom, perspective view of the interconnect mechanism 600 shown separated from the image capture device 400; and FIG. 12 is a top, perspective view of the interconnect mechanism 600 shown separated from the image capture device 400. The image capture device 400 and the interconnect mechanism 600 include features similar to the aforedescribed image capture devices 100, 200, 300 (FIGS. 1A-3) and the aforedescribed interconnect mechanism 136 (FIGS. 1A, 1B), and, accordingly, will only be discussed with respect to differences therefrom in the interest of brevity.

In order to facilitate connection of the reinforcement member 500 and the interconnect mechanism 600 to the body 102 during assembly of the image capture device 400, the body 102 includes (defines): a recess 140; a relief 142; a depression (cavity) 144; and apertures 146. As seen in FIG. 7, the recess 140, the depression 144, and the apertures 146 are each located within the cavity 103 and spaced inwardly from an outer periphery (perimeter, edge) 402 of the body 102.

The recess 140 extends (vertically upward) into the body 102 (e.g., towards the shutter button 112 (FIG. 1A)) and is configured to receive the reinforcement member 500 and the interconnect mechanism 600 such that the body supports the reinforcement member 500 and the interconnect mechanism 600. In the illustrated embodiment, the recess 140 is (generally) rectangular in configuration and is (generally) centered within the cavity 103, which allows for the inclusion of one or more additional microphones 128 within the cavity 103 (e.g., on opposite sides of the interconnect mechanism 600). It should be appreciated, however, that the particular configuration of the recess 140, the particular location of the recess 140, and/or the number of microphones 128 may be varied in alternate embodiments without departing from the scope of the present disclosure (e.g., depending upon the particular configuration of the interconnect mechanism 600).

The relief 142 extends (vertically upward) into a base wall 148 defined by the recess 140 so as to define lateral supports 150, 152, which are configured for engagement (contact) with the interconnect mechanism 600, as described in further detail below. The relief 142 and the reinforcement member 500 define corresponding configurations, which allows for insertion of the reinforcement member 500 into the relief 142 in the manner illustrated in FIG. 6 (for example). More specifically, the relief 142 defines an inner contour (profile) 154 that corresponds to (e.g., mirrors) an outer contour (profile) 502 defined by the reinforcement member 500, thereby providing for a mechanical interface between the reinforcement member 500 and the relief 142 that inhibits (if not entirely prevents) movement (e.g., rotation) of the reinforcement member 500 in relation to the body 102 of the image capture device 400.

The depression 144 extends (vertically upward) into the base wall 148 of the relief 142 and is configured to (further) receive the reinforcement member 500 such that the reinforcement member 500 is flush mounted within the relief 142 (e.g., such that that an outer (bottom) surface 504 of the reinforcement member 500 is coextensive with outer (bottom) surfaces 156, 158 respectively defined the lateral supports 150, 152). In the illustrated embodiment, the depression 144 includes a (generally) annular (e.g., circular) configuration and is (generally) centered along a width W (FIG. 7) of the image capture device 400 (e.g., such that the depression 144 is spaced an (approximately) equivalent distance from side surfaces 404, 406 of the body 102). It should be appreciated, however, that the particular configuration and/or the particular location of the depression 144 may be varied in alternate embodiments without departing from the scope of the present disclosure. For example, while the depression 144 is illustrated as being unthreaded, an embodiment in which the depression 144 may include internal threading is also envisioned herein and would not be beyond the scope of the present disclosure.

The apertures 146 are located laterally (radially) outward of the depression 144 and extend into the lateral supports 150, 152 in corner sections 160 of the recess 140. The apertures 146 are configured to receive mechanical fasteners 162 (e.g., screws, pins, rivets, etc.) to thereby facilitate connection of the interconnect mechanism 600 to the body 102 of the image capture device 400 in either a fixed or a removable fashion. Although shown as including four apertures 146 and four mechanical fasteners 162, it should be appreciated that the particular number of apertures 146 and mechanical fasteners 162 may be altered in various embodiments without departing from the scope of the present disclosure (e.g., depending upon the particular configuration the interconnect mechanism 600, the material(s) used in construction of the interconnect mechanism 600 and the body 102 of the image capture device 400, etc.).

The reinforcement member 500 includes a body 506 that defines: a port 508; a pair of flanges 510; and a pair of tabs 512. The reinforcement member 500 may include (e.g., may be formed from) any material suitable for the intended purpose of inhibiting (if not entirely preventing) penetration of the body 102 by the male connector C (FIG. 4) in the event that the accessory A is over-advanced (e.g., via excessive tightening of the accessory A and the image capture device 400). For example, in the illustrated embodiment, the reinforcement member 500 includes (e.g., is formed partially or entirely from) one or more metallic materials (e.g., aluminum, steel, etc.). Embodiments in which the reinforcement member 500 may include (e.g., may be formed partially or entirely from) one or more non-metallic materials (e.g., one or more plastic, polymeric, and/or composite materials) are also envisioned herein, however, and would not be beyond the scope of the present disclosure.

The port 508 is configured for insertion into (reception by) the depression 144 such that the reinforcement member 500 extends into the body 102 and to receive the male connector C, thereby inhibiting (if not entirely preventing) unintended penetration of the body 102 of the image capture device 400. More specifically, in the illustrated embodiment, the port 508 includes internal threading 514 that is configured in correspondence with external threading T (FIG. 4) on the male connector C. Embodiments of the reinforcement member 500 in which the internal threading 514 may be omitted are also envisioned herein, however, and would not be beyond the scope of the present disclosure.

The flanges 510 and the tabs 512 extend laterally (radially) outward (e.g., in relation to the port 508) and collectively describe the outer contour 502 defined by the reinforcement member 500. More specifically, the flanges 510 and the tabs 512 are configured for insertion into the relief 142 so as to create the aforementioned mechanical interface between the reinforcement member 500 and the relief 142 and inhibit (if not entirely prevent) movement of the reinforcement member 500 in relation to the image capture device 400.

In certain embodiments, the image capture device 400 further includes an adhesive member 700 (FIG. 7) that is configured for positioning between the reinforcement member 500 and the body 102 of the image capture device 400. For example, in the illustrated embodiment, the adhesive member 700 includes an adhesive strip 702 that is configured in correspondence with the reinforcement member 500 (e.g., such that the configuration of the adhesive strip 702 corresponds to (e.g., mirrors) that of the reinforcement member 500). More specifically, the adhesive strip 702 defines: an opening 704 that is configured to receive the port 508; flanges 706 that are configured in correspondence with the flanges 510 on the reinforcement member 500; and tabs 708 that are configured in correspondence with the tabs 512 on the reinforcement member 500. As such, upon assembly of the image capture device 400, the adhesive member 700 and the reinforcement member 500 are positioned such that the port 508 extends into the opening 704 and such that the flanges 510 and the tabs 512 on the reinforcement member 500 overlie the flanges 706 and the tabs 708 on the adhesive member 700, respectively.

Additionally, or alternatively, in various embodiments of the disclosure, it is envisioned that the reinforcement member 500 may be mechanically connected to the image capture device 400. For example, it is envisioned that the reinforcement member 500 may be connected to the body 102 via one or more mechanical fasteners (e.g., screws, pins, rivets, etc.), in a press fit (e.g., a snap fit or an interference fit), etc., thereby allowing for (optional) omission of the adhesive member 700.

Figure 13A:
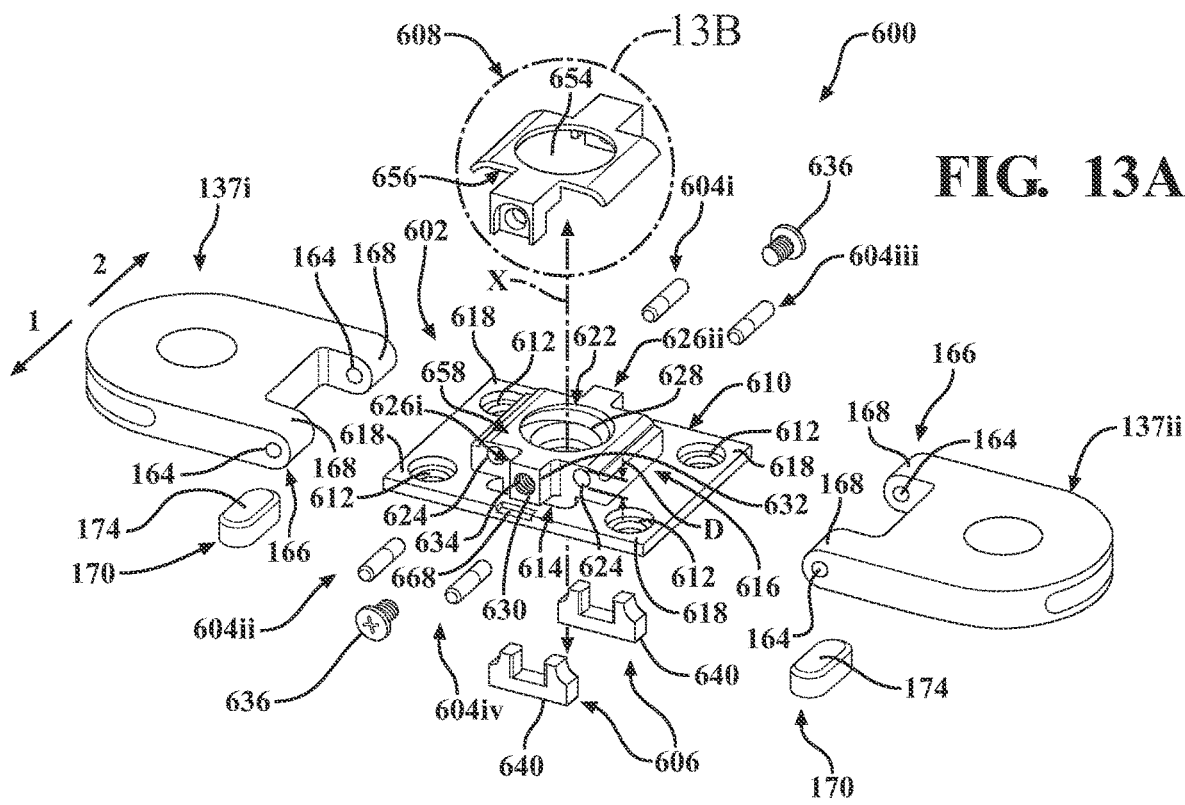
FIG. 13A is a bottom, perspective view of the interconnect mechanism shown with parts separated, which includes: a base plate; a pair of protrusions that are pivotably connected to the base plate; hinge pins; a pair of restrictors; and a cover.
Figure 13B:
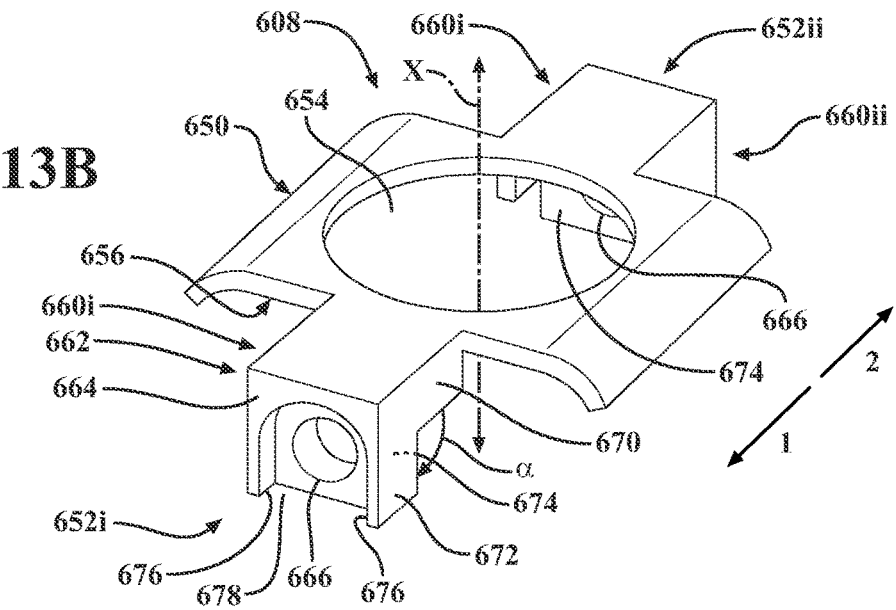
FIG. 13B is an enlargement of the area of detail identified in FIG. 13A.
Figure 14:
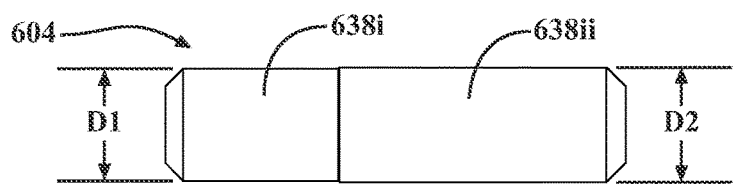
FIG. 14 is a side, plan view of one of the hinge pins seen in FIG. 13A.
Figure 15:
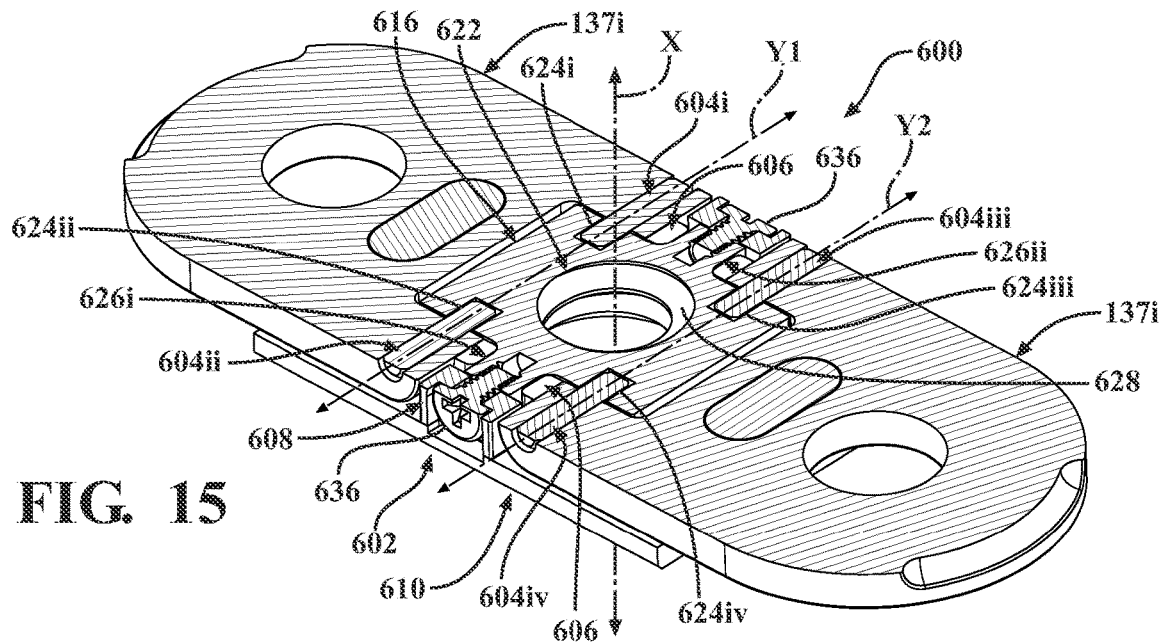
FIG. 15 is a cross-sectional view of the interconnect mechanism taken along line 15-15 in FIG. 11.
Figure 16:
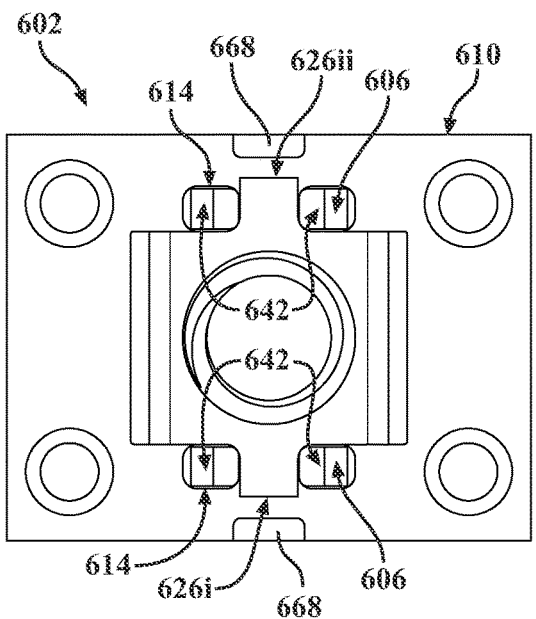
FIG. 16 is a bottom, plan view of the base plate seen in FIG. 13A.
Figure 17:
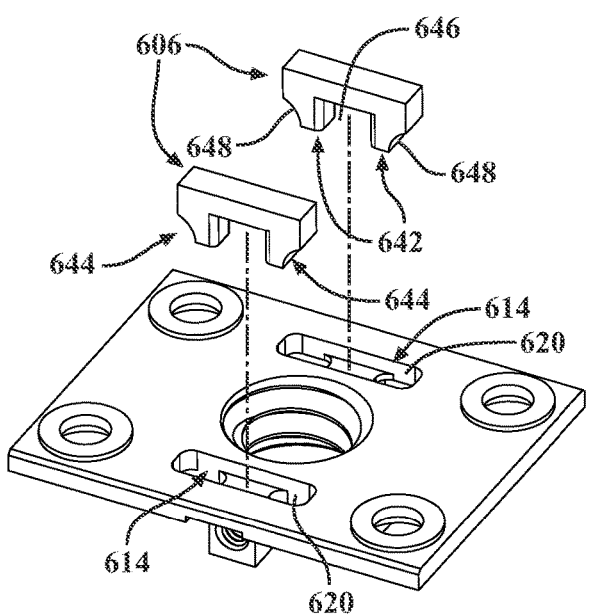
FIG. 17 is a top, perspective view of the base plate illustrating insertion of the restrictors.

With reference now to FIGS. 13A-18 as well, the interconnect mechanism 600 will be discussed, which includes: the aforementioned protrusions 137i, 137ii; a base plate 602; hinge pins 604; a pair of (first and second) restrictors 606; and a cover 608. More specifically, FIG. 13A is a bottom, perspective view of the interconnect mechanism 600 shown with parts separated; FIG. 13B is an enlargement of the area of detail identified in FIG. 13A; FIG. 14 is a side, plan view of one of the hinge pins 604; FIG. 15 is a cross-sectional view of the interconnect mechanism 600 taken along line 15-15 in FIG. 11; FIG. 16 is a bottom, plan view of the base plate 602; FIG. 17 is a bottom, perspective view of the base plate 602 with the restrictors 606 shown removed; and FIG. 18 is a cross-sectional view of the interconnect mechanism 600 upon assembly.

The base plate 602 includes a base 610 with apertures 612 and windows 614 (FIGS. 13A, 16, 17) formed therein, and a mounting platform 616 that is configured to receive the hinge pins 604 and which extends outwardly (e.g., vertically downward) from the base 610. In the illustrated embodiment, the base plate 602 is integral (e.g., unitary, monolithic) in construction and is formed from a single piece of metallic material (e.g., via CNC machining) including, for example, aluminum, steel, etc. Embodiments in which the base 610 and the mounting platform 616 may be formed as separate (discrete) components of the base plate 602 are also envisioned herein, however, as are embodiments in which the base plate 602 may include (e.g., may be formed partially or entirely from) one or more non-metallic materials (e.g., one or more plastic, polymeric, and/or composite materials).

As seen in FIG. 13A, the apertures 612 are formed in corner sections 618 of the base 610. Although illustrated as being polygonal (e.g., (generally) rectangular) in configuration, it should be appreciated that the particular configuration of the base 610 may be altered in various embodiments without departing from the scope of the present disclosure (e.g., depending upon the particular configuration of the protrusions 137, the particular configuration of the image capture device 400, etc.).

The apertures 612 are configured to receive the mechanical fasteners 162 (FIGS. 6, 7) such that the mechanical fasteners 162 extend through the apertures 612 and into the apertures 146 (FIG. 7) in the body 102 to thereby connect the interconnect mechanism 600 to the image capture device 400 such that the interconnect mechanism 600 overlies the reinforcement member 500. Although shown as including four apertures 612, it should be appreciated that the particular number of apertures 612 (and mechanical fasteners 162) may be altered in various embodiments without departing from the scope of the present disclosure (e.g., depending upon the particular configuration the interconnect mechanism 600, the material(s) used in construction of the interconnect mechanism 600 and the body 102 of the image capture device 400, etc.).

The windows 614 are configured to receive the restrictors 606 such that the restrictors 606 extend into the base plate 602 (through the base 610) and into engagement (contact) with the protrusions 137. In certain embodiments, such as that which is illustrated, the windows 614 and the restrictors 606 are configured such that the windows 614 receive the restrictors 606 in a press (interference) fit, which creates sufficient friction with the base 610 to retain the restrictors 606 and thereby inhibit (if not entirely prevent) unintended removal of the restrictors 606 from the base plate 602.

Although configured as (generally) linear slits 620 (FIG. 17) in the illustrated embodiment, it should be appreciated that the configuration of the windows 614 may be varied in alternate embodiments without departing from the scope of the present disclosure (e.g., depending upon the configuration of the restrictors 606, the configuration of the protrusions 137, etc.).

The mounting platform 616 includes (defines): a receptacle 622, which extends into the mounting platform 616 along (and defines) a (first) axis X; channels 624; and a pair of (first and second) bosses 626i, 626ii, which are (generally) identical in configuration. Although illustrated as being polygonal (e.g., (generally) rectangular) in configuration, it should be appreciated that the particular configuration of the mounting platform 616 may be altered in various embodiments without departing from the scope of the present disclosure (e.g., depending upon the particular configuration of the protrusions 137, the particular configuration of the image capture device 400, etc.).

The receptacle 622 is configured to (removably) receive and engage the accessory A (FIG. 4) and, thus, provides an interface between the image capture device 400 and the accessory A. More specifically, the receptacle 622 includes internal threading 628 that is configured in correspondence with the external threading T on the accessory A. The receptacle 622 thus provides a female connector 408 (FIG. 4) on the image capture device 400 that facilitates threaded engagement of the accessory A with the interconnect mechanism 600 such that the accessory A is directly and removably connectable to the image capture device 400.

In the illustrated embodiment, the receptacle 622 is open and extends entirely through the base plate 602 (e.g., through the mounting platform 616 and the base 610). Embodiments in which the receptacle 622 may be closed (e.g., such that the receptacle 622 extends partially through the base plate 602 and terminates short of the base 610) are also envisioned herein, however, and would not be beyond the scope of the present disclosure. For example, it is envisioned that closure of the receptacle 622 may offer additional protection against over-advancement of the accessory A (e.g., via excessive tightening of the accessory A and the image capture device 400) by providing a barrier that further inhibits (if not entirely prevents) penetration of the body 102 by the accessory A.

The channels 624 extend into the mounting platform 616 and are configured to receive the hinge pins 604. More specifically, the channels 624 define an inner transverse cross-sectional dimension D (e.g., a diameter), which exceeds a (first) outer transverse cross-sectional dimension D1 (e.g., a diameter) defined by the hinge pins 604 such that the hinge pins 604 are movable (e.g., pivotable, rotatable) in relation to the mounting platform 616.

In the illustrated embodiment, the interconnect mechanism 600 includes four channels 624i-624iv. It should be appreciated, however, that the particular number of channels 624 may be varied in alternate embodiments without departing from the scope of the present disclosure. For example, an embodiment of the interconnect mechanism 600 including a pair of channels 624 is also envisioned herein.

The bosses 626i, 626ii facilitate connection of the cover 608 to the base plate 602 and extend outwardly from the mounting platform 616 in opposite directions. More specifically, the (first) boss 626i extends outwardly from the mounting platform 616 in a forward (first, front) direction 1, and the (second) boss 626ii extends outwardly from the mounting platform 616 in a rearward (second, rear) direction 2. The bosses 626i, 626ii thus extend in (generally) parallel relation to the channels 624 (and the hinge pins 604) and in transverse (e.g., (generally) orthogonal, perpendicular) relation to the receptacle 622.

As seen in FIG. 13A, the bosses 626 include: outer (end) faces 630; side faces 632, which extend in (generally) orthogonal relation to the outer faces 630 and are coterminous (coextensive) therewith; and apertures 634, which are formed in the end faces 630. The apertures 634 are configured to receive mechanical fasteners 636 (e.g., screws, pins, rivets, etc.), which extend through the cover 608 and into the mounting platform 616 to (mechanically) connect the cover 608 to the base plate 602. Embodiments of the interconnect mechanism 600 in which the apertures 634 and the mechanical fasteners 636 may be eliminated are also envisioned herein, however, as described in further detail below.

As indicated above, the hinge pins 604 extend into the mounting platform 616 via the channels 624. As seen in FIG. 14, each hinge pin 604 includes a first segment 638i, which defines the (first) outer transverse cross-sectional dimension D1, and a second segment 638ii, which defines a (second) outer transverse cross-sectional dimension D2 (e.g., a diameter) that exceeds the outer transverse cross-sectional dimension D1. For example, in the illustrated embodiment, the (smaller) outer transverse cross-sectional dimension D1 lies (substantially) within the range of (approximately) 1.0 mm to (approximately) 1.1 mm, and the (larger) outer transverse cross-sectional dimension D2 lies (substantially) within the range of (approximately) 1.1 mm to (approximately) 1.2 mm. Embodiments in which the outer transverse cross-sectional dimensions D1, D2 may lie outside the aforementioned ranges, however, are also envisioned herein and would not be beyond the scope of the present disclosure (e.g., depending upon the particular configurations of the protrusions 137, the particular configuration of the base plate 602, etc.).

The first segments 638i extend (are configured for insertion) into the channels 624 so as to allow for movement (e.g., pivoting, rotation) between the hinge pins 604 and the mounting platform 616, and the second segments 638ii extend (are configured for insertion) into openings 164 defined by first ends 166 of the protrusions 137 in a press (interference) fit so as to inhibit (if not entirely prevent) relative movement (e.g., pivoting, rotation) between the hinge pins 604 and the protrusions 137. The hinge pins 604i, 604ii and the hinge pins 604iii, 604iv thus movably (pivotably) connect the protrusions 137i, 137ii to the base plate 602 (e.g., the mounting platform 616), respectively, which facilitates reconfiguration of the interconnect mechanism 600 between the nested configuration (FIG. 4) and the extended configuration (FIG. 5). More specifically, the segment 638i of the hinge pin 604i extends into (is received by) the channel 624i in the base plate 602 (e.g., the mounting platform 616) in a first direction (e.g., the forward direction 1, towards the hinge pin 604ii), the segment 638ii of the hinge pin 604i extends into the protrusion 137i in a press (interference) fit, the segment 638i of the hinge pin 604ii extends into (is received by) the channel 624ii in the base plate 602 (e.g., the mounting platform 616) in a second direction (e.g., the rearward direction 2, towards the hinge pin 604i), and the segment 638ii of the hinge pin 604ii extends into the protrusion 137i in a press (interference) fit.

The press fit between the hinge pins 604*i*, 604*ii* and the protrusion 137*i* allows for movement (pivoting) of the protrusion 137*i* in relation to the base plate 602 about a (first) pivot axis Y1 (FIG. 13A), which extends through (is defined by) the hinge pins 604*i*, 604*ii*. Similarly, the segment 638*i* of the hinge pin 604*iii* extends into (is received by) the channel 624*iii* in the base plate 602 (e.g., the mounting platform 616) in the first direction (e.g., e.g., the forward direction 1, towards the hinge pin 604*iv*), the segment 638*ii* of the hinge pin 604*iii* extends into the protrusion 137*ii* in a press (interference) fit, the segment 638*i* of the hinge pin 604*iv* extends into (is received by) the channel 624*iv* in the base plate 602 (e.g., the mounting platform 616) in the second direction (e.g., the rearward direction 2, towards the hinge pin 604*iii*), and the segment 638*ii* of the hinge pin 604*iv* extends into the protrusion 137*ii* (in a press (interference) fit). The press fit between the hinge pins 604*iii*, 604*iv* and the protrusion 137*ii* allows for movement (pivoting) of the protrusion 137*ii* in relation to the base plate 602 about a (second) pivot axis Y2, which extends through (is defined by) the hinge pins 604*iii*, 604*iv*. As seen in FIG. 13A, the base plate 602 (e.g., the mounting platform 616) is configured such that the pivot axes Y1, Y2 are oriented in transverse (e.g., (generally) orthogonal, perpendicular) relation to the axis X defined by the receptacle 622 and in (generally) parallel relation to the bosses 626*i*, 626*ii*.

In the illustrated embodiment, the interconnect mechanism 600 includes four hinge pins 604*i*-604*iv*, which extend into channels 624-624*iv*, respectively. The inclusion of four hinge pins 604 allows for the length of each hinge pin 604 to be reduced (when compared to embodiments in which the protrusions 137 may be connected to the base plate 602 by a pair of hinge pins 604), which avoids penetration of the receptacle 622 by the hinge pins 604, thereby preventing interference with insertion of the accessory A (FIG. 4). It should be appreciated, however, that the particular number of hinge pins 604 may be varied in alternate embodiments without departing from the scope of the present disclosure. For example, an embodiment of the interconnect mechanism 600 including a pair of hinge pins 604 is also envisioned herein (e.g., depending upon the particular dimensions of the image capture device 400, the dimensions of the base plate 602, the dimensions of the accessory A, etc.) and would not be beyond the scope of the present disclosure.

With continued reference to FIGS. 13A-18, the restrictors 606 will be discussed. As indicated above, the restrictors 606 are configured for engagement (contact) with the protrusions 137. More specifically, the restrictors 606 are configured for frictional engagement (contact) with the protrusions 137 in order to inhibit (if not entirely prevent) unintended movement (pivoting) of the protrusions 137 (e.g., unintended reconfiguration of the interconnect mechanism 600 from the nested configuration towards the extended configuration and unintended reconfiguration of the interconnect mechanism 600 from the extended configuration towards the nested configuration). The increased resistance to movement provided by the restrictors 606 disallows free movement of the protrusions 137 and, thus, facilitates more controlled and deliberate positioning thereof.

The restrictors 606 may include any material(s) suitable for the intended purpose of limiting free movement of the protrusions 137 via frictional engagement therewith in the manner described above. For example, in the illustrated embodiment, the restrictors 606 include (e.g., are formed partially or entirely from) one or more non-metallic materials (e.g., one or more plastic, polymeric, and/or composite materials). More specifically, the restrictors 606 are configured as rubberized pads 640 (FIG. 13A). Embodiments in which the restrictors 606 may include (e.g., may be formed partially or entirely from) one or more metallic materials (e.g., aluminum, steel, etc.) are also envisioned herein, however, and would not be beyond the scope of the present disclosure. For example, it is envisioned that the restrictors 606 may include a multi-material construction in which a metallic core is overlayed with a non-metallic jacket.

The restrictors 606 include a (generally) U-shaped cross-sectional configuration that defines a pair of arms 642, each of which includes an arcuate cutout (recess) 644, and a passage 646 that extends between the arms 642. The cutouts 644 define an outer contour (profile) 648 that corresponds to (e.g., mirrors) an outer contour (profile) 168 (FIGS. 13A, 18) defined by the first ends 166 of the protrusions 137. As such, upon assembly of the interconnect mechanism 600 and connection of the interconnect mechanism 600 to the image capture device 400, the cutouts 644 receive the first ends 166 of the protrusions 137, which further facilitates the frictional engagement between the restrictors 606 and the protrusions 137 discussed above.

The passages 646 extend between the arms 642 and are configured to receive the bosses 626 such that the arms 642 are positioned laterally (radially) outward of the bosses 626 upon assembly of the interconnect mechanism 600, as seen in FIGS. 15 and 16. In certain embodiments, such as that which is illustrated, the base plate 602, the protrusions 137, and the restrictors 606 are configured such that the restrictors 606 are laterally (radially) compressed between the protrusions 137 and the bosses 626, which further facilitates retention of the restrictors 606 and further inhibits (if not entirely prevents) unintended removal of the restrictors 606 from the base plate 602.

As seen in FIG. 12, the restrictors 606 are configured such that, upon assembly of the interconnect mechanism 600, the restrictors 606 protrude inwardly from the base plate 602 (e.g., towards the body 102 of the image capture device 400). Such inward protrusion facilitates the application of pressure to the restrictors 606 during (upon) connection of the interconnect mechanism 600 to the image capture device 400. The restrictors 606 are thus compressed between the base plate 602 and the body 102 (e.g., within the cavity 103 (FIG. 7)), thereby inhibiting (if not entirely preventing) unintended relative movement between the interconnect mechanism 600 and the image capture device 400 (e.g., rattling, etc.) and absorbing (dampening) forces that may otherwise be transmitted to the image capture device 400 via the interconnect mechanism 600 (e.g., during connection of the accessory A (FIG. 4), upon contact with an external object, in the event that the image capture device 400 is dropped, etc.).

With reference now to FIGS. 11-15 and 18 in particular, the cover 608 will be discussed, which includes a main body portion 650 and braces 652*i*, 652*ii*. While the interconnect mechanism 600 is illustrated as including the cover 608 throughout each of the figures, embodiments of the interconnect mechanism 600 that are devoid of the cover 608 are also envisioned herein (e.g., to reduce the overall cost of the interconnect mechanism 600 and the image capture device 400, simplify assembly, etc.), however, and would not be beyond the scope of the present disclosure.

The cover 608 is non-metallic in construction and includes (e.g., is formed partially or entirely from) one or more resilient materials (e.g., one or more plastic, polymeric, and/or composite materials). More specifically, in the illustrated embodiment, the cover 608 includes (e.g., is formed partially or entirely from) polycarbonate. The incorporation of non-metallic material(s) into the cover 608 not only thermally insulates the interconnect mechanism 600 (e.g., the base plate 602), but increases acceptable touch-temperature limits for the image capture device 400 and contributes to (e.g., improves) the overall aesthetic appearance thereof. The incorporation of non-metallic material(s) into the cover 608 allows for formation of the cover 608 through a variety of manufacturing processes, including, for example, injection molding, laser machining, etc.

In the illustrated embodiment, the cover 608 is integral (e.g., unitary, monolithic) in construction and is formed from a single piece of non-metallic material. Embodiments in which the main body portion 650 and the braces 652 may be formed as separate (discrete) components of the cover 608 are also envisioned herein, however, and would not be beyond the scope of the present disclosure.

The main body portion 650 of the cover 608 defines an opening 654 (FIGS. 13A, 13B) that is configured to receive the accessory A (FIG. 4), whereby the accessory A is insertable into the receptacle 622 through the cover 608 so as to facilitate connection of the accessory A to the interconnect mechanism 600, and is configured in correspondence with the mounting platform 616. More specifically, the main body portion 650 defines an inner contour (profile) 656 that corresponds to (e.g., mirrors) an outer contour (profile) 658 defined by the mounting platform 616 such that, upon assembly of the interconnect mechanism 600, the cover 608 overlies the base plate 602 so as to inhibit (if not entirely prevent) user contact therewith.

The braces 652*i*, 652*ii* extend laterally (radially) outward from the main body portion 650 (e.g., in the respective forward and rearward directions 1, 2) and each include: a (first) leg 660*i*; a (second) leg 660*ii*; and an elbow 662 that extends between and connects the legs 660*i*, 660*ii*. In the illustrated embodiment, the legs 660*i*, 660*ii* are arranged in (generally) orthogonal (perpendicular) relation (e.g., such that the elbow 662 defines an angle α (FIG. 13B) that is (approximately) equal to 90 degrees), whereby the legs 660*i* extend in (generally) orthogonal (perpendicular) relation to the outer faces 630 (FIG. 13A) of the bosses 626 and in (generally) parallel relation to the side faces 632 of the bosses 626, and the legs 660*ii* extend in (generally) parallel relation to the outer faces 630 of the bosses 626 and in (generally) orthogonal (perpendicular) relation to the side faces 632 of the bosses 626. Embodiments in which the legs 660*i*, 660*ii* may be arranged in non-orthogonal relation (e.g., embodiments in which the elbow 662 may define an angle α that is substantially lesser or greater than 90 degrees) are also envisioned herein (e.g., depending upon the particular configuration of the base plate 602), however, and would not be beyond the scope of the present disclosure.

The legs 660*ii* include discontinuous (interrupted) outer surfaces 664 that define apertures 666, which are configured to receive the mechanical fasteners 636 (FIG. 13A) such that the mechanical fasteners 636 extend through the cover 608 and into the bosses 626 so as to (mechanically) connect the braces 652*i*, 652*ii* to the bosses 626*i*, 626*ii*, respectively. In the illustrated embodiment, the base plate 602, the mechanical fasteners 636, and the cover 608 are configured such that the braces 652*i*, 652*ii* are removably connectable to (engageable with) the bosses 626*i*, 626*ii*. Embodiments in which the cover 608 may be non-removably (fixedly) connectable to the mounting platform 616 (via the bosses 626) are also envisioned herein, however, and would not be beyond the scope of the present disclosure.

In certain embodiments, such as that which is illustrated, the base 610 includes notches 668 (FIGS. 13A, 16) that are configured to receive (accommodate) the mechanical fasteners 636 upon assembly of the interconnect mechanism 600. The notches 668 thus create increased clearance for the mechanical fasteners 636 and reduce the overall dimensions of the base plate 602 (e.g., the thickness of the base 610). Embodiments of the interconnect mechanism 600 that are devoid of the notches 668 are also envisioned herein, however, and would not be beyond the scope of the present disclosure.

The legs 660*i*, 660*ii* include flanges 670, 672, which extend inwardly towards the base 610 and the receptacle 622, respectively, so as to define chambers 674 (FIG. 13B). The chambers 674 are configured to receive the bosses 626, which facilitates proper alignment (registration) of the apertures 666 with the apertures 634 (FIG. 13A) and the opening 654 with the receptacle 622. Additionally, in certain embodiments, such as that which is illustrated, the legs 660*ii* further include feet 676, which extend laterally (radially) outward therefrom. The feet 676 define receiving spaces 678 for the mechanical fasteners 636 (FIG. 13A), which allows the mechanical fasteners 636 to be (generally) flush mounted with the legs 660*ii* upon assembly of the interconnect mechanism 600 and reduces (if not entirely eliminates) gapping between the cover 608 and the base plate 602 (e.g., the base 610).

With reference now to FIGS. 4-18, various methods of assembling the interconnect mechanism 600 and the image capture device 400 will be discussed.

During assembly of the interconnect mechanism 600, the restrictors 606 (FIGS. 12, 13, 17) are inserted into the windows 614 such that the restrictors 606 extend into the base plate 602 and through the base 610, whereby the arms 642 are positioned about the bosses 626 such that the bosses 626 are received by the passages 646, as seen in FIGS. 15 and 18. Insertion of the restrictors 606 into the windows 614 facilities engagement (contact) with the protrusions 137 via reception within the cutouts 644 defined by the arms 642. More specifically, the protrusions 137 are pivotably connected to the base plate 602 (about the pivot axes Y1, Y2 (FIG. 15)) by respectively inserting the segments 638*i*, 638*ii* (FIG. 14) of the hinge pins 604 into the channels 624 (FIG. 13A) (in the mounting platform 616) and the openings 164 (in the protrusions 137), which facilitates reconfiguration of the interconnect mechanism 600 between the nested configuration (FIG. 4) and the collapsed configuration (FIG. 5). The cover 608 (FIGS. 11-15, 18) is then connected to the base plate 602 in order to thermally insulate the interconnect mechanism 600 and increase the touch-temperature limit thereof. More specifically, the bosses 626 are inserted into the chambers 674 (FIG. 13B) defined by the braces 652, which aligns the apertures 666 in braces 652 with the apertures 634 (FIG. 13A) in the bosses 626 and aligns the opening 654 with the receptacle 622. The mechanical fasteners 636 are then inserted through the apertures 666 and into the apertures 634 to (mechanically) connect the cover 608 to the base plate 602.

Either prior or subsequent to assembly of the interconnect mechanism 600, the reinforcement member 500 (FIGS. 6, 7) is connected to the body 102 of the image capture device 400 with the adhesive member 700 positioned therebetween. More specifically, the adhesive member 700 and the reinforcement member 500 are positioned such that the opening 704 is aligned with the depression 144 and the port 508 and such that the flanges 706 and the tabs 708 on the adhesive member 700 are aligned with the flanges 510 and the tabs 512 on the reinforcement member 500, respectively. The adhesive member 700 and the reinforcement member 500 are then advanced into the relief 142 defined by the body 102 of the capture device 400, whereby the port 508 is inserted into the depression 144 (through the opening 704) with the flanges 510, 706 and the tabs 512, 708 positioned in overlying fashion.

Upon connection of the reinforcement member 500 to the body 102 of the image capture device 400 and assembly of the interconnect mechanism 600, the interconnect mechanism 600 is connected to the image capture device 400 by inserting the base plate 602 into the recess 140 (FIGS. 6, 7), whereby the interconnect mechanism 600 overlies the reinforcement member 500. In order to facilitate such connection, the interconnect mechanism 600 is reconfigured from the nested configuration (FIG. 4) into the extended configuration (FIG. 5) so as to expose the apertures 612 in the base 610, which allows for insertion of the mechanical fasteners 162 through the apertures 612 and into the apertures 146.

Thereafter, the interconnect mechanism 600 can be returned to the nested configuration so as to permit connection of the accessory A (FIG. 4). More specifically, with the interconnect mechanism 600 in the nested configuration, the accessory A is insertable into the receptacle 622 in the base plate 602 through the opening 654 in the cover 608. The accessory A can then be secured to the image capture device 400 via relative rotation so as to cause engagement of the internal threading 628 on the receptacle with the external threading T on the accessory A.

In certain embodiments, it is envisioned that the interconnect mechanism 600 and the image capture device 400 may be configured to interface magnetically with each other in order to maintain the interconnect mechanism 600 in the nested configuration. For example, in the illustrated embodiment, the protrusions 137 and the body 102 of the image capture device 400 respectively include one or more corresponding more magnetic members 170 (FIGS. 6, 7, 13A), 172 (FIG. 6) in order to automatically restore (and maintain) the nested configuration of the interconnect mechanism 600 upon sufficient approximation of the magnetic members 170, 172.

Although shown as being embedded within the protrusions 137, it is envisioned that the magnetic members 170 may be connected to (or otherwise supported by) the protrusions 137 in any suitable manner. Additionally, while the magnetic members 170 are configured as permanent magnets 174 and the magnetic member 172 is configured as a magnetic, metallic surface 176, it should be appreciated that the particular configurations of the magnetic members 170, 172 may be varied in alternate embodiments without departing from the scope of the present disclosure and that the magnetic members 170, 172 may be configured in any manner suitable for the intended purpose of (automatically) restoring and maintaining the nested configuration of the interconnect mechanism 600 in the manner described above.

In an alternate embodiment, it is envisioned that the magnetic members 170, 172 may each be provided as components of the interconnect mechanism 600. For example, it is envisioned that the magnetic member(s) 170 may be included on the protrusions 137, as discussed in connection with FIGS. 6, 7, and 13A, and that the magnetic member(s) 172 (e.g., the magnetic, metallic surface(s) 176) may be included on (provided by) the base 610 of the base plate 602 (rather than on the body 102 of the image capture device 400).

Figure 21:
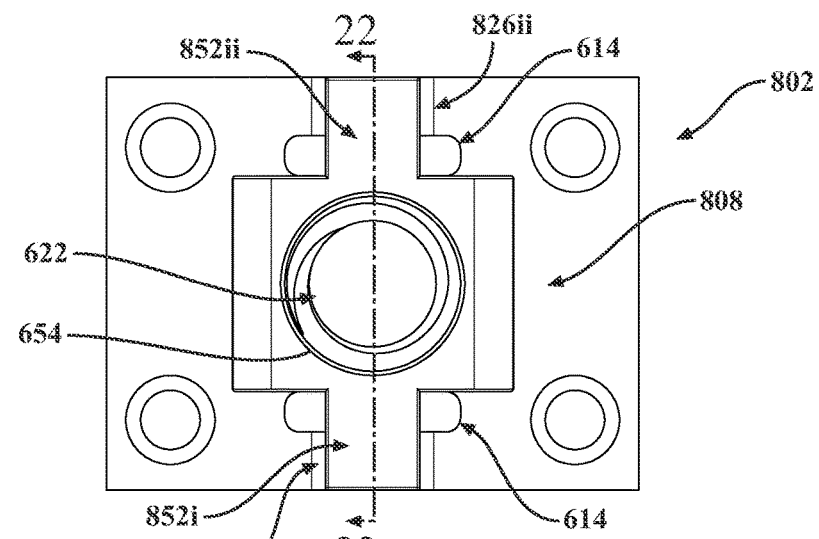
FIG. 21 is a bottom, plan view of the base plate and the cover seen in FIG. 19 shown connected together.
Figure 22:
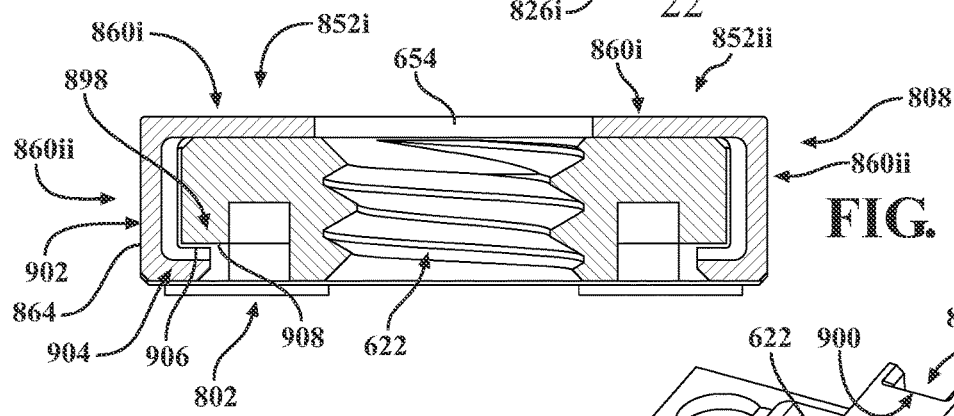
FIG. 22 is a cross-sectional view of the base plate and the cover taken along line 22-22 in FIG. 21.
Figure 23:
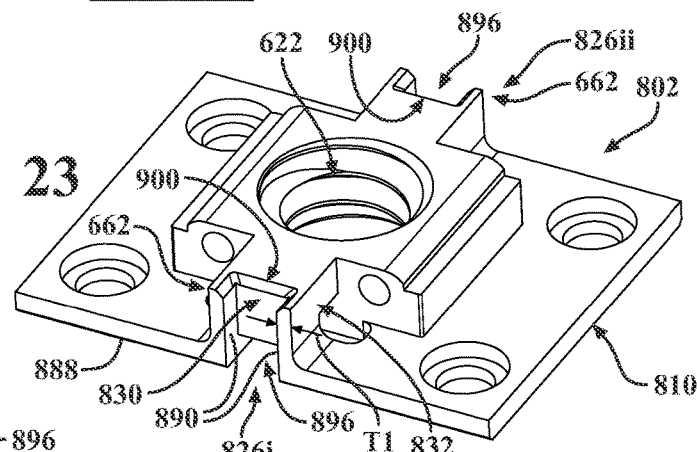
FIG. 23 is a bottom, perspective view of the base plate seen in FIG. 19.
Figure 24:
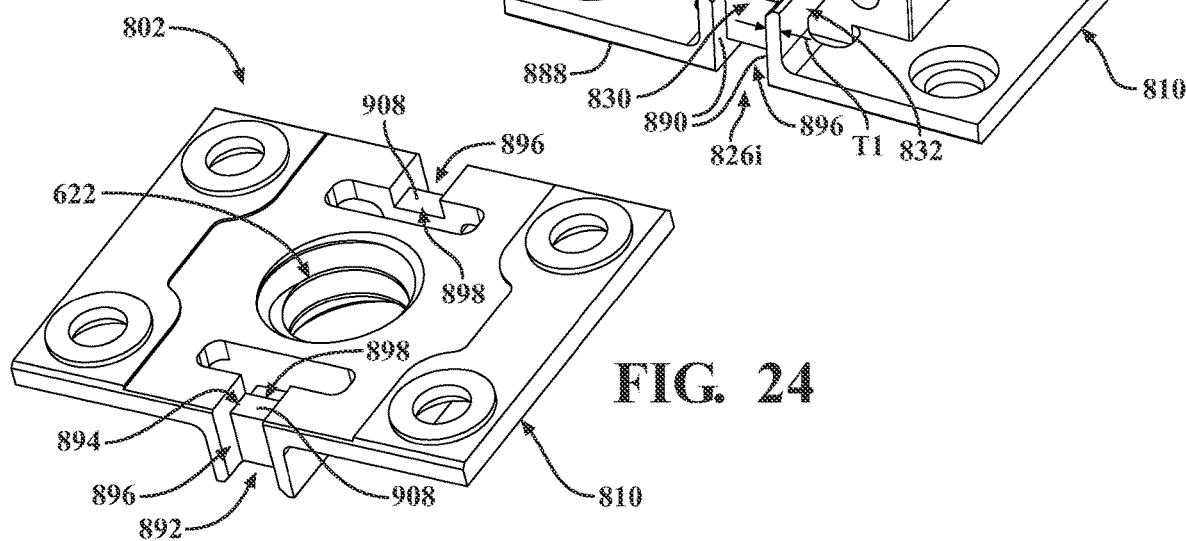
FIG. 24 is a top, perspective view of the base plate seen in FIG. 19.

With reference now to FIGS. 19-26, an alternate embodiment of the interconnect mechanism 600 will be discussed, which includes: the aforementioned protrusions 137i, 137ii (FIGS. 4-18); a base plate 802; the aforementioned hinge pins 604 (FIGS. 4-18); the aforementioned restrictors 606 (FIGS. 4-18); and a cover 808. More specifically, FIG. 19 is a bottom, perspective view of the base plate 802 and the cover 808 shown connected together; FIG. 20 is a top, perspective view of the base plate 802 and the cover 808 shown connected together; FIG. 21 is a bottom, plan view of the base plate 802 and the cover 808 shown connected together; FIG. 22 is a cross-sectional view of the base plate 802 and the cover 808 taken along line 22-22 in FIG. 21; FIG. 23 is a bottom, perspective view of the base plate 802; FIG. 24 is a top, perspective view of the base plate 802; FIG. 25 is a bottom, perspective view of the cover 808; and FIG. 26 is a top, perspective view of the cover 808. The base plate 802 and the cover 808 includes feature similar to the base plate 602 and the cover 608 discussed above (FIGS. 4-18), respectively, and, accordingly, will only be discussed with respect to differences therefrom in the interest of brevity. As such, identical reference characters will be utilized to refer to elements, structures, features, etc., common to the base plates 602, 802 and the covers 608, 808.

Whereas the base plate 602 and the cover 608 (FIGS. 4-15) are configured for mechanical connection via insertion of the mechanical fasteners 636 (FIG. 13A) through the apertures 666 in the cover 608 and into the apertures 634 in the mounting platform 616 (e.g., the bosses 626), the base plate 802 and the cover 808 are configured for mechanical connection in a press fit (e.g., a snap fit). To facilitate such connection, the base plate 802 and the cover 808 include corresponding bosses 826i, 826ii and braces 852i, 852ii.

The base plate 802 includes a base 810 that incorporates an (additional) relief 880 (FIG. 20) that extends (vertically downward) so as to define lateral supports 882, 884, which include the apertures 612. The relief 880 corresponds in configuration to the relief 142 (FIG. 7) defined by the body 102 of the image capture device 400 and the reinforcement member 500, which allows for insertion of the reinforcement member 500 into the relief 880. More specifically, the relief 880 defines an inner contour (profile) 886 that corresponds to (e.g., mirrors) the inner contour (profile) 154 defined by the relief 142 and the outer contour (profile) 502 defined by the reinforcement member 500, whereby the relief 880 receives the flanges 510 and the tabs 512 so as to provide for a mechanical interface between the reinforcement member 500 and the base plate 802 that inhibits (if not entirely prevents) relative movement (e.g., rotation) between the reinforcement member 500 and the base plate 802 as well as relative movement (e.g., rotation) between the reinforcement member 500 and the base plate 802 and the body 102 of the image capture device 400

The bosses 826 are (generally) identical in configuration and each include outer (end) faces 830 and side faces 832. In contrast to the bosses 626 included on the base plate 602 (FIGS. 4-15), the end faces 830 are devoid of the apertures 634 (FIG. 13A), which are obviated by the press fit connection between the base plate 802 and the cover 808. As a result, any need for the mechanical fasteners 636 is also obviated, which allows for omission of the notches 668 (FIG. 13A), thereby simplifying manufacture of the base plate 802 and reducing costs. Additionally, whereas the side faces 632 of the bosses 626 (FIGS. 4-18) are coterminous (coextensive) with the outer faces 630, the side faces 832 of the bosses 826 extend laterally (radially) beyond the end faces 832 to a periphery 888 (perimeter, edge) of the base 810 so as to define extensions 890 and a (first) indent 892, which extends laterally (radially) inward (e.g., towards the receptacle 662) into the bosses 826. As seen in FIGS. 23 and 24, the indent 892 is in communication with a (second)

indent 894, which extends vertically (upward) into the base 810, whereby the indents 892, 894 collectively define hollows 896 that are configured to receive the braces 852 and anchor blocks 898 that are configured for engagement (contact) therewith, as described in further detail below.

The bosses 826 include mating surfaces 900 (FIG. 23) that are configured for engagement (contact) with the cover 808, as described in further detail below. More specifically, the mating surfaces 900 extend about the indent 892 and are angled (tapered) outwardly (e.g., away from the hollow 896) such that a thickness T1 of the side faces 832 is reduced at the elbows 662. Although shown as being (generally) linear in configuration, embodiments are also envisioned in which the mating surfaces 900 may be non-linear (e.g., arcuate, radiused) in configuration.

With particular reference to FIGS. 25 and 26, the cover 808 will be discussed. Similar to the cover 608 (FIGS. 4-15), the braces 852$i$, 852$ii$ on the cover 808 each include legs 860$i$, 860$ii$. In contrast to the cover 608 (FIGS. 4-15), however, in which the legs 660$ii$ of the braces 652 include interrupted outer surfaces 664, the legs 860$ii$ of the braces 852 include continuous (non-interrupted) outer surfaces 864 that are devoid of the aforementioned apertures 666, which are obviated by the press fit connection between the base plate 802 and the cover 808.

The legs 860$ii$ include stems 902, which extend (vertically upward) from the legs 860$i$ in (generally) orthogonal (perpendicular) relation thereto, and locking members 904. The locking members 904 extend laterally (radially) inward from the stems 902 (e.g., towards the opening 654) in (generally) orthogonal (perpendicular) relation thereto and are configured for engagement (contact) with the bosses 826 on the base plate 802. More specifically, the locking members 904 define shoulders 906 that are configured for engagement (contact) with (inner) retention surfaces 908 (FIGS. 22, 24) defined by the anchor blocks 898 such that, upon assembly of the cover 808 and the base plate 802, the braces 852 are flush mounted with the bosses 826 and the base 810. As seen in FIGS. 19 and 20, upon assembly of the cover 808 and the base plate 802, the outer surfaces 864 of the legs 860$ii$ (e.g., the stems 902) are (generally) coterminous (coextensive) with the side faces 832 of the bosses 826 and the periphery 888 of the base 810, and the locking members 904 located adjacent to the windows 614, with bottom surfaces 910 thereof being (generally) coterminous (coextensive) with the relief 880.

In certain embodiments, such as that which is illustrated, the locking members 904 include (define) one or more (tapered, angled) bearing surfaces 912 (FIG. 26) that are configured for engagement (contact) with the bosses 826 (e.g., the mating surfaces 900 (FIG. 23)). More specifically, the locking members 904 include (first, inner) bearing surfaces 912$i$ and (second, outer) bearing surfaces 912$ii$, which are configured such that the bearing surfaces 912$i$, 912$ii$ extend along axes that are oriented in transverse (e.g., generally) orthogonal, perpendicular) relation.

The bearing surfaces 912$i$ are configured such that, during connection of the cover 808 to the base plate 802, the braces 852 are deflected (displaced) outwardly (e.g., away from the opening 654) from a normal (initial) position into a deflected (subsequent) position. More specifically, the brace 852$i$ is deflected away from the brace 852$ii$ in the forward direction 1 (FIG. 26) and the brace 852$ii$ is deflected away from the brace 852$i$ in the rearward direction 2. As a result of the resilient material(s) used in construction of the cover 808, during connection of the cover 808 to the base plate 802, as the bearing surfaces 912$i$ clear (are advanced inwardly beyond) the anchor blocks 898, the braces 852 are automatically returned to their normal positions, which results in engagement (contact) between the locking members 904 (e.g., the shoulders 906) and the anchor blocks 898 (e.g., the retention surfaces 908) so as to secure (lock) together the cover 808 and the base plate 802.

The bearing surfaces 912$ii$ are configured to guide the braces 852 into the hollows 896 during connection of the cover 808 to the base plate 802 in order to correct any misalignment therebetween in the event that the braces 852 are offset from (e.g., are out of registration with) the hollows 896. Depending upon the extent to which the braces 852 are offset from the hollows 896, it is envisioned that the braces 852 may experience (resilient) lateral deflection upon engagement (contact) with the mating surfaces 900, which is also facilitated by the resilient material(s) used in construction of the cover 808.

As seen in FIGS. 25 and 26, the braces 852 include mating surfaces 914 that are configured for engagement (contact) with the mating surfaces 900 on the on the bosses 826. More specifically, the mating surfaces 914 extend about outer peripheries 916 (perimeters, edges) of the legs 860$ii$ at the interface between the legs 860$i$, 860$ii$ and are angled (tapered) inwardly (e.g., towards the hollow 896 (FIG. 24)) such that a thickness T2 of the leg 860$ii$ decreases with distance from the leg 860$i$. In various embodiments of the disclosure, it is envisioned that the mating surfaces 900, 914 may include non-linear (e.g., arcuate, radiused) or (generally) linear configurations, which may be either identical or non-identical.

With continued reference to FIGS. 25 and 26, the legs 860$ii$ (and the mating surfaces 914) are inset in relation to the legs 860$i$. More specifically, the legs 860$ii$ defines lateral surfaces 918 that are spaced inwardly from corresponding lateral surfaces 920 defined by the legs 860$i$, which creates gaps 922 that are configured to receive the extensions 890 (FIG. 23) so as to allow the braces 852 to overlay the bosses 826 in the manner illustrated in FIGS. 19 and 20.

With reference now to FIGS. 19-26, connection of the cover 808 to the base plate 802 will be discussed. Following insertion of the restrictors 606 (FIGS. 12, 13, 17) into the windows 614 and connection of the protrusions 137 to the base plate 802 via the hinge pins 604 (FIG. 13A), the cover 808 is advanced towards the base plate 802 such that the bearing surfaces 912 (FIG. 26) on the locking members 904 are brought into engagement (contact) with the bosses 826 (e.g., the mating surfaces 900 (FIG. 23)), which causes outward deflection of the braces 852 in the forward and rearward directions 1, 2 (FIG. 26). Continued advancement of the cover 808 towards the base plate 802 causes insertion of the braces 852 into the hollows 896 (FIGS. 23, 24) (e.g., such that the stems 902 of the legs 860$ii$ are received by the indents 892 and the locking members 904 are receive by the indents 894) and engagement (contact) between the locking members 904 (e.g., the shoulders 906) and the anchor blocks 898 (e.g., the retention surfaces 908) as the braces 852 are (automatically) returned to their normal positions, thereby securing (locking) together the cover 808 and the base plate 802.

Figure 30:
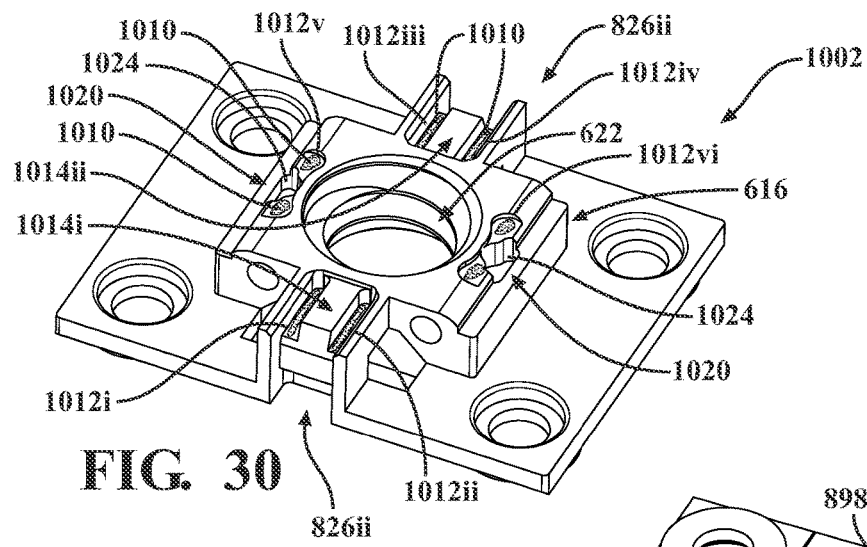
FIG. 30 is a bottom, perspective view of the base plate seen in FIG. 27.
Figure 31:
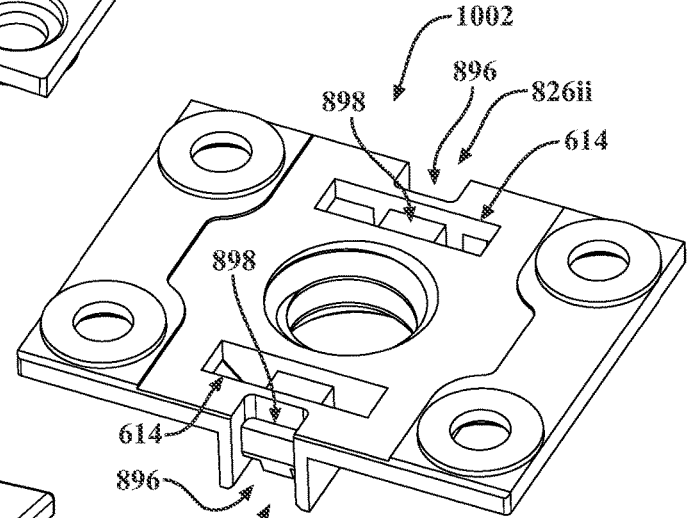
FIG. 31 is a top, perspective view of the base plate seen in FIG. 27.
Figure 32:
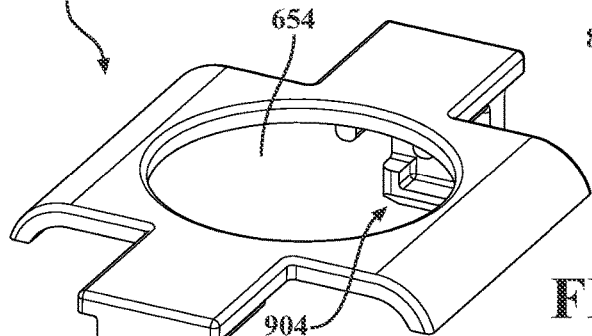
FIG. 32 is a bottom, perspective view of the cover seen in FIG. 27.
Figure 33:
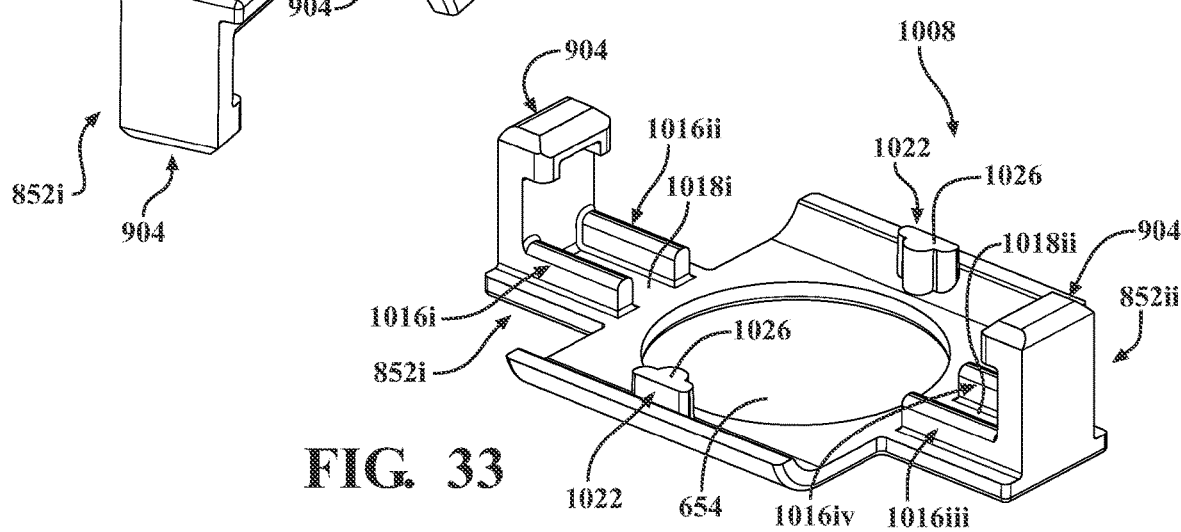
FIG. 33 is a top, perspective view of the cover seen in FIG. 27.
Figure 34:
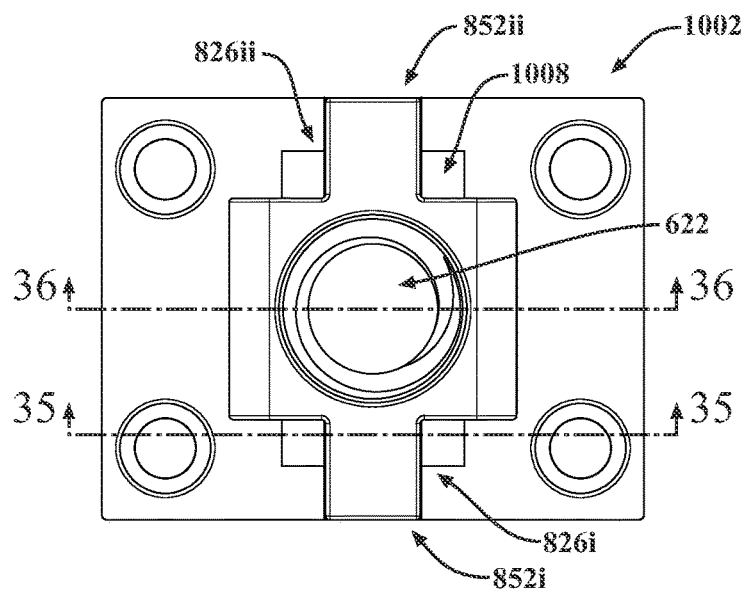
FIG. 34 is a bottom, plan view of the base plate and the cover seen in FIG. 27 shown connected together.
Figure 35:
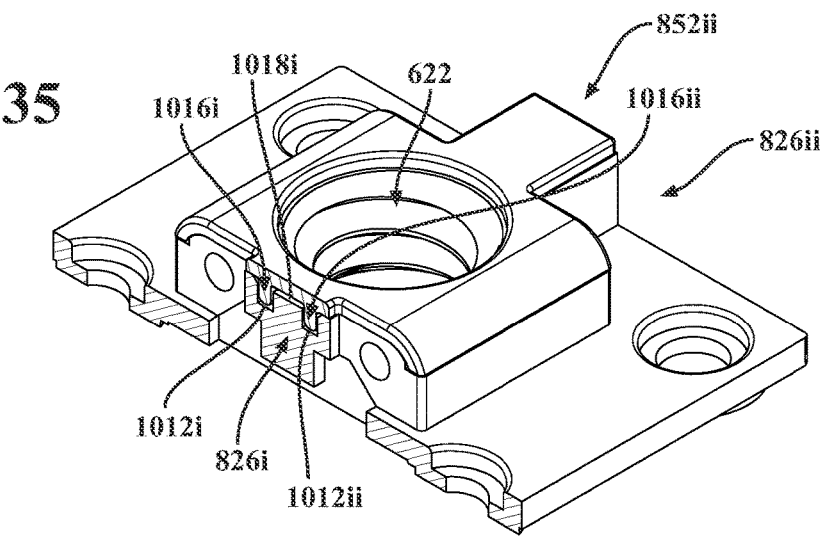
FIG. 35 is a cross-sectional view of the base plate and the cover taken along line 35-35 in FIG. 34.
Figure 36:
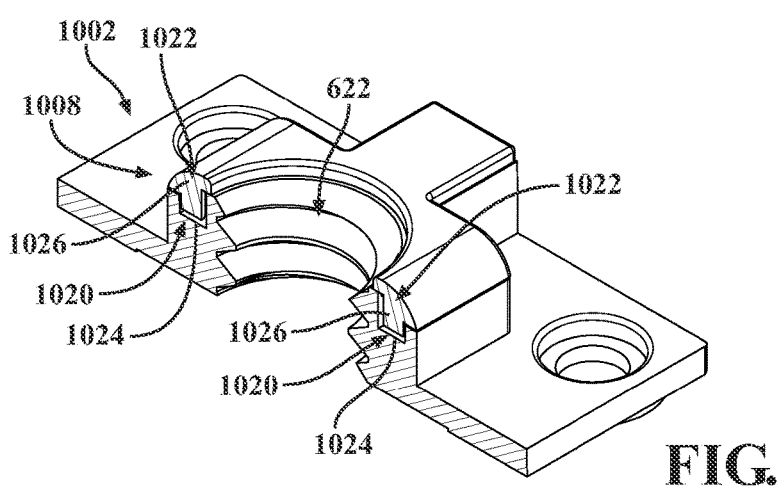
FIG. 36 is a cross-sectional view of the base plate and the cover taken along line 36-36 in FIG. 34.

With reference now to FIGS. 27-36, another embodiment of the interconnect mechanism will be discussed, which is identified by the reference character 1000 and includes: the aforementioned protrusions 137$i$, 137$ii$; a base plate 1002; the aforementioned hinge pins 604; the aforementioned restrictors 606; and a cover 1008. More specifically, FIG. 27 is a bottom, perspective view of the interconnect mechanism 1000 shown with parts separated; FIG. 28 is a bottom, perspective view of the base plate 1002 and the cover 1008 shown connected together; FIG. 29 is a top, perspective view of the base plate 1002 and the cover 1008 shown connected together; FIG. 30 is a bottom, perspective view of the base plate 1002; FIG. 31 is a top, perspective view of the base plate 1002; FIG. 32 is a bottom, perspective view of the cover 1008; FIG. 33 is a top, perspective view of the cover 1008; FIG. 34 is a bottom, plan view of the base plate 1002 and the cover 1008 shown connected together; FIG. 35 is a cross-sectional view of the base plate 1002 and the cover 1008 taken along line 35-35 in FIG. 34; and FIG. 36 is a cross-sectional view of the base plate 1002 and the cover 1008 taken along line 36-36 in FIG. 34. The base plate 1002 and the cover 1008 include features similar to those described in connection with the base plate 802 and the cover 808 (FIGS. 19-26), and, accordingly, will only be discussed with respect to differences therefrom in the interest of brevity. As such, identical reference characters will be utilized to refer to elements, structures, features, etc., common to the base plates 802, 1002 and the covers 808, 1008.

In addition to being mechanically connectable in the aforedescribed press fit, the base plate 1002 and the cover 1008 are adhesively connectable. More specifically, the cover 1008 is secured to the base plate 1002 via an adhesive 1010 (FIG. 30) that is applied (located, positioned) therebetween in adhesive channels 1012 that are defined by the base plate 1002 and/or the cover 1008.

As seen in FIG. 30, the base plate 1002 includes adhesive channels 1012*i*-1012*iv*, which extend (vertically upward) into the bosses 826*i*, 826*ii* so as to define (upstanding) spines 1014*i*, 1014*ii*. The adhesive channels 1012*i*-1012*iv* are configured to receive corresponding ribs 1016*i*-1016*iv* (FIG. 33), which extend (vertically downward) from the cover 1008 and laterally (radially) inward from the braces 852*i*, 852*ii* so as to define grooves 1018*i*, 1018*ii* therebetween, respectively. More specifically, the adhesive channels 1012*i*, 1012*ii* extend into the boss 826*i* so as to define the spine 1014*i*, which is configured for positioning between the ribs 1016*i*, 1016*ii* (e.g., within the groove 1018*i*), and the adhesive channels 1012*iii*, 1012*iv* extend into the boss 826*ii* so as to define the spine 1014*ii*, which is configured for positioning between the ribs 1016*iii*, 1016*iv* (e.g., within the groove 1018*ii*). In addition to increasing the surface area on the base plate 1002 and the cover 1008 available for application of the adhesive 1010 and collecting overflow of the adhesive 1010, the adhesive channels 1012, the spines 1014, and the ribs 1016 facilitate proper orientation of the base plate 1002 and the cover 1008 such that the braces 852 are properly aligned (in registration) with the bosses 826 and the opening 654 in the cover 1008 is properly aligned (in registration) with the receptacle 622 during assembly of the interconnect mechanism 1000.

While the interconnect mechanism 1000 is shown as including four adhesive channels 1012 and four ribs 1016 in the illustrated embodiment, it should be appreciated that the particular number of adhesive channels 1012 and ribs 1016 may be altered in various embodiments without departing from the scope of the present disclosure. As such, embodiments including both fewer and greater numbers of adhesive channels 1012 and ribs 1016 are envisioned herein and would not be beyond the scope of the present disclosure.

In certain embodiments of the disclosure, such as that which is illustrated, in order to further facilitate proper orientation of the base plate 1002 and the cover 1008, the base plate 1002 and the cover 1008 may further include corresponding alignment members 1020, 1022, respectively. Embodiments of the interconnect mechanism 1000 that are devoid of the alignment members 1020, 1022 are also envisioned herein (e.g., embodiments that exclusively include the adhesive channels 1012 and the ribs 1016), however, as are embodiments that are devoid of the adhesive channels 1012 and the ribs 1016 (e.g., embodiments that exclusively include the alignment members 1020, 1022), and would not be beyond the scope of the present disclosure.

In the illustrated embodiment, the alignment members 1020 on the base plate 1002 are configured as a pair of dimples 1024, which extend (vertically upward) into the mounting platform 616, and the alignment members 1022 on the cover 1008 are configured as a pair of detents 1026, which extend (vertically downward) from the cover 1008 and are configured for insertion into the dimples 1024. Embodiments in which the configurations of the alignment members 1020, 1022 may be reversed (e.g., embodiments in which the base plate 1002 includes the detents 1026 and the cover 1008 includes the dimples 1024) are also envisioned herein, however, and would not be beyond the scope of the present disclosure. Additionally, it should be appreciated that the particular number of alignment members 1020, 1022 respectively included on the base plate 1002 and the cover 1008 may be altered in various embodiments without departing from the scope of the present disclosure. For example, embodiments are envisioned in which the base plate 1002 and the cover 1008 may each include a single alignment member 1020, 1022, as are embodiments in which the base plate 1002 and the cover 1008 may include three or more alignment members 1020, 1022, respectively.

As seen in FIGS. 30 and 33, the dimples 1024 and the detents 1026 include corresponding non-circular transverse cross-sectional configurations, which provides the interconnect mechanism 1000 with an anti-rotation feature that inhibits (if not entirely prevents) relative rotation between the base plate 1002 and the cover 1008 and supplements the aforedescribed orientation (alignment, registration) feature (e.g., alignment of the bosses 826 and the braces 852, and alignment of the opening 654 and the receptacle 622). Although shown as including (generally) T-shaped transverse cross-sectional configurations, the dimples 1024 and the detents 1026 may include any corresponding configurations suitable for the intended purpose of facilitating proper orientation of the base plate 1002 and the cover 1008 during assembly of the interconnect mechanism 1000. As such, embodiments in which the dimples 1024 and the detents 1026 may include a circular transverse cross-sectional configuration are also envisioned herein and would not be beyond the scope of the present disclosure.

In certain embodiments, such as that which is illustrated, it is envisioned that the adhesive 1010 (FIG. 30) may be applied to one or more of the alignment members 1020, 1022 during assembly of the interconnect mechanism 1000 in order to supplement (or replace) the (adhesive) functionality of the adhesive channels 1012 and the ribs 1016. In such embodiments, it is envisioned that the base plate 1002 (and/or the cover 1008) may include one or more (additional) adhesive channels 1012 in order to increase the surface area on the base plate 1002 and the cover 1008 available for application of the adhesive 1010 and collecting overflow of the adhesive 1010, as descried above, which may be positioned in any suitable location. For example, in the illustrated embodiment, the interconnect mechanism 1000 includes adhesive channels 1012*v*, 1012*vi* (FIG. 30) that are located adjacent to (e.g., about) the dimples 1024 (e.g., laterally (radially) outward of the receptacle 622) and which extend (vertically upward) into the base plate 1002 (e.g., the mounting platform 616).

Although illustrated in connection with the alignment members 1020 on the base plate 1002 (e.g., the dimples 1024), embodiments in which the cover 1008 may include one or more adhesive channels 1012 that are located adjacent to (e.g., about) the alignment members 1022 (e.g., the dimples 1024) and which extend (vertically downward) into the cover 1008 are also envisioned herein and would not be beyond the scope of the present disclosure.

With continued reference to FIGS. 27-36, methods of assembling the interconnect mechanism 1000 will be discussed. The methods described below are substantially similar to the method discussed above with respect to the base plate 802 and the cover 808 illustrated in FIGS. 19-26 and, accordingly, will only be discussed with respect to differences therefrom in the interest of brevity.

Either prior or subsequent to insertion of the restrictors 606 into the windows 614 and connection of the protrusions 137 to the base plate 1002, the adhesive 1010 (FIG. 30) is applied to the base plate 1002 and/or the cover 1008. More specifically, the methods include adhesively connecting the cover 1008 and the base plate 1002 by applying the adhesive 1010 to one or more of the bosses 826 (e.g., to the adhesive channels 1012 and/or the spines 1014), the ribs 1016, the grooves 1018, and the alignment members 1020, 1022. For example, in one method of assembling the interconnect mechanism 1000, it is envisioned that the adhesive 1010 may be directly applied to one or more of the adhesive channels 1012, the spines 1014, the ribs 1016, and the grooves 1018. Alternatively, in another method of assembling the interconnect mechanism 1000, it is envisioned that the adhesive 1010 may be directly applied to the spines 1014 and the ribs 1016, and that the adhesive channels 1012 and the grooves 1018 may be utilized to capture any overflow of the adhesive 1010.

Thereafter, the cover 1008 is connected to the base plate 1002 via insertion of the braces 852 (FIG. 32) into the hollows 896 (FIG. 31) and engagement (contact) between the locking members 904 and the anchor blocks 898, during which, the ribs 1016*i*-1016*iv* (FIG. 33) are inserted into the adhesive channels 1012*i*-1012*iv* (FIG. 30), the spines 1014*i*, 1014*ii* are inserted into the grooves 1018*i*, 1018*ii*, and the alignment members 1022 (e.g., the detents 1026) are inserted into the alignment members 1020 (e.g., the dimples 1024).

Figure 37:
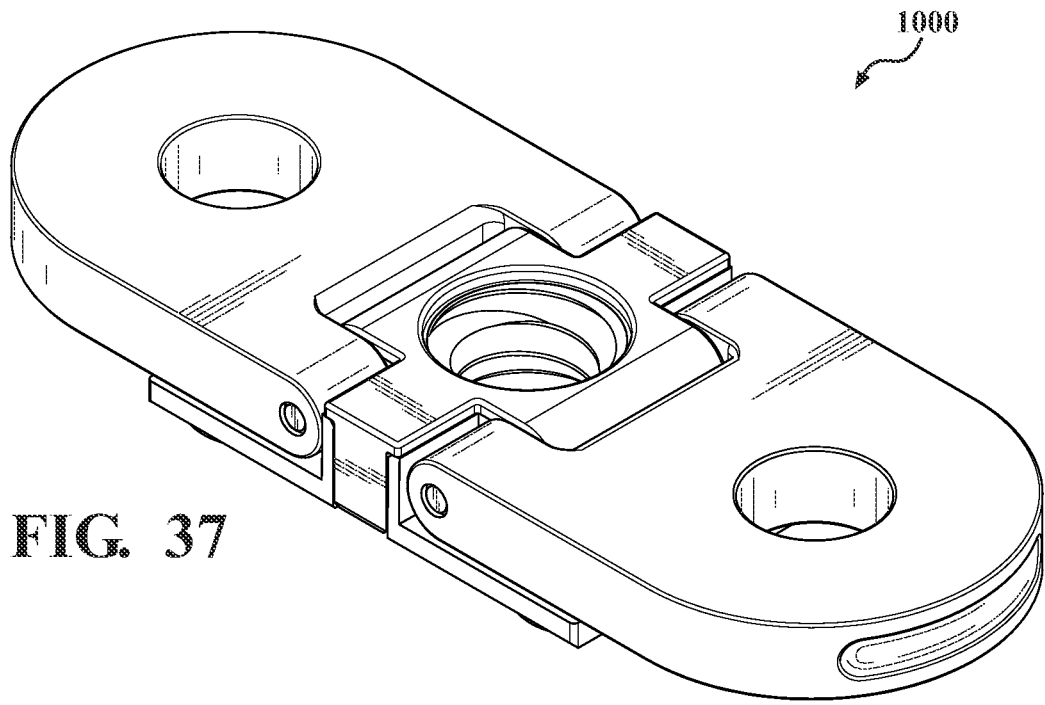
FIG. 37 is a bottom, perspective view of the interconnect mechanism seen in FIG. 27 shown in the nested configuration.
Figure 38:
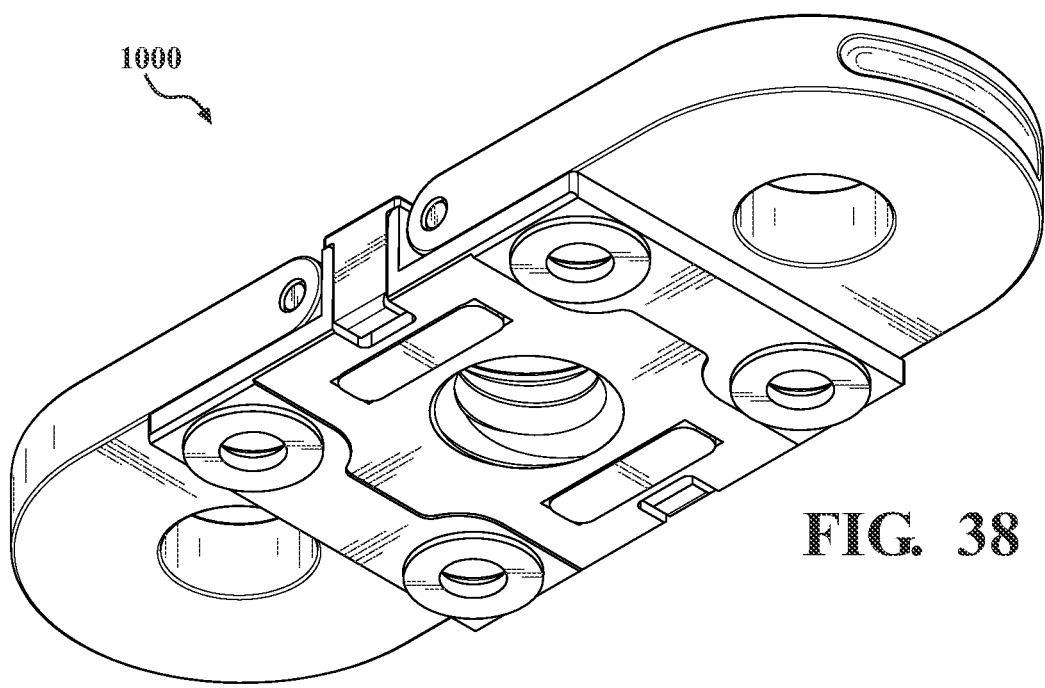
FIG. 38 is a top, perspective view of the interconnect mechanism seen in FIG. 27 shown in the nested configuration.
Figure 39:
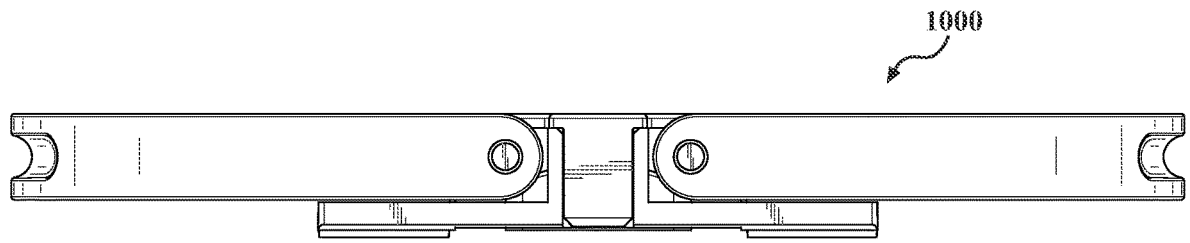
FIGS. 39 and 40 are side, plan views of the interconnect mechanism seen in FIG. 27 shown in the nested configuration.
Figure 40:
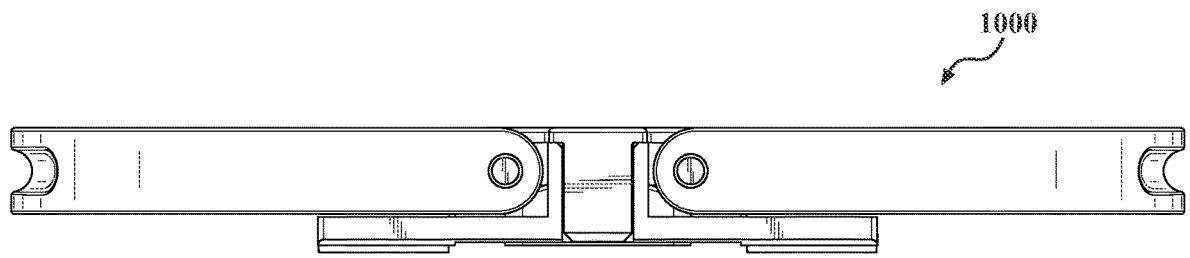
Figure 41:
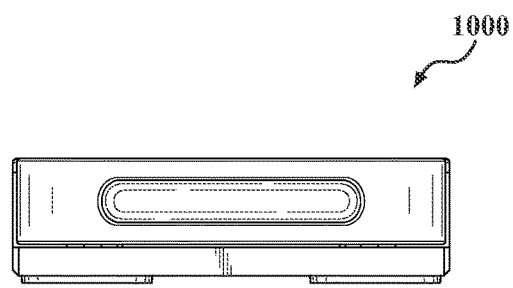
FIGS. 41 and 42 are end, plan views of the interconnect mechanism seen in FIG. 27 shown in the nested configuration.
Figure 42:
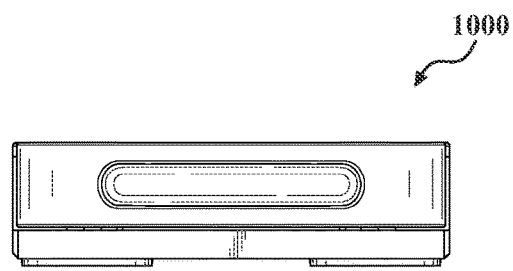
Figure 43:
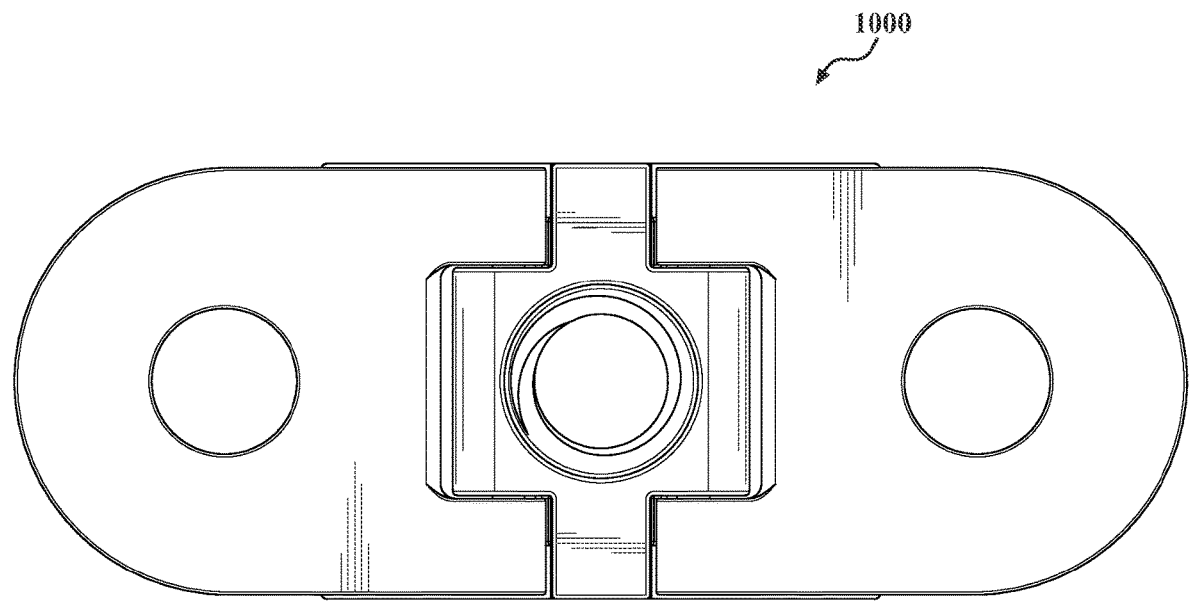
FIG. 43 is a bottom, plan view of the interconnect mechanism seen in FIG. 27 shown in the nested configuration.
Figure 44:
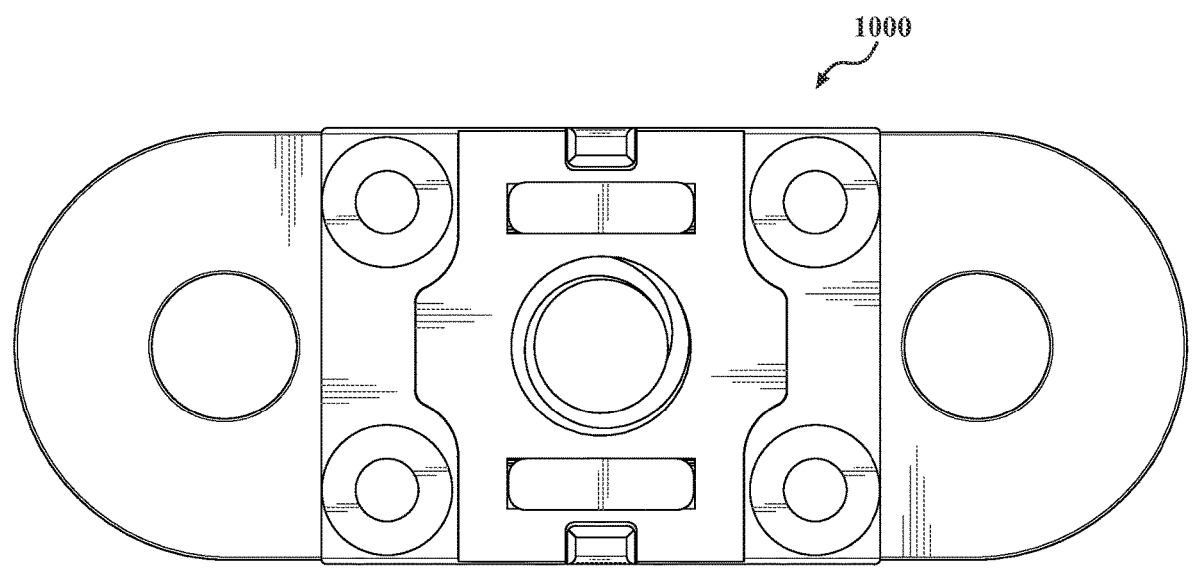
FIG. 44 is a top, plan view of the interconnect mechanism seen in FIG. 27 shown in the nested configuration.
Figure 45:
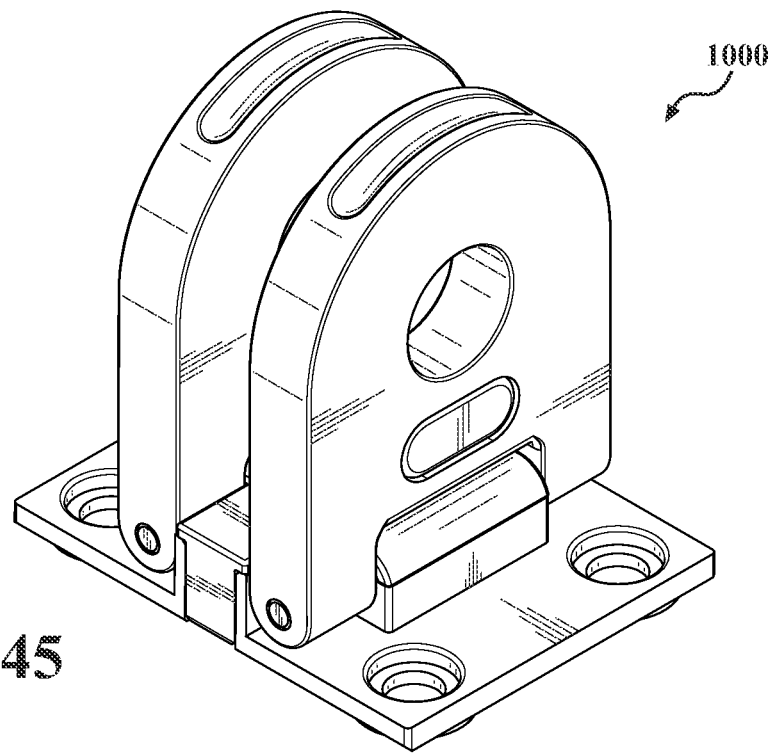
FIG. 45 is a bottom, perspective view of the interconnect mechanism seen in FIG. 27 shown in the extended configuration.
Figure 46:
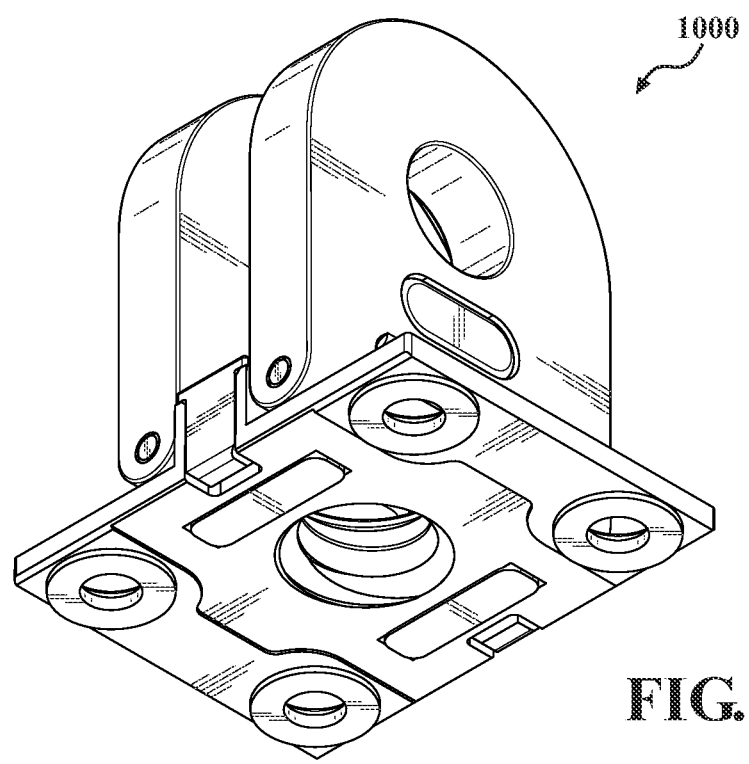
FIG. 46 is a top, perspective view of the interconnect mechanism seen in FIG. 27 shown in the extended configuration.
Figure 47:
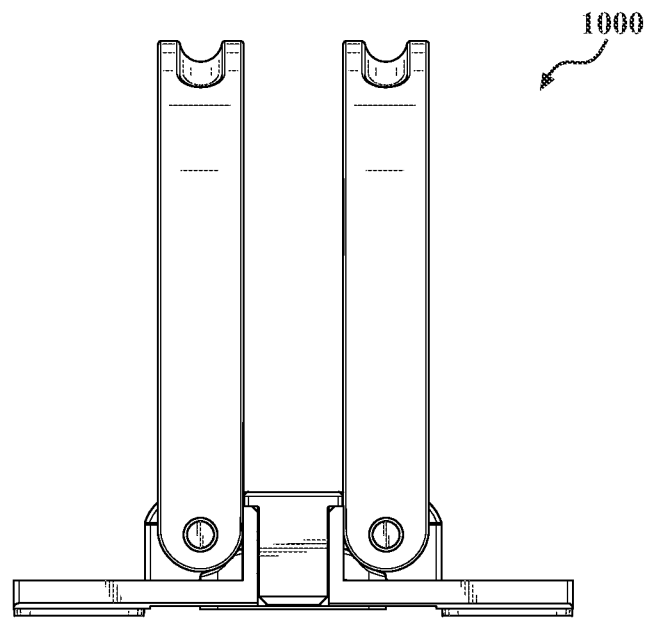
FIGS. 47 and 48 are side, plan views of the interconnect mechanism seen in FIG. 27 shown in the extended configuration.
Figure 48:
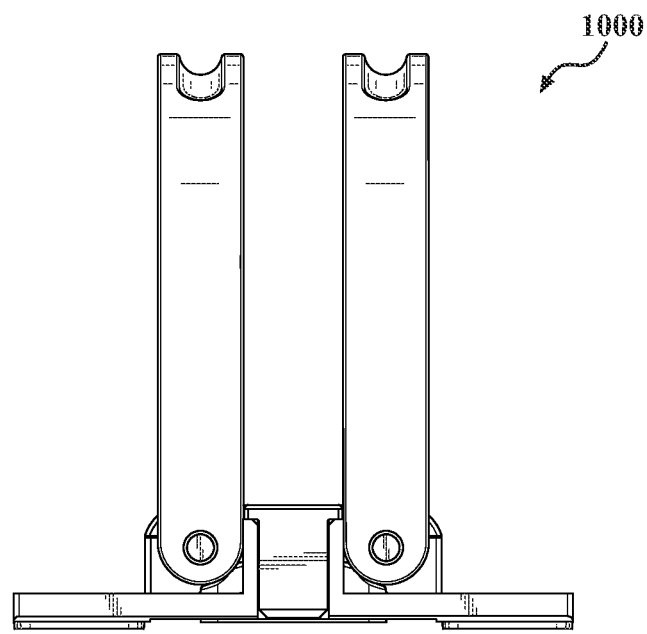
Figure 49:
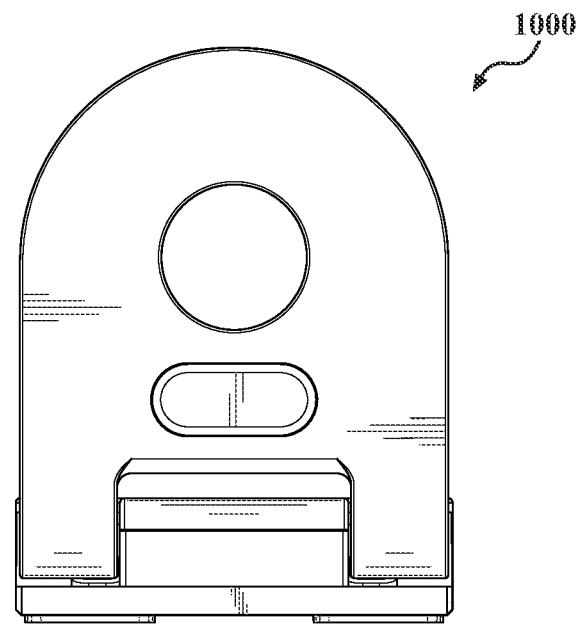
FIGS. 49 and 50 are end, plan views of the interconnect mechanism seen in FIG. 27 shown in the extended configuration.
Figure 50:
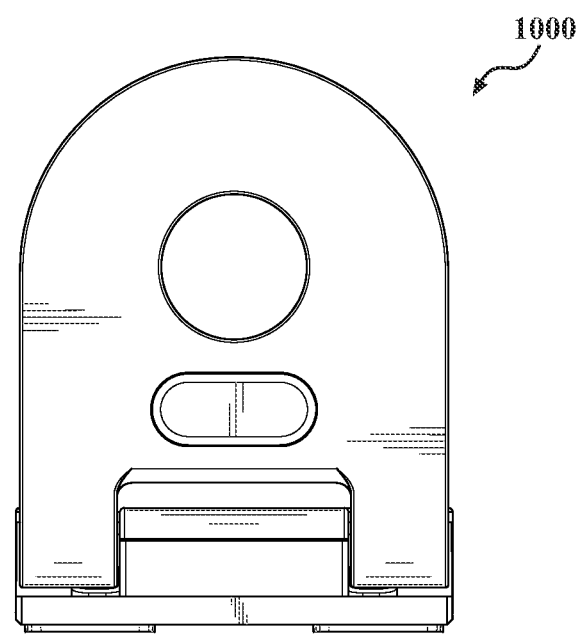
Figure 51:
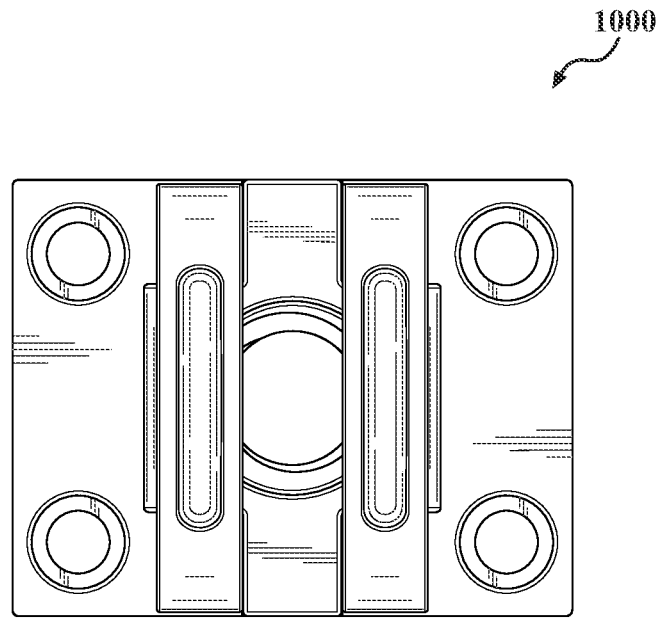
FIG. 51 is a bottom, plan view of the interconnect mechanism seen in FIG. 27 shown in the extended configuration.
Figure 52:
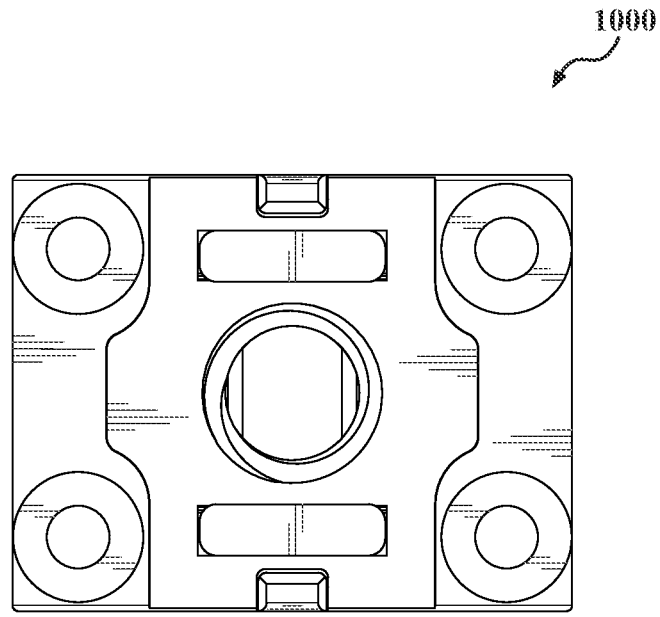
FIG. 52 is a top, plan view of the interconnect mechanism seen in FIG. 27 shown in the extended configuration.

FIGS. 37-52 are alternative views of the interconnect mechanism 1000 shown without reference numerals. More specifically, FIG. 37 is a bottom, perspective view of the interconnect mechanism 1000 shown in the nested configuration; FIG. 38 is a top, perspective view of the interconnect mechanism 1000 shown in the nested configuration; FIGS. 39 and 40 are side, plan views of the interconnect mechanism 1000 shown in the nested configuration; FIGS. 41 and 42 are end, plan views of the interconnect mechanism 1000 shown in the nested configuration; FIG. 43 is a bottom, plan view of the interconnect mechanism 1000 shown in the nested configuration; FIG. 44 is a top, plan view of the interconnect mechanism 1000 shown in the nested configuration; FIG. 45 is a bottom, perspective view of the interconnect mechanism 1000 shown in the extended configuration; FIG. 46 is a top, perspective view of the interconnect mechanism 1000 shown in the extended configuration; FIGS. 47 and 48 are side, plan views of the interconnect mechanism 1000 shown in the extended configuration; FIGS. 49 and 50 are end, plan views of the interconnect mechanism 1000 shown in the extended configuration; FIG. 51 is a bottom, plan view of the interconnect mechanism 1000 shown in the extended configuration; and FIG. 52 is a top, plan view of the interconnect mechanism 1000 shown in the extended configuration.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of" Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., ±25%). The term "generally parallel" should thus be understood as encompassing configurations in which the pertinent components are arranged in parallel relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An interconnect mechanism for connecting to a body of an image capture device, the interconnect mechanism comprising:
   a base plate defining a receptacle extending therethrough and configured to threadably engage an accessory such that the image capture device is directly connectable to the accessory via the interconnect mechanism;
   a cover connected to the base plate and configured to thermally insulate the interconnect mechanism; and
   first and second fingers pivotably connected to the base plate about first and second pivot axes such that the interconnect mechanism is reconfigurable between a collapsed configuration, in which the first and second fingers are nested within the body of the image capture device, and an extended configuration, in which the first and second fingers extend outwardly from the body of the image capture device.

2. The interconnect mechanism image of claim 1, further comprising hinge pins extending into the first and second fingers and into the base plate, wherein each hinge pin includes:
   a first segment defining a first transverse cross-sectional dimension; and
   a second segment defining a second transverse cross-sectional dimension larger than the first transverse cross-sectional dimension.

3. The interconnect mechanism of claim 2, including:
   a first hinge pin extending into the first finger and into the base plate in a first direction, wherein the second segment of the first hinge pin engages the first finger in an interference fit, and the first segment of the first hinge pin is received by the base plate so as to allow for pivoting of the first finger in relation thereto;
   a second hinge pin extending into the first finger and into the base plate in a second direction, wherein the second segment of the second hinge pin engages the first finger in an interference fit, and the first segment of the second hinge pin is received by the base plate so as to allow for pivoting of the first finger in relation thereto;
   a third hinge pin extending into the second finger and into the base plate in the first direction, wherein the second segment of the third hinge pin engages the second finger in an interference fit, and the first segment of the third hinge pin is received by the base plate so as to allow for pivoting of the second finger in relation thereto; and
   a fourth hinge pin extending into the second finger and into the base plate in the second direction, wherein the second segment of the fourth hinge pin engages the second finger in an interference fit, and the first segment of the fourth hinge pin is received by the base plate so as to allow for pivoting of the second finger in relation thereto.

4. The interconnect mechanism of claim 2, wherein the base plate includes a mounting platform configured to receive the hinge pins such that the hinge pins extend into the first and second fingers and into mounting platform to thereby pivotably connect the first and second fingers to the mounting platform.

5. The interconnect mechanism of claim 4, wherein the receptacle extends into the mounting platform.

6. The interconnect mechanism of claim 4, wherein the base plate further includes first and second bosses extending outwardly from the mounting platform in generally parallel relation to the first and second pivot axes.

7. The interconnect mechanism of claim 6, wherein the cover is configured for removable engagement with the first and second bosses.

8. The interconnect mechanism of claim 7, wherein the cover includes apertures configured to receive mechanical fasteners such that the mechanical fasteners extend through the cover and into the first and second bosses.

9. The interconnect mechanism of claim 7, wherein the cover and the base plate are configured for engagement in a press fit.

10. The interconnect mechanism of claim 7, wherein the interconnect mechanism further includes an adhesive located between the cover and the base plate, the base plate defining adhesive channels configured to receive the adhesive.

11. An image capture device comprising:
    a body;
    an interconnect mechanism connected to the body, the interconnect mechanism including:
      a base plate including:
        a receptacle configured to threadably engage an accessory such that the image capture device is directly connectable to the accessory via the interconnect mechanism;
        a first boss extending in a first direction and oriented in transverse relation to the receptacle; and
        a second boss extending in a second direction opposite to the first direction and oriented in transverse relation to the receptacle;
      a first finger and a second finger each pivotably connected to the base plate such that the interconnect mechanism is reconfigurable between a collapsed configuration and an extended configuration;
      a first hinge pin extending into the first finger and into the base plate;
      a second hinge pin extending into the first finger and into the base plate;
      a third hinge pin extending into the second finger and into the base plate;
      a fourth hinge pin extending into the second finger and into the base plate; and
      a first restrictor and a second restrictor each extending into the base plate and each including a generally u-shaped cross-sectional configuration, wherein the first restrictor and the second restrictor each define first and second arms configured for frictional engagement with the first finger and the second finger to inhibit unintended movement thereof; and a reinforcement member supported by the body such that the interconnect mechanism overlies the reinforcement member, the reinforcement member defining a port configured to receive the accessory and thereby inhibit unintended penetration of the body of the image capture device by the accessory.

12. The image capture device of claim 11, wherein the interconnect mechanism further includes a cover mechanically and/or adhesively connected to the base plate.

13. The image capture device of claim 12, wherein the cover is non-metallic in construction.

14. The image capture device of claim 12, wherein the cover and the base plate are configured for engagement in a press fit.

15. The image capture device of claim 11, wherein the first and second arms of the first and second restrictors include arcuate cutouts each defining an inner contour corresponding to an outer contour defined by the first and second fingers such that the cutouts receive the first and second fingers.

16. A method of assembling an image capture device, the method comprising:

pivotably connecting first and second fingers to a base plate of an interconnect mechanism such that the interconnect mechanism is reconfigurable between a collapsed configuration and an extended configuration, the base plate including a receptacle configured to threadably engage an accessory such that the image capture device is directly connectable to the accessory via the interconnect mechanism;

connecting a reinforcement member to a body of the image capture device, wherein the reinforcement member defines a port configured to receive the accessory and thereby inhibit unintended penetration of the body of the image capture device by the accessory; and connecting the interconnect mechanism to the body of the image capture device such that the interconnect mechanism overlies the reinforcement member.

17. The method of claim 16, further comprising connecting a cover to the base plate to thereby insulate the interconnect mechanism.

18. The method of claim 17, wherein connecting the cover to the base plate includes mechanically connecting the cover to the base plate.

19. The method of claim 18, wherein mechanically connecting the cover to the base plate includes connecting the cover to the base plate in a press fit.

20. The method of claim 17, wherein connecting the cover to the base plate includes adhesively connecting the cover to the base plate.

* * * * *